US009116537B2

(12) United States Patent
Celanovic et al.

(10) Patent No.: US 9,116,537 B2
(45) Date of Patent: Aug. 25, 2015

(54) THERMOPHOTOVOLTAIC ENERGY GENERATION

(75) Inventors: Ivan Celanovic, Cambridge, MA (US);
Walker Chan, Cambridge, MA (US);
Peter Bermel, Cambridge, MA (US);
Adrian Y. X. Yeng, Somerville, MA (US); Christopher Marton, Herndon, VA (US); Michael Ghebrebrhan, Cambridge, MA (US); Mohammad Araghchini, Cambridge, MA (US);
Klavs F. Jensen, Lexington, MA (US);
Marin Soljacic, Belmont, MA (US);
John D. Joannopoulos, Belmont, MA (US); Steven G. Johnson, Cambridge, MA (US); Robert Pilawa-Podgurski, Urbana, IL (US); Peter Fisher, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 61 days.

(21) Appl. No.: 13/112,831

(22) Filed: May 20, 2011

(65) Prior Publication Data
US 2011/0284059 A1 Nov. 24, 2011

Related U.S. Application Data

(60) Provisional application No. 61/347,295, filed on May 21, 2010.

(51) Int. Cl.
*H01L 31/04* (2014.01)
*G05F 1/70* (2006.01)
(Continued)

(52) U.S. Cl.
CPC . *G05F 1/67* (2013.01); *H02S 10/30* (2014.12); *F23C 2900/03001* (2013.01); *F23M 2900/13004* (2013.01)

(58) Field of Classification Search
CPC .................... H01L 31/0406; H01L 31/0413
USPC ........................................................ 136/253
See application file for complete search history.

(56) References Cited

U.S. PATENT DOCUMENTS 4,806,496 A * 2/1989 Suzuki et al. .................. 438/12
5,601,661 A 2/1997 Milstein et al.
(Continued)

FOREIGN PATENT DOCUMENTS

JP 2006-302147 A 11/2006
JP 2007-058845 A 3/2007
(Continued)

OTHER PUBLICATIONS

Wilkinson, P.B., Photonic Bloch oscillations and Wannier-Stark ladders in exponentially chirped Bragg gratings, DOI: 10.1103/PhysRevE.65.056616, Published May 20, 2002.*
(Continued)

*Primary Examiner* — Jonathan Johnson
*Assistant Examiner* — Bethany L Martin
(74) *Attorney, Agent, or Firm* — Wolf, Greenfield & Sacks, P.C.

(57) ABSTRACT

Inventive systems and methods for the generation of energy using thermophotovoltaic cells are described. Also described are systems and methods for selectively emitting electromagnetic radiation from an emitter for use in thermophotovoltaic energy generation systems. In at least some of the inventive energy generation systems and methods, a voltage applied to the thermophotovoltaic cell (e.g., to enhance the power produced by the cell) can be adjusted to enhance system performance. Certain embodiments of the systems and methods described herein can be used to generate energy relatively efficiently.

24 Claims, 30 Drawing Sheets

(51) Int. Cl.
    G05F 1/67      (2006.01)
    H02S 10/30     (2014.01)

(56)            References Cited

U.S. PATENT DOCUMENTS

| | | | |
|---|---|---|---|
| 5,942,047 | A | 8/1999 | Fraas et al. |
| 5,955,749 | A | 9/1999 | Joannopoulos et al. |
| 6,130,780 | A | 10/2000 | Joannopoulos et al. |
| 6,583,350 | B1 | 6/2003 | Gee et al. |
| 6,611,085 | B1 | 8/2003 | Gee et al. |
| 6,613,972 | B2 | 9/2003 | Cohen et al. |
| 6,932,951 | B1 | 8/2005 | Losey et al. |
| 6,939,632 | B2 | 9/2005 | Arana et al. |
| 7,267,779 | B2 | 9/2007 | Arana et al. |
| 7,843,085 | B2 | 11/2010 | Ledenev et al. |
| 2003/0027022 | A1 | 2/2003 | Arana et al. |
| 2004/0035457 | A1 | 2/2004 | Kribus |
| 2005/0109387 | A1* | 5/2005 | Marshall ............ 136/253 |
| 2005/0121069 | A1 | 6/2005 | Chou et al. |
| 2005/0126624 | A1 | 6/2005 | Pellizzari |
| 2005/0172995 | A1 | 8/2005 | Rohrig et al. |
| 2005/0174760 | A1 | 8/2005 | Perlo et al. |
| 2006/0132102 | A1 | 6/2006 | Harvey |
| 2006/0283584 | A1 | 12/2006 | Arana et al. |
| 2007/0183174 | A1 | 8/2007 | Lee |
| 2008/0116779 | A1 | 5/2008 | Janson |
| 2008/0143188 | A1 | 6/2008 | Adest et al. |
| 2008/0192519 | A1 | 8/2008 | Iwata |
| 2009/0121549 | A1 | 5/2009 | Leonard |
| 2009/0188547 | A1* | 7/2009 | Hayashi et al. ............ 136/249 |
| 2009/0217977 | A1 | 9/2009 | Florescu et al. |
| 2010/0132757 | A1 | 6/2010 | He |
| 2012/0037217 | A1 | 2/2012 | Hamam et al. |
| 2012/0223583 | A1 | 9/2012 | Cooley et al. |
| 2012/0312371 | A1* | 12/2012 | Rinzler et al. ............ 136/256 |
| 2013/0221753 | A1 | 8/2013 | Perreault et al. |

FOREIGN PATENT DOCUMENTS

| | | |
|---|---|---|
| JP | 2007-089373 A | 4/2007 |
| WO | WO 2009/036154 A1 | 3/2009 |
| WO | WO 2011/146843 A2 | 11/2011 |
| WO | WO 2012/012450 A1 | 1/2012 |

OTHER PUBLICATIONS

Liu et al, Air waveguide in a hybrid 1D and 2D photonic crystal hetero-structure, Aug. 2009, Elsevier, Optics Communications.*
Lorenzo et al, Porous silicon-based rugate filters, Sep. 10, 2005, Applied Optics, vol. 44 No. 26.*
Song et al, Graded refractive index SiOx infrared filters prepared by reactive magetron sputtering, Feb. 6, 2008, American Vacuum Society, Mar./Apr. 2008, pp. 265-269.*
Invitation to Pay Additional Fees, mailed Jul. 27, 2012, in Related International Application No. PCT/US2011/037353.
International Preliminary Report on Patentability, issued Nov. 27, 2012, in Related International Application No. PCT/US2011/037353.
Notification of Transmittal of the International Search Report and the Written Opinion, mailed Sep. 19, 2012, in Related International Application No. PCT/US2011/037353.
Angell et al., "Silicon Micromechanical Devices," *Scientific American*, vol. 248, No. 4, Apr. 1983, 44-55.
Araghchini et al., "Fabrication of two-dimensional tungsten photonic crystals for high-temperature applications," *J. Vac. Sci Technol.*, B 29(6), Nov./Dec. 2011, 061402(1)-(4).
Barwicz et al., "Polarization-transparent microphotonic devices in the strong confinement limit," *Nature Photonics*, vol. 1, Jan. 2007, 57-60.
Bermel et al. "Design and global optimization of high-efficiency thermophotovoltaic systems," TPV-9 Conference 2010, 1-6.
Bermel et al., "Design and global optimization of high-efficiency thermophotovoltaic systems," *Optics Express*, vol. 18, No. 103, published Aug. 2, 2010, A314-A334.

Bermel et al., "Tailoring photonic metamaterial resonances for thermal radiation," *Nanoscale Research Letters*, 2011, 6:549, 1-5.
Bienstman, "Rigorous and efficient modelling of wavelength scale photonic components," PhD Thesis, 2001.
Blackwell, "Design, Fabrication, and Characterization of a Micro Fuel Processor," PhD Thesis, Massachusetts Insittute of Technology, Mar. 6, 2008.
Celanovic et al, "Resonant-cavity enhanced thermal emission," *Physical Review*, B 72, 2005, 075127(1)-(6).
Celanovic et al., "Design and optimization of one-dimensional photonic crystals for thermophotovoltaic applications," *Optics Letters*, vol. 29, No. 8, Apr. 15, 2004, 863-865.
Celanovic et al., "Two-dimensional tungsten photonic crystals as selective thermal emitters," *Applied Physics Letters*, 92, 2008, 193101(1)-(3).
Chan et al., "A high efficiency millimeter-scale thermophotovoltaic generator," TPV-9 Conference 2010, 1-4.
Chester et al., "Design and global optimization of high-efficiency solar thermal systems with tungsten cermets," *Optics Express*, vol. 19, No. S3, Published Mar. 29, 2011, A245-A257.
Fahr et al., "Rugate filter for light-trapping in solar cells," *Optics Express*, Published Jun. 10, 2008, vol. 16, No. 13, 9332-9343.
Farjadpour et al., "Improving accuracy by subpixel smoothing in the finite-difference time domain," *Optics Letters*, vol. 31, No. 20, Oct. 15, 2006, 2972-2974.
Fleming et al., "All-metallic three-dimensional photonic crystals with a large infrared bandgap," *Nature*, vol. 417, May 2, 2002, 52-55.
Florescu et al., "Improving solar cell efficiency using photonic bandgap materials," *Solar Energy Materials & Solar Cells* 91 (2007), 1599-1610.
Franco-Ferreira et al., "Long Life Radioisotopic Power Sources Encapsulated in Platinum Metal Alloys," *Platinum Metals Rev.*, 1997, 41, (4), 154-163.
Gablonsky, et al., "A Locally-Biased form of the DIRECT Algorithm," *Journal of Global Optimization*, 21(1), 27-37 (2001).
Ghebrebrhan et al., "Tailoring thermal emission via $Q$ matching of photonic crystal resonances," *Physical Review, A* 83, 2011,033810(1)-(6).
Green, "Limiting photovoltaic monochromatic light conversion efficiency," *Progress in photovoltaics: Research and Applications*, vol. 9, 257-261 (2001).
Henry, "Limiting efficiencies of ideal single and multiple energy gap terrestrial solar cells," *J. Appl. Phys.* 51, 4494-4500 (1980).
Herzinger et al., "Ellipsometric determination of optical constants for silicon and thermally grown silicon dioxide via a multi-sample, multi-wavelength, multi-angle investigation," *Journal of Applied Physics*, vol. 83, No. 6, Mar. 15, 1998, 3323-3336.
Koudelka, et al., "Radioisotope Micropower System Using Thermophotovoltaic Energy Conversion," *Space Technology and Applications International Forum—STAIF 2006*, Feb. 12-16, 2006.
Kucherenko, et al., "Application of Deterministic Low-Discrepancy Sequences in Global Optimization," *Computational Optimization and Applications*, 30, 297-318 (2005).
Li, "Large Absolute Band Gap in 2D, Physical Review Letters," *Physical Review Letters*, vol. 81, No. 12, Sep. 21, 1998, 2574-2577.
Linden, "Model System for a One-Dimensional Magnetic Photonic Crystal," *Physical Review Letters*, 2006, 083902(1)-(4).
Mao et al., "New development of one-dimensional $Si/SiO_2$ photonic crystals filter for thermophotovoltaic applications," *Renewable Energy*, 35, 2010, 249-256.
Marton, "Catalytic Combustion for Direct Thermal-to-Electrical Energy Conversion," Presented at an Interview on Oct. 29, 2009.
Mititu et al., "Angular Selective Light Filter Based on Photonic Crystals for Photovoltaic Applications," *IEEE Photonic Journal*, vol. 2, No. 3, Jun. 2010, 489-499.
Oskooi et al., "MEEP: A flexible free-software package for electromagnetic simulations by the FDTD method," *Computer Physics Communications*, 181 (2010), 687-702.
O'Sullivan et al., "Optical characteristics of one-dimensional $Si/SiO_2$ photonic crystals for thermophotovoltaic applications," *Journal of Applied Physics*, 97, 2005, 033529(1)-(7).

(56) References Cited

OTHER PUBLICATIONS

Pendry et al., "Magnetism from Conductors and Enhanced Nonlinear Phenomena," *IEEE Transactions on Microwave Theory and Techniques*, vol. 47, No. 11, Nov. 1999, 2075-2084.
Pilawa-Podgurski et al., "Low-Power Maximum Power Point Tracker with Digital Control for Thermophotovoltaic Generators," *Twenty Fifth Annual IEEE*, Feb. 21-25, 2010, 961-967.
Pilawa-Podgurski, et al, "Integrated CMOS DC-DC Converter with Digital Maximum Power Point Tracking for a Portable Thermophotovoltaic Power Generator," Energy Conversion Congress and Exposition (ECCE), 2011 IEEE, Sep. 17-22, 2011.
Rephaeli et al., "Absorber and emitter for solar thermo-photovoltaic systems to achieve efficiency exceeding the Shockley-Queisser limit," *Optics Express*, vol. 17, No. 17, Published Aug. 11, 2009, 15145-15159.
Sai et al., "Thermophotovoltaic generation with selective radiators based on tungsten surface gratings," *Applied Physics Letters*, vol. 85, No. 16, Oct. 18, 2004.
Ulbrich, et al., "Directional selectivity and light-trapping in solar cells," *Photonics for Solar Energy Systems II*, vol. 7002, 70020A, Apr. 7, 2008.
Whittaker et al., "Scattering-matrix treatment of patterned multilayer photonic structures," *Physical Review B*, vol. 60, No. 4, Jul. 15, 1999, 2610-2618.
Yeng et al., "Enabling High Temperature Nanophotonics for Energy Applications," *PNAS*, vol. 109, No. 7, Feb. 14, 2012, 2280-2285.
[No Author Listed] Optical constants of Air. refractiveindex.info <http://refractiveindex.info/?group=GASES&material=Air> Date accessed Aug. 29, 2013. 2 pages.
[No Author Listed] Optical constants of Tungsten (W). refractiveindex.info <http://refractiveindex.info/?group=METAL&material=Tungsten> Date accessed Aug. 29, 2013. 2 pages.
Liang et al., Metallodielectric opals of layer-by-layer processed coated colloids. Adv Mater. Aug. 2002;14(16):1160-4.
Ye et al., Design for 2D anisotropic photonic crystal with large absolute band gapbs by using a genetic algorithm. Eur Phys J. Apr. 9, 2004;37:417-9.
[No Author Listed] Chemical Book, Trisodium hexafluoroaluminate. Accessed Oct. 16, 2014. http://www.chemicalbook.com/ChemicalProductProperty_EN_CB8300371.htm.
[No Author Listed] Chemical Dictionary Online, Sodium hexafluoroaluminate. Accessed Oct. 16, 2014. http://www.chemicaldictionary.org/dic/S/Sodium-hexafluoroaluminate_690.html.
[No Author Listed] Merriam-Webster, definition of Layer. Printed Oct. 16, 2014. http://www.merriam-webster.com/dictionary/layer.
[No Author Listed] Optical constants of SiO2; http://www.refractiveindex.info/legacy/?group=CRYSTALS&materials=SiO2; accessed Apr. 20, 2014.
[No Author Listed] Semiconductor Materials; accessed Oct. 16, 2014. http://www.semilsource.com/materials/default.asp?SearchTerm=Zn.
[No Author Listed] Technick.net http://www.technick.net/public/code/cp_dpage.php?aiocp_dp=utilinductance_circle; accessed Apr. 1, 2014.
[No Author Listed] The Engineering Toolbox—Relative Permittivity—Dielectric Constant; http://www.engineeringtoolbox.com/relative-permittivity-d_1660.html; access Apr. 20, 2014.
[No Author Listed] Titanium dioxide-titania (TiO2); http://www.azom.com/article.aspx?ArticleID=1179; accessed Apr. 20, 2014.
[No Author Listed] Trends in photovoltaic applications, survey report of selected IEA countries between 1992 and 2006., Tech. Rep. IEA-PVPS T1-16:2007, International Energy Agency Photovoltaic Power Systems, 2007. [Online] www.iea-pvps.org.
Al-Atrash, H. et al., Statistical modeling of DSP-based hill-climbing MPPT algorithms in noisy environments, in *Twentieth Annual IEEE Applied Power Electronics Conference*, vol. 3, 2005, pp. 1773-1777.
Araujo, S. et al., Novel grid-connected non-isolated converters for photovoltaic systems with grounded generator, in *IEEE Power Electronics Specialists Conference*, 2008.

Arriaga et al., Band structure and reflectivity of omnidirectional Si-based mirrors with a Gaussian profile refractive index. Journal of Applied Physics. Aug. 29, 2006; 100. http://scitation.aip.org/content/aip/journal/jap/100/4/10.1063/1.2336078.
Badescu, V. Dynamic model of a complex system including pv cells, electric battery, electrical motor and water pump. *Energy*, 28(12):1165-1181, 2003.
Benavides, N.D. et al., Modeling the effect of voltage ripple on the power output of photovoltaic modules. *IEEE Transactions on Industrial Electronics*, 55(7), Jul. 2008.
Carannante, G. et al., Experimental performance of mppt algorithm for photovoltaic sources subject to inhomogeneous insolation. *IEEE Transactions on Industrial Electronics*, 56(11):4374-4380, Nov. 2009.
Cavallaro, C. et al., A voltage sensing approach for a maximum power tracking in integrated photovoltaic applications, in *2009 International Conference on Clean Electrical Power*, 2009, pp. 691-698.
Chigrin et al., Observation of total omnidirectional reflection from a one-dimensional dielectric lattice. Applied Physics A. 1999; 25-28. http://link.springer.com/article/10.1007%2Fs003390050849.
Decker, B. et al. Performance of 170 grid connected pv plants in northern Germany—analysis of yields and optimization potentials, *Solar Energy*, vol. 59, No. 4-6, pp. 127-133, 1997.
Deline, C., Partially shaded operation of multi-string photovoltaic systems. *Photovoltaic Specialists Conference (PVSC), 2010 35th IEEE*, pp. 000394-000399, Jun. 2010.
Dhagat, P. et al., Comparison of Magnetic Materials for V-Groove Inductors in Optimized High-Frequency DC-DC Converters, *IEEE Transactions on Magnetics*, vol. 40, No. 4, pp. 2008-2010, 2004.
Esram, T. et al. Dynamic maximum power point tracking of photovoltaic arrays using ripple correlation control, *IEEE Transactions on Power Electronics*, vol. 21, No. 5, pp. 1282-1291, 2006.
Esram, T. et al., Comparison of photovoltaic array maximum power point tracking techniques, *IEEE Transactions on Energy Conversion*, vol. 22, No. 2, pp. 439-449, 2007.
Femia, N. et al. Optimization of perturb and observe maximum power point tracking method. *IEEE Transactions on Power Electronics*, 20(4):963-973, 2005.
Femia, N. et al., Distributed maximum power point tracking of photovoltaic arrays: Novel approach and system analysis. *IEEE Transactions on Industrial Electronics*, 55(7):2610-2621, Jul. 2008.
Field, H. et al., Cell binning method analysis to minimize mismatch losses and performance variation in Si-based modules, in *Conference Record of the Twenty-Ninth IEEE Photovoltaic Specialists Conference*, pp. 418-421, 2002.
Hayashi, Z. et al., High-efficiency DC-DC converter chip size module with integrated soft ferrite, *IEEE Transactions on Magnetics*, vol. 39, No. 05, 2003.
Hohm, D.P. et al., Comparative study of maximum power point tracking algorithms, *Prog. Photovolt: Res. Appl.*, vol. 11, pp. 47-62, 2003.
Hussein, K.H. et al., Maximum photovoltaic power tracking: an algorithm for rapidly changing atmospheric conditions. *Generation, Transmission and Distribution, IEEE Proceedings*—, 142(1):59-64, Jan. 1995.
Kajihara, A. et al., Model of photovoltaic cell circuits under partial shading. In *IEEE International Conference on Industrial Technology 2005. ICIT 2005*, pp. 866-870, Dec. 2005.
Karpov, V.G. et al., Effects of nonuniformity in thin-film photovoltaics, *Applied Physics Letters*, vol. 80, No. 22, 2002.
Kaushika, N. et al., An investigation of mismatch losses in solar photovoltaic cell networks, *Energy*, vol. 32, pp. 755-759, May 2007.
Kazmi, S. et al., An improved and very efficient mppt controller for pv systems subjected to rapidly varying atmospheric conditions and partial shading. In *Power Engineering Conference, 2009. AUPEC 2009. Australasian Universities*, pp. 1-6, Sep. 2009.
Kjaer, S. et al. A review of single-phase grid-connected inverters for photovoltaic modules, *IEEE Transactions on Industry Applications*, vol. 41, No. 5, pp. 1292-1306, 2005.
Kjaer, S.B., *Design and control of an inverter for photovoltaic applications*. PhD thesis, Inst. Energy Technol., Aalborg University, Aalborg East, Denmark, 2004/2005.

(56) References Cited

OTHER PUBLICATIONS

Klootwijk, J.H. et al., Ultrahigh capacitance density for multiple ald-grown mim capacitor stacks in 3-d silicon. *IEEE Electron Device Letters*, 29(7):740-742, Jul. 2008.

Latham et al., Performance of photovoltaic maximum power point tracking algorithms in the presence of noise, *Digest submitted to IEEE Energy Conversion Conference and Exposition*, 2010.

Lee et al., TiO2(ZnS)/SiO2 one-dimensional photonic crystals and a proposal for vertical micro-cavity resonators. Journal of the Korean Physical Society. Feb. 2, 2004; 44(2):387-392.

Lee, K.-Y. et al., A simplified analog control circuit of a maximum power point tracker, in *IEEE Photovoltaic Specialists Conference*, 2008, pp. 1-3.

Li, Q. et al., A review of the single phase photovoltaic module integrated converter topologies with three different de link configurations, *IEEE Transactions on Power Electronics*, vol. 23, No. 3, pp. 1320-1333, 2008.

Lim, Y.H. et al., Synthesis, simulation and experimental verification of a maximum power point tracker from nonlinear dynamics, in *IEEE Power Electronics Specialists Conference*, vol. 1, 2001, pp. 199-204.

Mehas, G. et al., Converter and inductor design for fast-response microprocessor power delivery, in *IEEE Power Electronics Specialists Conference*, pp. 1621-1626, Jun. 2000.

Mohan, S.S. et al. Simple accurate expressions for planar spiral inductances. *IEEE Journal of Solid-State Circuits*, 34(10):1419-1424, 1999.

Myrzik, J.M.A. et al., String and module integrated inverters for single-phase grid connected photovoltaic systems—a review. *Power Tech Conference Proceedings, 2003 IEEE Bologna*, vol. 2, p. 8 pp. vol. 2, Jun. 2003.

Neugebauer, T. et al., Filters and components with inductance cancellation, *IEEE Transactions on Industry Applications*, vol. 40, No. 2, pp. 483-490, 2004.

Orlandi, S. et al. Optimization of shielded pcb air-core toroids for high efficiency dc-dc converters. *IEEE Transactions on Power Electronics*, PP(99):1, 2010.

Perreault, D. et al., Distributed interleaving of paralleled power converters, *IEEE Transactions on Circuits and Systems—Part I: Fundamental Theory and Applications*, vol. 44, No. 8, pp. 728-734, 1997.

Perreault, D. et al., Frequency-based current-sharing techniques for paralleled power converters, *IEEE Transactions on Power Electronics*, vol. 13, No. 4, pp. 626-634, 1998.

Perreault, D. et al., Switching-ripple-based current sharing for paralleled power converters, *IEEE Transactions on Circuits and Systems—Part I. Fundamental Theory and Applications*, vol. 46, No. 10, pp. 1264-1274, 1999.

Pilawa-Podgurski, R. et al., Merged two-stage power converter architecture with soft charging switched-capacitor energy transfer, in *39th IEEE Power Electronics Specialists Conference*, 2008.

Prabhakaran, S. et al. Measured Electrical Performance of V-Groove Inductors for Microprocessor Power Delivery, *IEEE Transactions on Magnetics*, vol. 39, No. 5, pp. 3190-3192, 2003.

Prabhakaran, S. et al., Fabrication of thin-film v-groove inductors using composite magnetic materials, in *IEEE International Workshop on Integrated Power Packaging*, pp. 102-105, Jul. 2000.

Prabhakaran, S. et al., Impedance-analyzer measurements of high frequency power passives: techniques for high power and low impedance. In *Conference Record of the Industry Applications Conference, 2002. 37th IAS Annual Meeting.*, vol. 2, pp. 1360-1367 vol. 2, 2002.

Prabhakaran, S. et al., Microfabricated Coupled Inductors for DC-DC Converters for Microprocessor Power Delivery, in *IEEE Power Electronics Specialists Conference*, 2004; 4467-4472.

Prabhakaran, S. et al., Microfabricated V-Groove Power Inductors for High-Current Low-Voltage Fast-Transient DC-DC Converters, in *IEEE Power Electronics Specialists Conference*, pp. 1513-1519, 2005.

Quintana, M.A. et al., Commonly observed degradation in field-aged photovoltaic modules, in *IEEE 29th Photovoltaic Specialists Conference*, pp. 1436-1439, May 2002.

Rill et al., Negative-index bianisotropic photonic metamaterial fabricated by direct laser writing and silver shadow evaporation. Optical Letters, Optical Society of America. Dec. 22, 2008; 19-21.

Rill et al., Photonic metamaterials by direct laser writing and silver chemical vapour deposition. Nature Materials. May 11, 2008; 543-546.

Roozeboom, F. et al., Passive and heterogeneous integration towards a si-based system-in-package concept. *Thin Solid Films*, 504(1-2):391-396, 2006. Proceedings of The International Conference on Materials for Advanced Technologies (ICMAT 2005) Symposium H: Silicon Microelectronics: Processing to Packaging—ICMAT 2005 Symposium H.

Salas, V. et al. Review of the maximum power point tracking algorithms for standalone photovoltaic systems, *Solar Energy Materials and Solar Cells*, vol. 90, No. 11, pp. 1555-1578, 2006. [Online]. Available: http://www.sciencedirect.com/science/article/B6V51-4J0WRC7-2/2/ace7c72150a4c9afbd031d258c2cf201.

Sato, F. et al. All-in-One Package Ultracompact Micropower Module Using Thin-Film Inductor, *IEEE Transactions on Magnetics*, vol. 40, No. 4, pp. 2029-2031, 2004.

Schrom, G. et al., Optimal design of monolithic integrated dc-dc converters, in *Proc. IEEE International Conference on Integrated Circuit Design and Technology ICICDT '06*, pp. 1-3, 2006.

Sokolov, M. et al. Load line emulation based maximum power point tracking. *Power Electronics Specialists Conference, 2008. PESC 2008. IEEE*, pp. 4098-4101, Jun. 2008.

Stauth, J.T. et al., Dynamic power supply design for high-efficiency wireless transmitters. Master's thesis, EECS Department, University of California, Berkeley, 2006.

Sugawara, E. et al., Microinductor for Flip-Chip Micropower Source, *IEEE Transactions on Magnetics*, vol. 39, No. 05, 2003.

Sullivan, C. et al. A high-efficiency maximum power point tracker for photovoltaic arrays in a solar-powered race vehicle, in *IEEE Power Electronics Specialists Conference*, 1993, pp. 574-580.

Sullivan, C.R. et al., Decrease in photovoltaic power output from ripple: Simple general calculation and effect of partial shading. In *Applied Power Electronics Conference and Exposition (APEC), 2011 Twenty-Sixth Annual IEEE*, pp. 1954-1960, Mar. 2011.

Sullivan, C.R. et al., Design and fabrication of low-loss toroidal air-core inductors, in *IEEE Power Electronics Specialists Conference*, 2006.

Sullivan, C.R. et al., Physically-based distributed models for multi-layer ceramic capacitors. In *Electrical Performance of Electronic Packaging*, 2003, pp. 185-188, Oct. 2003.

Sullivan, C.R. et al., Thin-film inductor designs and materials for high-current low-voltage power, *Transactions of the Magnetics Society of Japan*, vol. 3, pp. 126-128, Dec. 2003.

Sun, Y. et al., Perpendicular anisotropy in granular Co—Zr—0 films, *Journal of Applied Physics*, vol. 97, No. 10, pp. 10N301-10N303, 2005.

Sun, Y. et al., Soft Magnetic Properties of Obliquely Deposited CoZrO Films, *IEEE Transactions on Magnetics*, vol. 43, No. 12, pp. 4060-4063, Dec. 2007.

Wafeenschmidt, E. et al., Design method and material technologies for passives in printed circuit board embedded circuits, *IEEE Transactions on Power Electronics*, vol. 20, pp. 576-584, May 2005.

Walker, G.R. et al., Cascaded dc-dc converter connection of photovoltaic modules. *IEEE Transactions on Power Electronics*, 19(4):1130-1139, Jul. 2004.

Wilson, K. et al., Measuring the effect of cell mismatch on module output, *4th IEEE World Conference on Photovoltaic Energy Conversion*, vol. 1, pp. 916-919, May 2006.

Wolfs, P. et al., A single cell maximum power point tracking converter without a current sensor for high performance vehicle solar arrays, in *IEEE Power Electronics Specialists Conference*, pp. 165-171, 2005.

Woyte, A. et al. Partial shadowing of photovoltaic arrays with different system configurations: literature review and field test results., *Solar Energy*, vol. 74, pp. 217-233, 2003.

Wu, W. et al., DSP-based multiple peak power tracking for expandable power system, in *IEEE Applied Power Electronics Conference*, vol. 1, 2003, pp. 525-530.

(56) References Cited

OTHER PUBLICATIONS

Xiao, W. et al., A modified adaptive hill climbing mppt method for photovoltaic power systems. In *Power Electronics Specialists Conference, 2004. PESC 04. 2004 IEEE 35th Annual*, vol. 3, pp. 1957-1963 vol. 3, Jun. 2004.

Filho, F. et al., "11-level cascaded H-bridge grid-tied inverter interface with solar panels," Applied Power Electronics Conference and Exposition (APEC), 25th IEEE, Feb. 2010, pp. 968-972.

Kim, K. A. et al., "Photovoltaic converter module configurations for maximum power point operation," PECI, 2010, pp. 77-82.

Kouro, S. et al., "Control of a cascaded H-bridge multilevel converter for grid connection of photovoltaic systems," Industrial Electronics, 35th IEEE, Nov. 2009, pp. 3976-3982.

Linares, L. et al., "Improved energy capture in series string photovoltaics via smart distributed power electronics," Applied Power Electronics Conference and Exposition, 24th IEEE, Feb. 2009, pp. 904-910.

Mousa, M. et al., "New converter circuitry for PV applications using multilevel converters," Telecommunications Energy Conference, 31st International, Oct. 2009, pp. 1-6.

Ozdemir, E. et al., "Fundamental-frequency-modulated six-level diode-clamped multilevel inverter for three-phase stand-alone photovoltaic system," Industrial Electronics, IEEE Transactions, Nov. 2009, pp. 4407-4415, vol. 56, No. 11.

Patel, H. et al., "MPPT scheme for a PV-fed single-phase single-stage grid-connected inverter operating in CCM with only one current sensor," Energy Conversion, IEEE Transactions, Mar. 2009, pp. 256-263, vol. 24, No. 1.

Peter, P. K., "Switched capacitor DC-DC converter based maximum power point tracking of a PV source for nano satellite application," Photovoltaic Specialists Conference, $35^{th}$ IEEE, Jun. 20-25, 2010, pp. 002604-002609.

Sahan, B. et al., "A single-stage PV module integrated converter based on a low-power current-source inverter," Industrial Electronics, IEEE Transactions, Jul. 2008, pp. 2602-2609 vol. 55, No. 7.

Walker, G. et al., "Cascaded DC-DC converter connection of photovoltaic modules," Power Electronics, IEEE Transactions, Jul. 2004, pp. 1130-1139, vol. 19, No. 4.

Xiao, W. et al., "Topology study of photovoltaic interface for maximum power point tracking," Industrial Electronics, IEEE Transactions, Jun. 2007, pp. 1696-1704, vol. 54, No. 3.

\* cited by examiner

THERMOPHOTOVOLTAIC ENERGY GENERATION

RELATED APPLICATIONS

This application claims priority under 35 U.S.C. §119(e) to U.S. Provisional Patent Application No. 61/347,295, filed May 21, 2010, and entitled "Thermophotovoltaic Energy Generation," which is incorporated herein by reference in its entirety for all purposes.

GOVERNMENT SPONSORSHIP

This invention was made with government support under Grant No. DMR0819762 awarded by the National Science Foundation, Grant No. W911NF-07-D-0004 awarded by the Army Research Office, and Grant No. DE-SC0001299 awarded by the Department of Energy. The government has certain rights in the invention.

FIELD OF INVENTION

Systems and methods related to the use of thermophotovoltaic cells and/or selective emitters to generate energy are generally described.

BACKGROUND

Thermophotovoltaic (TPV) systems produce electricity via the use of an emitter that thermally radiates photons, which can be subsequently converted into electron-hole pairs within a photovoltaic (PV) medium. These electron-hole pairs can be conducted to leads within the system to produce a current. Because they are solid-state devices, TPV systems have the potential for relatively high reliabilities, relatively small form factors (e.g., meso- and micro-scales), and relatively high energy densities compared to, for example, traditional mechanical engines. However, many emitters within TPV systems emit a large amount of thermal photons with energies below the electronic bandgap of the TPV cell, which are absorbed as waste heat within the system. In many cases, this phenomenon produces TPV system efficiencies well below those of their mechanical counterparts operating at similar temperatures. For these reasons, among others, there exists a need for more effective systems and methods for generating energy using thermophotovoltaic cells.

SUMMARY OF THE INVENTION

Inventive systems and methods for the generation of energy using thermophotovoltaic cells are described. Also described are systems and methods for selectively emitting electromagnetic radiation from an emitter for use in thermophotovoltaic energy generation systems. The subject matter of the present invention involves, in some cases, interrelated products, alternative solutions to a particular problem, and/or a plurality of different uses of one or more systems and/or articles.

In one aspect, an energy generation system is described. The energy generation system can comprise, in some instances, an emitter constructed and arranged to emit electromagnetic radiation, wherein the emitter comprises a photonic crystal comprising 1-dimensional or 2-dimensional periodicity, and a thermophotovoltaic cell constructed and arranged to convert at least a portion of the electromagnetic radiation emitted by the emitter into electricity.

In some cases, the energy generation system can comprise an emitter constructed and arranged to emit electromagnetic radiation, a thermophotovoltaic cell positioned relative to the emitter so as to convert at least a first portion of the electromagnetic radiation emitted by the emitter to electricity, and a controller constructed and arranged to alter a voltage applied to the thermophotovoltaic cell, wherein the thermophotovoltaic cell is constructed and arranged to produce no more than about 15 W of power.

The energy generation system can comprise, in some cases, an emitter constructed and arranged to emit electromagnetic radiation, a first thermophotovoltaic cell positioned relative to the emitter so as to convert at least a first portion of the electromagnetic radiation emitted by the emitter to electricity, a second thermophotovoltaic cell positioned relative to the emitter so as to convert at least a second portion of the electromagnetic radiation emitted by the emitter to electricity, a first controller constructed and arranged to alter a first voltage applied to the first thermophotovoltaic cell, and a second controller, independent from the first controller, constructed and arranged to alter a second voltage applied to the second thermophotovoltaic cell.

In some embodiments, the energy generation system can comprise an emitter constructed and arranged to emit electromagnetic radiation, and a thermophotovoltaic cell constructed and arranged to convert at least a portion of the electromagnetic radiation into electricity, wherein the overall conversion efficiency of the energy generation system is at least about 1% at a temperature of less than or equal to about 1200 K.

In another aspect, an emitter of an energy generation system is described. In some embodiments, the emitter can be constructed and arranged to emit electromagnetic radiation, wherein the emitter comprises a base; a first material with a first index of refraction proximate the base; a second material between the base and the first material, the second material having a second index of refraction that is greater than the first index of refraction; and a third material between the base and the second material, the third material having a third index of refraction that is greater than the second index of refraction.

In another aspect, a method of generating energy is described. The method can comprise, in some instances, applying a first voltage to a first thermophotovoltaic cell constructed and arranged to convert electromagnetic radiation emitted by an emitter to electricity, applying a second voltage to a second thermophotovoltaic cell constructed and arranged to convert electromagnetic radiation emitted by the emitter to electricity, altering the first voltage, and altering the second voltage independently of the first voltage altering step.

Other advantages and novel features of the present invention will become apparent from the following detailed description of various non-limiting embodiments of the invention when considered in conjunction with the accompanying figures. All references cited in the description below are incorporated herein by reference in their entireties. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
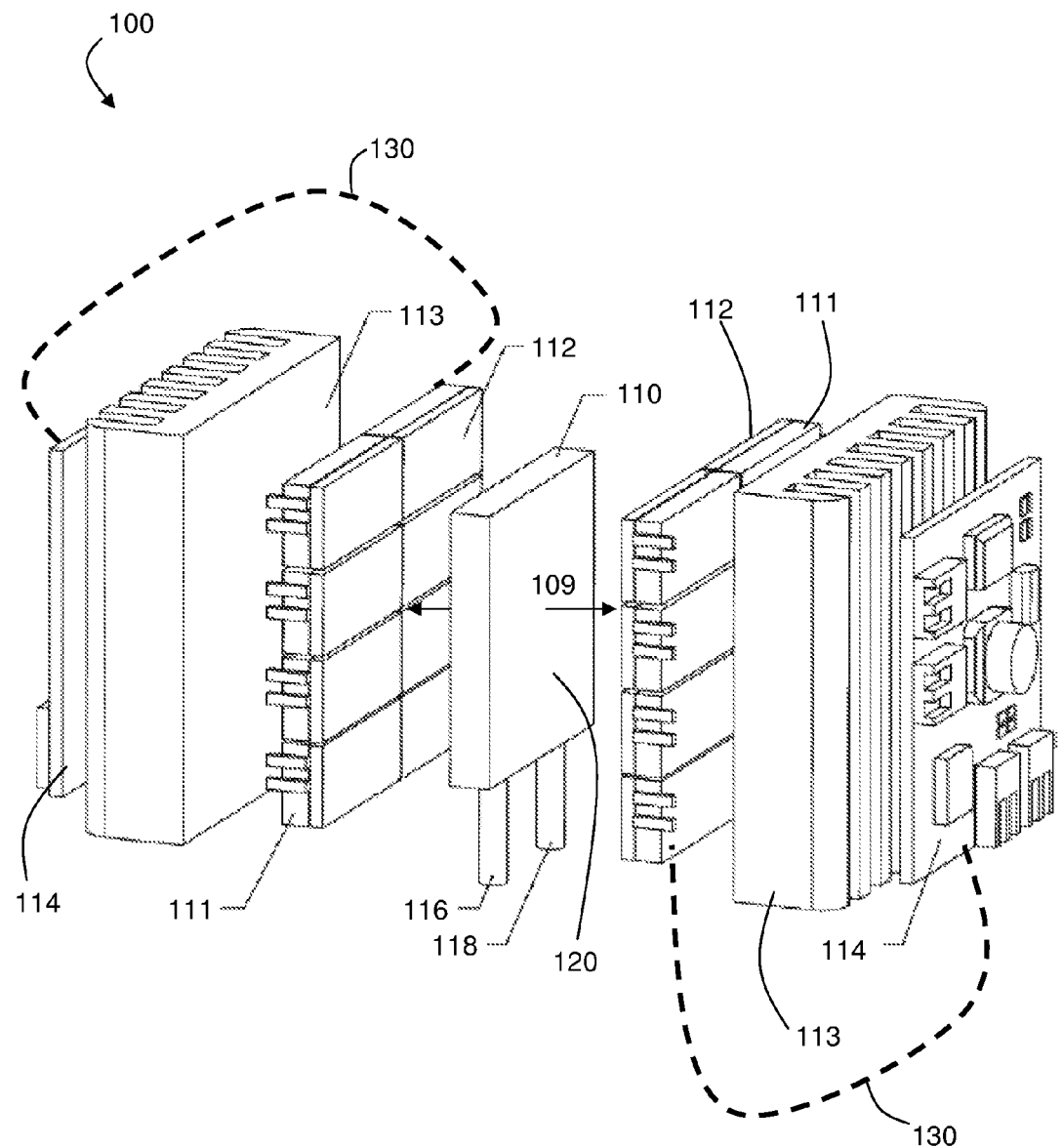
FIG. 1 includes a schematic illustration of a TPV energy generation system, according to one set of embodiments.

Inventive systems and methods for the generation of energy using thermophotovoltaic cells are described. Also described are systems and methods for selectively emitting electromagnetic radiation from an emitter for use in thermophotovoltaic energy generation systems. In at least some of the inventive energy generation systems and methods, a voltage applied to the thermophotovoltaic cell (e.g., to enhance the power produced by the cell) can be adjusted to enhance system performance. Certain embodiments of the systems and methods described herein can be used to generate energy relatively efficiently.

In some cases, an emitter is used to selectively emit electromagnetic radiation within one or more predetermined ranges of wavelengths. Selective emission of electromagnetic radiation can be achieved, for example, by fabricating or modifying the emitter such that it includes a photonic crystal. The photonic crystal can be constructed and arranged such that certain wavelengths of radiation are internally reflected within the emitter, while other wavelengths of radiation are emitted.

In some embodiments, the photonic crystal can comprise 1-dimensional or 2-dimensional periodicity, which can make the photonic crystal relatively easy and/or inexpensive to fabricate. For example, in some cases, the emitter can include multiple materials (e.g., layers of materials) arranged adjacent each other to form a structure with an index of refraction that varies substantially along one coordinate direction, but does not substantially vary along two orthogonal coordinate directions. In some cases, the index of refraction of the materials in the emitter can increase from an exterior edge of the emitter toward the interior of the emitter.

The systems and methods may also involve the use of one or more thermophotovoltaic cells constructed and arranged to convert at least a portion of the electromagnetic radiation emitted by the emitter into energy. In some cases, a filter, which can be independent of the photonic crystal associated with the emitter, can be placed between the emitter and the thermophotovoltaic cell(s). The filter can be constructed and arranged such that certain wavelengths are transmitted from the emitter, through the filter, and to the thermophotovoltaic cell(s), while other wavelengths are reflected from the filter back toward the emitter.

In some embodiments, a voltage can be applied to the thermophotovoltaic cell(s) to increase the power generated by the thermophotovoltaic cell(s). An exemplary system for applying such a voltage is described, for example, in Example 3. This voltage can be adjusted, in some embodiments, as the system is operated to enhance the amount of power generated by the system. In many applications, the intensity of the electromagnetic radiation emitted from the emitter can vary with time, which can affect the amount of current generated by the thermophotovoltaic cell(s). By adjusting the voltage applied to the thermophotovoltaic cell(s), one can increase the net amount of power produced within certain embodiments of the system. In addition, in some embodiments, voltages applied to a plurality of thermophotovoltaic cells can be controlled independently, allowing one to account for variabilities in the amount of incident electromagnetic radiation across an array of cells.

Certain embodiments of the inventive systems and methods described herein can provide certain advantage(s) over traditional photovoltaic systems in certain applications. For example, in some embodiments, the emitter can include a photonic crystal that is relatively easy and inexpensive to fabricate. In addition, certain embodiments of the systems and methods described herein can be used to achieve relatively high energy conversion efficiencies.

The energy generation systems and methods described herein can be used in a variety of applications. In some cases, the systems and methods described herein can be used in conjunction with micro thermophotovoltaic systems, which can be particularly useful for powering portable electronics devices such as cell phones, laptop computers, and the like. The inventive systems and methods can also be used conjunction with solar thermophotovoltaic systems to provide power at any suitable scale. In some cases (e.g., when radioisotopes are used to provide heat to the emitter), the systems and methods described herein can provide a steady, compact source of electrical power, which can be useful for missions extending up to several decades (e.g., in satellites deployed to deep space or terrestial missions in isolated areas).

FIG. 1 shows a schematic illustration of an energy generation system 100 in which electromagnetic radiation 109 emitted by emitter 110 is converted to electricity by thermophotovoltaic (TPV) cells 111. In some embodiments, the system can also include optional filter 112, which can be positioned between the emitter and the TPV cell(s). The filter can be used to reflect undesirable electromagnetic radiation (e.g., with an energy lower than the electronic bandgap of the TPV cell(s)) emitted by the emitter back toward the emitter, while allowing desirable electromagnetic radiation (e.g., with an energy higher than the electronic bandgap of the TPV cell(s)) to pass to the TPV cell(s). System 100 can also include optional heat sink(s) 113, which can be used to dissipate heat from TPV cell(s) 111. Optional control system 114 can also be included, in some cases. Control system 114 can be used to adjust a voltage applied to the TPV cell(s) (e.g., to enhance power extraction) in response to a power output by the cell(s), as described in more detail below. In the set of embodiments illustrated in FIG. 1, the components are illustrated as being separated by relatively large distances. It should be understood, however, that in some embodiments, the heat sink will be in physical contact with TPV cell(s) 111, and emitter 110 may be positioned relatively close to filter(s) 112 and/or TPV cell(s) 111.

Any suitable type of emitter can be used in the systems and methods described herein. In some embodiments, the emitter can generate electromagnetic radiation within one or more predetermined ranges of wavelengths when it is heated. A variety of mechanisms can be used to heat the emitter, as described in more detail below. The emitter can comprise, in some embodiments, a reactor (e.g., a silicon microreactor). The reactor can be configured to emit electromagnetic radiation within a desired range of wavelengths when it is heated via chemical reaction. Not wishing to be bound by any particular theory, the electromagnetic radiation may be emitted due to changes to the electromagnetic properties of the emitter surface. In some embodiments, the emitter can comprise a combustor that is heated upon combusting one or more fuels within its volume. In the set of embodiments illustrated in FIG. 1, emitter 110 (e.g., a microfabricated reactor) comprises an optional inlet conduit 116, and an optional outlet conduit 118. A fuel can be transported to the emitter via inlet conduit 116 and combusted within the emitter to produce heat, which can raise the temperature of the emitter. The reaction products can then be transported out of the emitter via outlet conduit 118. Combustion of a fuel can heat the emitter to relatively high temperatures (e.g., above about 1000 K) such that it produces electromagnetic radiation that can be converted into electricity by a TPV cell.

In some embodiments, the emitter can comprise a radioactive isotope (also known as a radioisotope). In some such embodiments, decay of the radioactive isotope can heat the emitter to temperatures sufficiently high to produce electromagnetic radiation that can be converted into electricity by the TPV cell. In still other cases, the sun can be used to heat the emitter, and a solar photovoltaic cell can be used as the TPV cell. Exemplary radioactive isotopes that can be used to provide heat to the emitter include, for example, $^{238}$Pu, $^{241}$Am, $^{90}$Sr, and $^{147}$Pm. In some embodiments in which radioactive isotopes are used, the emitter in which the isotope is contained, the TPV cell, filter(s), heat sink(s), and/or control system(s) can be contained within an insulated housing, which can prevent radiation from exiting the system.

The emitter can be constructed and arranged such that it emits electromagnetic radiation within one or more predetermined ranges while internally reflecting certain wavelengths within the emitter volume. For example, in some embodiments, a relatively large percentage of the electromagnetic radiation (e.g., at least about 50%, at least about 75%, or at least about 90%) emitted by the emitter can have an energy higher than the electronic band gap of the TPV cell used in the system.

A photonic crystal may be associated with the emitter to achieve selective emission of electromagnetic radiation from the emitter, in some embodiments. Those of ordinary skill in the art would be familiar with photonic crystals, which include periodic optical structures that allow certain wavelengths of electromagnetic radiation to be propagated through the photonic crystal structure, while other wavelengths of electromagnetic radiation are confined within the volume of the photonic crystal. This phenomenon is generally referred to in the art as a photonic band gap. The photonic crystal can be fabricated directly on the emitter or fabricated separately and integrated with the emitter as a separate step. In the set of embodiments illustrated in FIG. 1, surface 120 of emitter 110 (and/or the opposing surface of the emitter, which is not labeled for purposes of clarity) comprises a photonic crystal that allows the emitter to selectively emit one or more predetermined ranges of wavelengths of electromagnetic radiation.

The photonic crystal associated with the emitter can have, in some cases, 1-dimensional periodicity. One of ordinary skill in the art would be able to determine the dimensionality of the periodicity of a photonic crystal upon inspection. For example, 1-dimensionally periodic photonic crystals include materials arranged in such a way that the index of refraction within the volume of the photonic crystal varies along one coordinate direction and does not substantially vary along two orthogonal coordinate directions. For example, a 1-dimensionally periodic photonic crystal can include two or more materials arranged in a stack within the emitter such that there is substantially no variation in the index of refraction along two orthogonal coordinate directions. 2-dimensionally periodic photonic crystals include materials arranged in such a way that the index of refraction within the volume of the photonic crystal varies along two coordinate directions and does not substantially vary along 1 coordinate direction orthogonal to the other two coordinate directions.

Figure 2A:
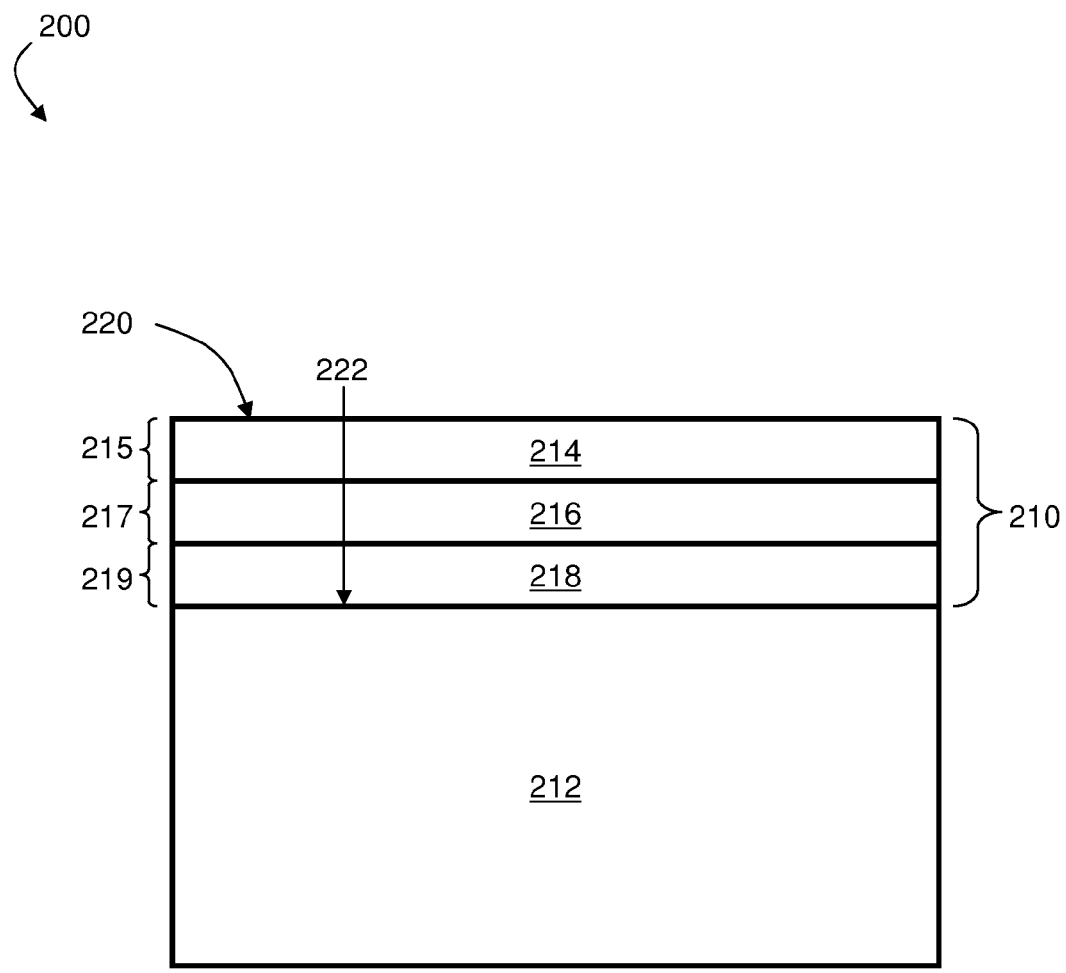
FIGS. 2A-2B include exemplary cross-sectional schematic illustrations of emitters comprising photonic crystals with 1-dimensional periodicity.

FIG. 2A includes a schematic cross-sectional illustration of an emitter 200 comprising a 1-dimensionally periodic photonic crystal 210, in accordance with certain embodiments. In FIG. 2A, emitter 200 includes base 212. The base can correspond to, for example, a reactor (e.g., emitter 110 in FIG. 1 when used, for example, as a combustor) or a container in which a radioactive isotope is stored. Any suitable materials can be used to form the bases (e.g., emitter 110 in FIG. 1, base 212 in FIGS. 2A-2B) described herein. For example, the base material can comprise a semiconductor (e.g., silicon, germanium), a metal (e.g., tungsten), a dielectric material (e.g., titanium dioxide, silicon carbide) and the like. In some embodiments, all or part of the base can be made from a refractory metal (e.g., niobium, molybdenum, tantalum, tungsten, osmium, iridium, ruthenium, zirconium, titanium, vanadium, chromium, rhodium, hafnium, and/or rhenium) and/or another refractory material. The use of refractory materials can allow one to fabricate an emitter that is capable of withstanding relatively high temperatures (e.g., at least about 1000° C., at least about 1500° C., or at least about 2000° C.). In some embodiments, all or part of the base can be made of compounds such as tungsten carbide, tantalum hafnium carbide, and/or tungsten boride. In some embodiments, all or part of the base can be made from noble metals, including noble metals with high melting points (e.g., platinum, palladium, gold, and silver), diamond, and/or cermets (i.e., compound metamaterials including two or more materials (e.g., tungsten and alumina) which can be, in some embodiments, broken up into pieces smaller than the wavelength of visible light). In some embodiments, all or part of the base can be made from a combination of two or more of these materials.

Emitter 200 also includes photonic crystal 210, which includes first material 214 with a first index of refraction proximate the base, second material 216 with a second index of refraction between the base and the first material, and third material 218 with a third index of refraction between the base and the second material. The layers of materials 214, 216, and 218 have thicknesses 215, 217, and 219, respectively. In some embodiments, the materials within a 1-dimensionally periodic photonic crystal can be arranged such that the material occupying the outermost surface of the photonic crystal (i.e., surface 220 in FIG. 2A) has the lowest index of refraction of the photonic crystal materials. The indices of refraction of the materials can, in some cases, increase along a path starting at the outermost surface of the photonic crystal and extending toward the base of the emitter (i.e., in the direction of arrow 222 in FIG. 2A). In the set of embodiments illustrated in FIG. 2A, second material 216 can have an index of refraction that is greater than the index of refraction of first material 214, and third material 218 can have an index of refraction that is greater than second material 216. In some cases, the index of refraction of the second material can be at least about 1.1, at least about 1.5, at least about 2, between about 1.1 and about 2, or between 1.1 and about 1.5 times greater than the index of refraction of the first material. The index of refraction of the third material can be, in some embodiments, at least about 1.1, at least about 1.5, at least about 2, between about 1.1 and about 2, or between 1.1 and about 1.5 times greater than the index of refraction of the second material. Fourth, fifth, sixth, and subsequent materials, positioned between the first three layers and the base can have indices of refraction that are progressively higher than those of preceding material. In some embodiments, the indices of refraction of the materials within the 1-dimensionally periodic photonic crystal can increase exponentially along a path starting at the outermost surface of the photonic crystal and extending toward the base of the emitter (i.e., in the direction of arrow 222 in FIG. 2A). Arranging the materials of the photonic crystal in this manner can enhance the degree to which desirable wavelengths of electromagnetic radiation are emitted from the emitter, while reducing the degree to which unwanted wavelengths are emitted.

In some embodiments, the photonic crystal can comprise an integer number of m materials (e.g., m layers of materials) labeled such that the material given an index of i=1 is closest to the base and farthest from the emission surface and the material given an index of i=m (i.e., the $m^{th}$ material) is closest to the emission surface (e.g., the outermost surface of the photonic crystal, such as surface 220 in FIG. 2A). For example, in the set of embodiments illustrated in FIG. 2A, photonic crystal 210 includes 3 photonic crystal materials, with material 218 labeled as material 1 (i.e., i=1), material 216 labeled as material 2 (i.e., i=2), and material 214 labeled as material 3 (i.e., i=3). One of ordinary skill in the art would understand that, when counting the number of photonic crystal materials, materials that do not contribute to the bandgap function of the photonic crystal would not be counted. For example, an adhesion layer between photonic crystal layers would not be counted. In some embodiments, the base with which the photonic crystal is associated can have an index of refraction of n, and the material (wherein i increases in a direction from the base toward the emission surface, opposite direction 222 in FIG. 2A) can have an index of refraction of about $n^{((m+1-i)/(m+1))}$. For example, in the set of embodiments illustrated in FIG. 2A, the index of refraction of material 214 can be about $n^{(1/4)}$, the index of refraction of material 216 can be about $n^{(1/2)}$, and/or the index of refraction of material 218 can be about $n^{(3/4)}$.

Figure 2B:
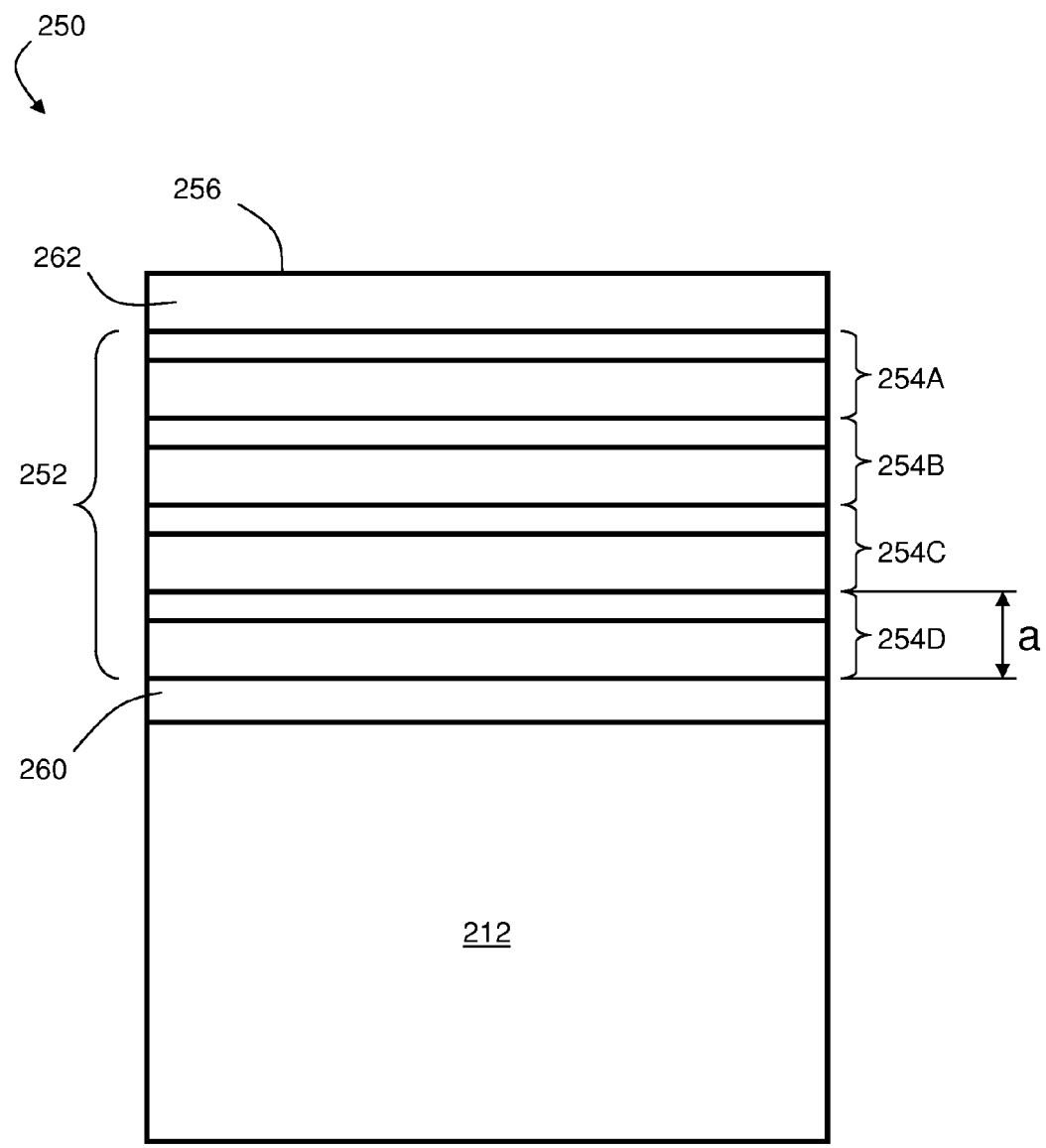

FIG. 2B includes a schematic cross-sectional illustration of an emitter 250 comprising a 1-dimensionally periodic photonic crystal 252 proximate base 212, in accordance with certain embodiments. Photonic crystal 252 includes a plurality of bi-layers 254A-D (e.g., silicon/silicon dioxide bilayers), each of which has a period which corresponds to the total thickness of the bi-layer (labeled a for bi-layer 254D). While photonic crystal 252 is illustrated as having 4 bi-layers, it should be understood that, in other embodiments, fewer (e.g., 2 or 3) or more (e.g., at least 5, at least 10, at least 20) bi-layers may be included in the photonic crystal. In some embodiments, the bi-layer farthest from base 212 (or closest to the emission surface, such as bi-layer 254A in FIG. 2B) has the shortest period, while the bi-layer closest to the base (or farthest from the emission surface such as bi-layer 254D in FIG. 2B) has the longest period. In some cases, the 1-dimensionally periodic photonic crystal can be constructed such that the periods of the bi-layers increase substantially exponentially in a direction from the bi-layer farthest from the base (or closest to the emission surface) to the bi-layer closest to the base (or farthest from the emission surface). For example, in some embodiments, the photonic crystal can include m bi-layers numbered from the bi-layer closest to the emission surface to the bi-layer farthest from the emission surface. In such an indexing scheme, the bi-layer nearest the emission surface (e.g., bi-layer 254A, which is nearest surface 256 in FIG. 2B) is assigned an index of i=1 and has a period $a_1$, and the bi-layer farthest from the emission surface (and closest to the base, such as bi-layer 254D in FIG. 2B) is assigned an index of i=m and has a period of $a_m$. In some embodiments, the period of the $i^{th}$ bi-layer can be defined as follows:

$$a_i = a_m\hat{}(i/m) \tag{1}$$

In some embodiments, the bi-layers can be arranged to have a chirping, r. The chirping is used to calculate the ratio of the shortest to longest period $R_{SL}$ (i.e., the ratio of the thinnest bi-layer to the thickest bi-layer), which is equal to $((1-r)/(1+r))$. One of ordinary skill in the art would be capable of calculating the chirping of a number of layers (or bi-layers) by measuring the longest period (i.e., the thickest layer or bi-layer), measuring the shorted period (i.e., the thinnest layer or bi-layer), calculating the ratio of the shortest period to the longest period ($R_{SL}$), and back-calculating the chirping, as follows:

$$r = \frac{1 - R_{SL}}{1 + R_{SL}} \quad [2]$$

In some embodiments, the chirping can be between about −1 and about 1, between about 0 and about 1, between about 0.2 and about 0.8, or between about 0.7 and about 0.75.

The 1-dimensionally periodic photonic crystals described above can include a variety of suitable types of materials. Examples of materials suitable for use in the 1-dimensionally periodic photonic crystals include, but are not limited to, silicon, silicon dioxide, silicon nitride, metals (e.g., steel, tungsten (e.g., single-crystal tungsten), tantalum, platinum, palladium, silver, gold, etc.), metal oxides (e.g., alumina, zirconia, titania), cermets (e.g., aluminum based cermets such as Ni—$Al_2O_3$ cermets), and the like. As one specific example, the 1-dimensionally periodic photonic crystal can comprise bi-layers, each bi-layer containing a layer of silicon and a layer of silicon dioxide. As another specific example, the 1-dimensionally periodic photonic crystal can comprise a plurality of layers of tungsten-silica cermet and/or a plurality of layers of tungsten-alumina cermet.

In the set of embodiments illustrated in FIGS. 2A-2B, the materials within the photonic crystals are illustrated as layers of material adjacent the top surface of base 212. These layers can be formed as thin films (e.g., films with average thicknesses of less than about 100 microns and, in some cases, less than about 10 microns, or less than about 1 micron). In some cases, it can be advantageous for the photonic crystal to be positioned over the entire external surface of the emitter to prevent unwanted wavelengths of electromagnetic radiation from being emitted. However, it should be understood that, in other embodiments, the materials within the photonic crystal might not be formed as layers, and might not be positioned over the entire external surface of the emitter. For example, the TPV cell might have a smaller exposed surface area than the external surface area of the emitter, in which case, the photonic crystal might only occupy a portion of the emitter surface while the rest of the emitter surface is coated with a material constructed and arranged to reflect substantially all of the electromagnetic radiation generated by the emitter.

As used herein, two materials (e.g., layers of materials) are "proximate" when they are sufficiently close to retain their desired functionality. For example, first material 214 can be proximate base 212 as long as their positions are sufficiently close that the first material can function as part of the photonic crystal of which it is a part (i.e., as long as the first material can transmit some wavelengths of electromagnetic radiation while reflecting other wavelengths of electromagnetic radiation). In some embodiments, two materials can be proximate when they are positioned in direct contact with each other. For example, in FIG. 2A, first material 214 is in direct contact with second material 216, second material 216 is in direct contact with third material 218, and third material 218 is in indirect contact with base 212. In some instances, two materials can be proximate while one or more other materials are positioned between them. Accordingly, while third material 218 is shown as being positioned directly on base 212 in FIG. 2A, it should be understood that, in other embodiments, the third material 218 and the base 212 can remain proximate while one or more other layers (e.g., an additional photonic crystal layer, an adhesion promoter, etc.) is positioned between them.

Figure 3A:
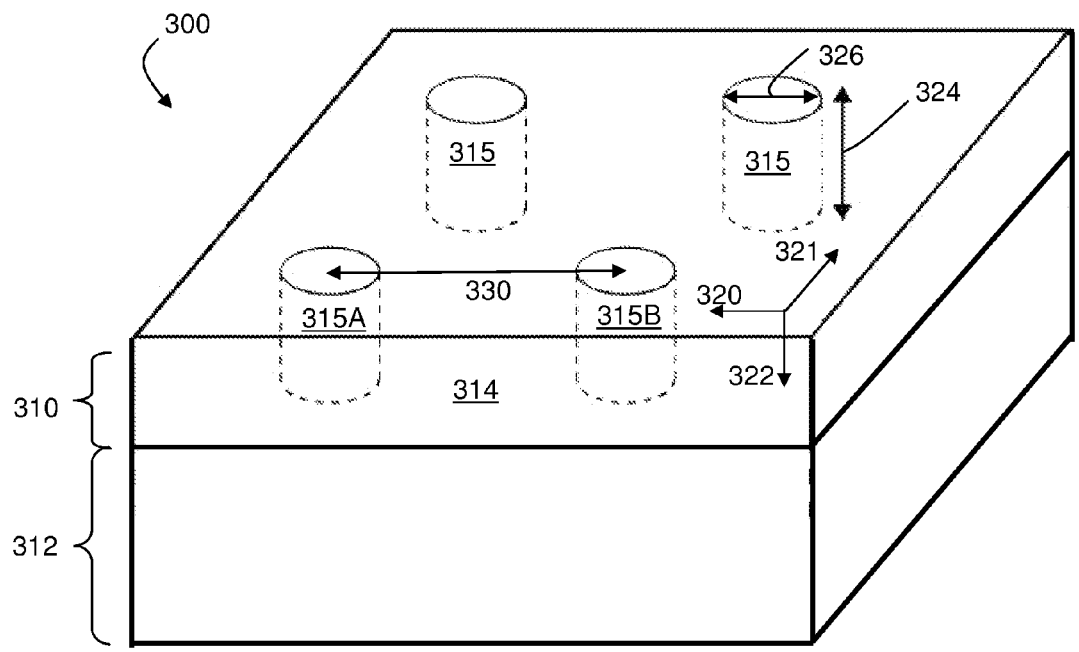
FIGS. 3A-3B include cross-sectional schematic illustrations of emitters comprising photonic crystals with 2-dimensional periodicity, according to some embodiments.
Figure 3B:
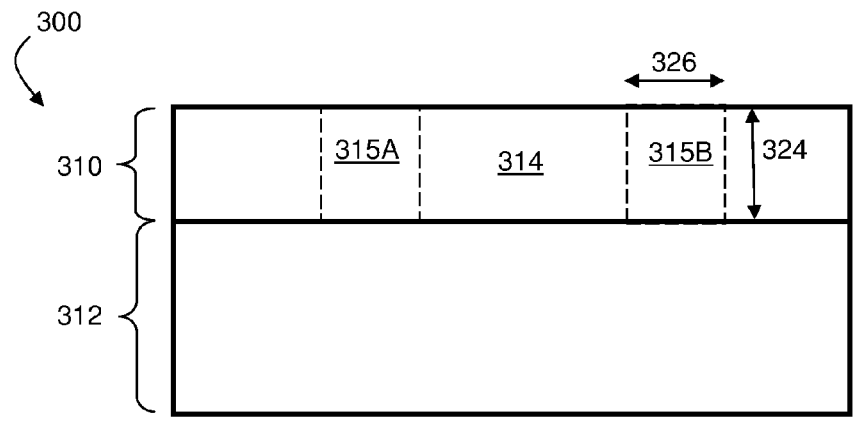

In some embodiments, the photonic crystal associated with the emitter can include 2-dimensional periodicity. FIGS. 3A and 3B include schematic illustrations of a perspective view and cross-sectional view, respectively, of an emitter 300 comprising a 2-dimensionally periodic photonic crystal 310, in accordance with certain embodiments. In FIGS. 3A-3B, emitter 300 includes base 312, which can correspond to, for example, a reactor (e.g., emitter 110 in FIG. 1 when used, for example, as a combustor) or a container in which a radioactive isotope is stored. Emitter 300 also includes photonic crystal 310 proximate base 312. Photonic crystal 310 includes a material 314 comprising multiple regions 315 that have indices of refraction that are different from the index of refraction of material 314. Accordingly, the index of refraction of photonic crystal 310, as illustrated in FIG. 3A, varies along orthogonal coordinate directions 320 and 321, and does not substantially vary along coordinate direction 322.

Material 314 can be a thin film, in some embodiments. For example, in some cases, material 314 can have an average thickness of less than about 100 microns, less than about 10 microns, less than about 1 micron, between about 100 nm and about 10 microns, or between about 0.5 microns and about 1.5 microns. One of ordinary skill in the art would be capable of measuring the thicknesses (and calculating average thicknesses) of thin films using, for example, an ellipsometer, a spectrophotometer, an optical microscope, a transmission-electron microscope, or other suitable method.

In some embodiments, regions 315 can include one or more materials that are formed within voids in material 314. For example, one or more materials can be deposited into voids formed within material 314. In some cases, regions 315 can comprise openings formed within material 314. In some such embodiments, the composition of regions 315 can be substantially the same as the composition of the environment surrounding the emitter (e.g., vacuum, ambient air, etc.).

Regions 315 can have any suitable shape. For example, in some cases, regions 315 can comprise holes with any suitable cross-sectional shape (e.g., substantially circular, substantially elliptical, substantially square, substantially rectangular, substantially triangular, or any other suitable shape). In some embodiments, regions 315 can have a relatively large aspect ratio. As used herein, the aspect ratio of regions 315 is measured as the ratio of the depth of the region, as measured substantially perpendicularly to the external surface of the photonic crystal, to the maximum cross sectional dimension of the region, as measured substantially parallel to the external surface of the photonic crystal. For example, in the set of embodiments illustrated in FIGS. 3A-3B, the aspect ratio of regions 315 corresponds to the ratio of dimensions 324 to 326. In some embodiments, regions 315 can have an aspect ratio of at least about 0.75:1 (i.e., the depth of the feature is at least about 0.75 times the maximum cross sectional dimension of the feature), at least about 2:1, at least about 5:1, at least about 10:1, between about 0.75:1 and about 10:1, between about 2:1 and about 10:1, or between about 5:1 and about 10:1.

Regions 315 can be of a variety of sizes. In some embodiments, the average of the cross-sectional diameters (calculated as a number average) of the plurality of regions can be between about 10 nm and about 10 microns, between about 100 nm and about 5 microns, or between about 0.5 microns and about 2 microns. In some embodiments, at least about 50%, at least about 75%, at least about 90%, at least about 95%, or at least about 99% of regions 315 can have cross-sectional diameters within these ranges. The cross-sectional diameter of a cylindrical region corresponds to the diameter of the cylinder. The cross-sectional diameter of a non-cylindrical region (e.g., hole) corresponds to the diameter of a cylinder having the same volume and the same depth (measured parallel to the thickness of the layer in which the region is formed) as the non-cylindrical region.

Regions 315 can be spaced apart from each other periodically or aperiodically. In some embodiments, the average of the nearest neighbor distances between regions 315 can be between about 10 nm and about 100 microns, between about 100 nm and about 10 microns, or between about 0.5 microns and about 2 microns. The nearest neighbor distance for a first region is calculated as the distance between the center of the first region and the center of the nearest region proximate the first region. For example, in the set of embodiments illustrated in FIG. 3A, dimension 330 is used to indicate the nearest neighbor distance between regions 315A and 315B. The average of the nearest neighbor distances of multiple regions is calculated as the number average.

The 2-dimensionally periodic photonic crystals described above can include any suitable type of material. In some cases, the 2-dimensionally periodic photonic crystal can be formed of a material or combination of materials that, in the absence of regions 315, would reflect at least a portion of the wavelengths of electromagnetic radiation that are emitted by the emitter when regions 315 are incorporated. Examples of materials that can be used to form the 2-dimensionally periodic photonic crystal include, but are not limited to, metals (e.g., tungsten (e.g., single-crystal tungsten), tantalum, platinum, palladium, silver, gold, etc.), semiconductors (e.g., silicon, germanium, etc.), or dielectrics (e.g., titania, zirconia).

In some embodiments, all or part of the 1-dimensionally periodic photonic crystal and/or the 2-dimensionally periodic photonic crystal can be made from a refractory metal (e.g., niobium, molybdenum, tantalum, tungsten, osmium, iridium, ruthenium, zirconium, titanium, vanadium, chromium, rhodium, hafnium, and/or another refractory material. The use of refractory materials can allow one to fabricate a photonic crystal that is capable of withstanding relatively high temperatures (e.g., at least about 1000° C., at least about 1500° C., or at least about 2000° C.). In some embodiments, all or part of the 1-dimensionally periodic photonic crystal and/or the 2-dimensionally periodic photonic crystal can be made of compounds such as tungsten carbide, tantalum hafnium carbide, and/or tungsten boride. In some embodiments, all or part of the 1-dimensionally periodic photonic crystal and/or the 2-dimensionally periodic photonic crystal can be made from noble metals, including noble metals with high melting points (e.g., platinum, palladium, gold, and silver), diamond, and/or cermets (i.e., compound metamaterials including two or more materials (e.g., tungsten and alumina) which can be, in some embodiments, broken up into pieces smaller than the wavelength of visible light). In some embodiments, all or part of the 1-dimensionally periodic photonic crystal and/or the 2-dimensionally periodic photonic crystal can be made from a combination of two or more of these materials.

In some embodiments, a metal (e.g., tungsten, platinum) can be positioned between the photonic crystal and the base of the emitter. For example, emitter 250 in FIG. 2B includes metal layer 260 positioned between base 212 and photonic crystal 252. In some embodiments, the metal can be a thin film (e.g., with an average thickness of less than about 100 microns, less than about 10 microns, or less than about 1 micron). In some embodiments, the metal can have an average thickness of between about 1 nm and about 1000 nm, or between about 1 nm and about 500 nm.

In some embodiments, a capping material can be positioned on the outermost surface of the photonic crystal. For example, emitter 250 in FIG. 2B includes capping layer 262 positioned adjacent photonic crystal 252. The capping material can include any suitable type of material (e.g., silicon dioxide, silicon nitride, tungsten nitride, etc.). In some embodiments, the capping material can be transparent to infrared electromagnetic radiation. In some embodiments, the capping material can be a thin film (e.g., with an average thickness of less than about 100 microns, less than about 10 microns, or less than about 1 micron). In some cases, the capping material can have an average thickness of between about 10 nm and about 100 microns, between about 10 nm and about 10 microns, 100 nm and about 100 microns, or between about 100 nm and about 10 microns.

In some embodiments, a filter can be positioned between the emitter and the TPV cell(s). The filter can be constructed and arranged such that some electromagnetic radiation (e.g., radiation with an energy larger than the electronic bandgap of the TPV cell(s)) is transmitted through the filter to the TPV cell(s), while other electromagnetic radiation (e.g., radiation with an energy smaller than the electronic bandgap of the TPV cell(s)) is reflected from the filter back toward the emitter. The filter can be positioned at any suitable location between the emitter and the TPV cell(s). For example, in some embodiments, the filter can be in physical contact with the TPV cell(s) and can be separated from the emitter, as illustrated in FIG. 1. In other cases, the filter can be in physical contact with the emitter and separated from the TPV cell(s), or can be separated from both the emitter and the TPV cell(s).

The filter can comprise, in some instances, a photonic crystal including 1-dimensional periodicity. The design of the filter can include any of the properties described above with respect to the 1-dimensionally periodic photonic crystal associated with the selective emitter. In some embodiments, the selective emitter and the filter can be constructed and arranged such that the selective emitter suppresses the emission of a first range of wavelengths of electromagnetic radiation and the filter reflects a second range of wavelengths of electromagnetic radiation such that a third range of wavelengths of electromagnetic radiation is incident on the TPV cell(s). As a specific example, the emitter can be constructed and arranged such that at least about 90%, at least about 95%, or at least about 99% of the electromagnetic radiation emitted by the emitter has a wavelength of less than about 3 microns or between about 4.5 microns and about 7 microns. In some such cases, the filter can be constructed and arranged to reflect at least about 90%, at least about 95%, or at least about 99% of the electromagnetic radiation with a wavelength of between about 4.5 microns and about 7 microns.

A variety of TPV cells are suitable for use in the systems and methods described herein. In some embodiments, the TPV cell(s) can have a low bandgap (e.g., less than about 0.7 eV). The TPV cell(s) can include any suitable material such as, for example, GaInAsSb (e.g., InGaAsSb on GaSb), Zn-diffused GaSb, InGaAs (e.g., InGaAs on InP), and the like. Moreover, individual TPV cell(s) can be of any suitable size, and multiple TPV cells can be arranged to form an array of any suitable size. For example, in some embodiments, the TPV cells (e.g., a single TPV cell, or a TPV cell within an array) can be constructed and arranged to produce no more than about 15 W, no more than about 5 W, no more than about 1 W, no more than about 100 mW, or between about 10 mW and about 15 W of power. One of ordinary skill in the art would be capable of selecting an appropriate TPV cell and arranging multiple cells in an appropriately sized array for a given power generation application.

In some embodiments, a voltage can be applied to the TPV cell(s) to increase the power output by the TPV cell(s). The efficiency of the TPV system can be improved, in some embodiments, by adjusting the voltage applied to the TPV cell(s). In many instances, the power produced by the TPV cell can vary depending on the voltage applied to the TPV cell. The voltage at which the maximum power can be extracted can change with changes in operating conditions such as incident irradiation and cell junction temperature. In some cases, the TPV generation system can include one or more controllers that can be used to determine an applied voltage at which power generation is enhanced. For example, in the set of embodiments illustrated in FIG. 1, system 100 includes control systems 114. In some cases, control systems 114 can be used to substantially continuously determine the applied voltage at which the maximum power can be extracted from the TPV cell(s).

In some embodiments, the control system can be used to alter (e.g., increase or decrease) the voltage applied to the TPV cell(s). After the applied voltage is altered, the power produced by the TPV cell(s) can be determined (e.g., by measuring the current flowing through and/or the voltage applied to the TPV cell(s)). The controller can then, in some instances, determine whether the power produced by the TPV cell(s) increased or decreased in response to the change in applied voltage. In some such embodiments, if the power produced by the TPV cell(s) increases, the applied voltage may be further increased (e.g., when the preceding adjustment was an increase in applied voltage) or further decreased (e.g., when the preceding adjustment was a decrease in applied voltage), for example, until the power produced decreases. In some such cases, if the power produced by the TPV cell(s) decreases upon altering the applied voltage, then the applied voltage may be altered in the opposite direction relative to the previous change. (e.g., decreased when the preceding change was an increase in applied voltage, increased when the preceding change was a decrease in applied voltage). A maximum power output point can be located, after which the applied voltage may stabilize, where it can oscillate, for example, within a range of voltages the magnitude of which can be twice the magnitude of the voltage adjustment steps. In some embodiments, the controller can determine the initial starting applied voltage by performing a sweep of applied voltages upon starting operation of the TPV cell, and recording the applied voltage corresponding to the maximum output power observed.

In some instances, the voltages applied across multiple TPV cells can be altered independently. For example, a first voltage applied to a first TPV cell (e.g., using a first controller) can be altered independently from a second voltage applied to a second TPV cell (e.g., using a second controller). Accordingly, in some cases, the voltage applied to the first TPV cell can be increased by the first controller while the voltage applied to the second TPV cell can be decreased by the second controller, or vice versa. In other cases, the first and second applied voltages can both be increased or decreased. In some embodiments, third, fourth, fifth, or more voltages applied to third, fourth, fifth, or more TPV cells can be independently altered. The ability to independently alter the voltages applied to multiple TPV cells can be useful in enhancing the total amount of power generated by the collection of cells. For example, in many TPV applications, the irradiation of the TPV cell array can be non-uniform. This may occur, for example, if the TPV cell array is positioned relatively far from the emitter and/or if the distance between the TPV cell array and the emitter changes. In addition, the temperature distribution across the burner surface can be non-uniform. This can lead to situations in which one TPV cell in the array has a photocurrent that is larger than the other photocurrents in the other TPV cells in the array. The TPV cells with relatively high photocurrents can produce relatively more current than the TPV cells with relatively low photocurrents. However, for many applications, the total current extracted from the array may be limited to the current produced in the least irradiated cell. In some such cases, the other cells (with relatively high photocurrents) can operate at a cell current that is below their peak current, resulting in a total output power that may be substantially lower than the maximum achievable power. However, if the applied voltages to each of the cells are altered independently, the power produced by each cell can be independently enhanced, leading to an overall enhancement of the total power generated by the array.

Communication between the TPV cell(s) and the controllers (e.g., to transmit a signal indicating the desired applied voltage, to measure current, to measure power, etc.) can be achieved using any suitable method. In the set of embodiments illustrated in FIG. 1, control systems 114 communicate with TPV cells 111 via communication links 130. The communication links can be wired or wireless, and one of ordinary skill in the art would be capable of selecting an appropriate communication link for a given application.

In some embodiments, an energy generation system comprising an emitter comprising a combustor and one or more TPV cells can be used to achieve a relatively high overall conversion efficiency at a relatively low temperature. As used herein, the overall conversion efficiency is defined as $$\varepsilon_{overall} = \frac{P_{PV}}{P_{net,available}} \cdot 100\% \quad [3]$$

wherein $P_{PV}$ is the power output by the PV cell, and $P_{net,available}$ is the net power available to the emitter. The calculation of the net power available to the emitter is based upon the type of emitter used. For example, when a combustor is used as the emitter, the net power available to the emitter is defined as:

$$P_{net,available} = \dot{m}_{fuel} \cdot LHV_{fuel} \quad [4]$$

wherein $m_{fuel}$ is the mass flow rate of the fuel fed to the combustor and $LHV_{fuel}$ is the lower heating value of the fuel.

When the sun is used to heat the emitter, the net power available to the emitter is defined as:

$$P_{net,available} = A_{optics} \cdot 1 \text{ kW/m}^2 \quad [5]$$

wherein $A_{optics}$ is the area of the optical concentrator and 1 kW/m$^2$ is the area normalized average radiative intensity of the sun on the earth at sea level.

When a radioactive isotope is used to heat the emitter, the net power available to the emitter is defined as:

$$P_{net,available} = E \cdot \lambda \cdot N \quad [6]$$

wherein E is the free energy liberated per nuclear reaction, $\lambda$ is the decay rate, and N is the number of reactive nuclei present.

In some cases, an emitter comprising a combustor and one or more TPV cells can be used to produce overall conversion efficiencies of at least about 1%, at least about 5%, at least about 10%, at least about 20%, at least about 30%, at least about 40%, or at least about 44% at a temperature of less than or equal to about 1200 K. In some instances, an emitter comprising a combustor and one or more TPV cells can be used to produce overall conversion efficiencies of at least about 1%, at least about 5%, at least about 10%, at least about 20%, at least about 30%, at least about 40%, or at least about 44% at a temperature of less than or equal to about 1000 K.

In some embodiments in which the emitter includes a chemical reactor, the chemical reactor (e.g., combustor) can be microfluidic. "Microfluidic," as used herein, refers to a device, apparatus or system including at least one fluid channel having a largest cross-sectional dimension of less than about 1 mm, and a ratio of length to largest cross-sectional dimension perpendicular to the channel of at least 3:1. As used herein, the "cross-sectional dimension" of a channel is measured substantially perpendicular to the direction of fluid flow. A "microfluidic channel" or a "microchannel" as used herein, is a channel meeting these criteria. In one set of embodiments, all fluid channels (e.g., within the emitter) can be microfluidic.

The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more. In some cases the dimensions of the channel may be chosen such that fluid is able to freely flow through the article or substrate. The dimensions of the channel may also be chosen, in some cases, to allow a certain volumetric or linear flow rate of fluid in the channel. In some embodiments, the length of the channel may be selected such that the residence times of the fluid at a predetermined flow rate is sufficient to achieve a desired rate of reaction within the channel (e.g., to produce a desired temperature in an emitter). Of course, the number of channels and the shape of the channels can be varied by any method known to those of ordinary skill in the art. In some cases, more than one channel may be used. In some embodiments, the channel(s) can include one or more materials (e.g., on the surface in the channel(s) or within the volume of the channel(s)) that can catalyze one or more chemical reactions (e.g., a combustion reaction).

A variety of design parameters can be incorporated into the emitter to limit the amount of thermal energy that is lost from the system. In some embodiments, connections (e.g., fluidic connections) between the emitter and a support to which it is connected comprise relatively low thermal conductivity materials. For example, when the emitter comprises a chemical reactor, and the emitter is connected to a support structure via fluidic conduits, the conduits can comprise silicon dioxide, silicon nitride, and the like. In addition, the conduits can be designed to include relatively long lengths and/or relatively thin walls. Convective losses from the emitter can be reduced, in some cases, by vacuum packaging the emitter. Exemplary methods for achieving such thermal isolation are described, for example, in U.S. Pat. No. 6,939,632 to Arana, et al., entitled "Thermally efficient micromachined device," which is incorporated herein by reference in its entirety.

A variety of materials and methods, according to certain aspects of the invention, can be used to form systems, including microfluidic systems, described herein. In some embodiments, various components can be formed from solid materials, in which materials (e.g., layers of materials) and/or channels (e.g., microfluidic channels) can be formed via micromachining, film deposition processes such as spin coating and chemical vapor deposition, laser fabrication, photolithographic techniques, etching methods including wet chemical or plasma processes, electrochemical processes, and the like. See, for example, *Scientific American,* 248:44-55, 1983 (Angell, et al). In one set of embodiments, at least a portion of the photonic crystal materials and/or channels within the emitter can be formed by etching features into a substrate such as a semiconductor substrate (e.g., silicon, germanium, etc.) or a metal substrate (e.g., aluminum, steel, copper, tungsten, and the like). Technologies for precise and efficient fabrication of various material layers and/or fluidic systems and devices described herein are known.

The following patent applications are incorporated herein by reference in their entirety for all purposes: U.S. Provisional Patent Application No. 61/347,295, filed May 21, 2010, and entitled "Thermophotovoltaic Energy Generation."

The following examples are intended to illustrate certain embodiments of the present invention, but do not exemplify the full scope of the invention.

Example 1

This example describes determination of conditions under which thermophotovoltaic (TPV) system performance is enhanced in an embodiment of the inventive system. In this example, two thermophotovoltaic systems were chosen and system parameters were adjusted to enhance system performance (with constraints): micro-TPV generators and solar thermal TPV systems. This example demonstrates that appropriately chosen figures of merit can be increased by over an order of magnitude in both cases, illustrating the tremendous promise of this approach.

The performance of the structures discussed in this example was studied via a combination of optical and thermal models. Two tools were used to compute the optical properties of these structures, particularly focusing on absorptivity. For relatively simple 1D and 2D structures with dispersion, the absorptivity was computed as a function of wavelength using a transfer matrix method implemented within a freely available software package developed at the University of Ghent called CAMFR. (See P. Bienstman, "Rigorous and efficient modeling of wavelength scale photonic components," Ph.D. thesis, University of Ghent, Belgium (2001)) It was assumed that incoming plane wave radiation is applied from a single direction in air at normal incidence, and fields are propagated through each layer of the structure to yield reflectance R and transmittance T at every wavelength. The absorptivity is then given by $A=1-R-T$. For more complex 3D structures, a finite difference time-domain (FDTD) simulation was employed via a freely available software package developed at MIT, known as Meep. (See A. F. Oskooi, et al., "MEEP: A flexible free-software package for electromagnetic simulations by the FDTD method," *Comp. Phys. Comm.* 181, 687-702 (2010)). Again, it was assumed that a plane wave was sent from the normal direction, and time-stepping was employed to propagate it through space. Computational planes were defined at the front and back of the computational cell, and at each point along both planes, the electric and magnetic fields were Fourier-transformed via integration with respect to preset frequencies at each time-step. At the end of the simulation, the Poynting vector was calculated for each frequency and integrated across each plane, which yielded the total transmitted and reflected power (first subtracting the incident-field Fourier transforms for the latter) at each frequency. These numbers can then be divided by the same quantity calculated for fields in vacuum, in order to yield the total reflectance, transmittance, and absorptivity of the dielectric structure as a function of wavelength.

In order to capture material dispersion, the c-Si regions were modeled with a complex dielectric constant that depended on wavelength, as in C. Herzinger, et al. "Ellipsometric determination of optical constants for silicon and thermally grown silicon dioxide via a multi-sample, multi-wavelength, multi-angle investigation," *J. Appl. Phys.* 83, 3323-3336 (1998). The lower-index dielectric materials considered in this example generally had very large band gaps; thus, their dispersion and absorption was generally negligible over the range of wavelengths considered, and therefore were neglected. Errors could also arise due to discretization and reflection due to the finite thickness of the absorbing boundaries (implemented with perfectly matched layers); however, both of these errors were determined to be quite small. Apart from these approximations, the calculation methods for the optical properties were substantially exact. It was also confirmed that the two methods agreed well when applied to sample 1D and 2D problems, even in the presence of dispersion.

The emissivity of each structure could then be calculated from the absorptivity computed by CAMFR and/or Meep via Kirchhoff's law of thermal radiation, which states that the two quantities must be equal at every wavelength for a body in thermal equilibrium.

The figure of merit, as defined below for each physical system, was calculated and parameters were systematically adjusted. A global maximum was found through the application of the multi-level single-linkage (MLSL), derivative-based algorithm using a low-discrepancy sequence (LDS), as described in S. Kucherenko et al., *Computational Optimization and Applications* 30, 297-318 (2005). This algorithm executes a quasi-random (LDS) sequence of local searches using constrained optimization by linear approximation (COBYLA), with a clustering heuristic to avoid multiple local searches for the same local minimum. Other global search algorithms, such as DIRECT-L (see J. M. Gablonsk, et al., *J. Global Optim.* 21(1), 27-37 (2001)), were used to verify that similar results were yielded after an equal or greater amount of computation. The ability to directly utilize and compare multiple computational packages on the same problem was provided by the NLopt package, freely available at http://ab-initio.mit.edu/nlopt.

Figure 4:
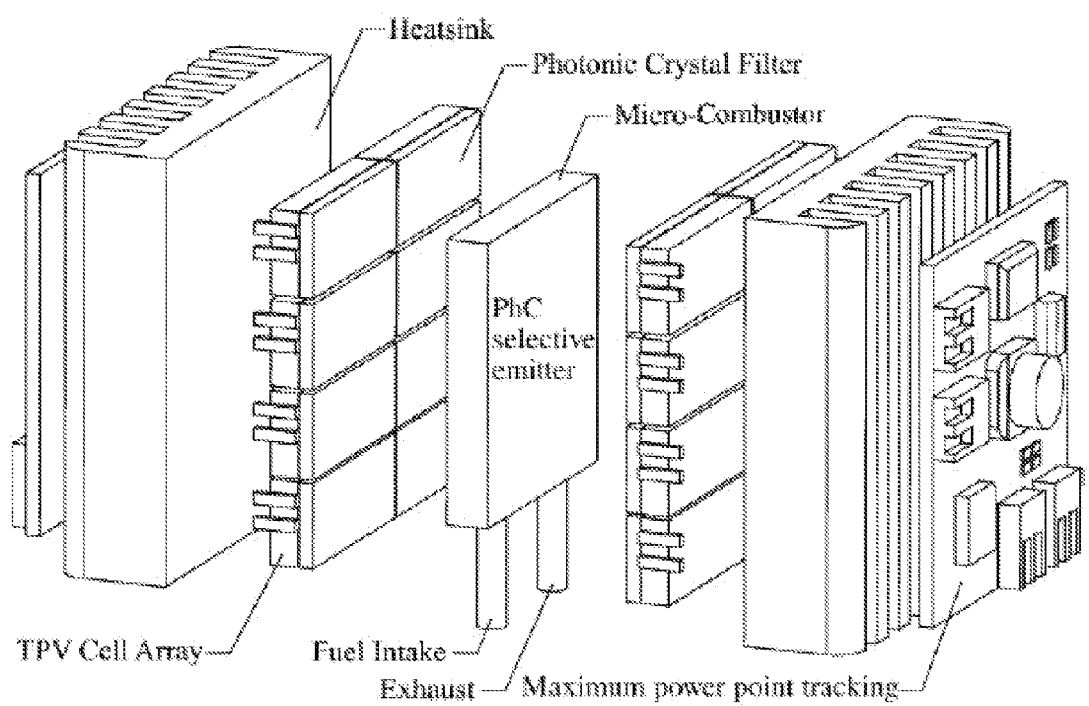
FIG. 4 includes an exemplary schematic illustration of a TPV energy generation system.

FIG. 4 includes a schematic illustration of the micro-TPV (µTPV) generator system studied in this example. The micro-TPV generator was designed to convert chemical energy stored in liquid fuel into electrical power within a form factor comparable to a matchbox. The µTPV generator was designed to operate as follows: hydrocarbon fuel (e.g., propane or butane) is fed with oxygen into a microchannel defined within a silicon structure. The inner surfaces of the microchannel are wash-coated with a 5% platinum (by weight) catalyst supported on γ-alumina (Sigma Aldrich). The hydrocarbon is catalytically combusted on the channel surface, releasing energy in the form of heat. Catalytic combustion is more stable at small scales than homogeneous combustion, with the latter being constrained by increased radical and thermal quenching at the walls. The micro-combustor is designed such that the heat loss to the environment through conduction and convection is small. The micro-combustor is described in detail in B. Blackwell, "Design, fabrication, and characterization of a micro fuel processor," Ph.D. thesis, Massachusetts Institute of Technology (2008). Thus, the majority of the heat is released as radiation, primarily in the infrared. Because of the external dimensions of the micro-combustor (1 cm×1 cm×1.3 mm), most of the radiation falls on the TPV cells positioned opposite the two large faces to directly convert the radiation into electrical power. Excess heat in the TPV cells is dissipated by air-cooled radiators on the external faces to surrounding heat sinks. Exhaust gases from the micro-combustor could potentially be used to pre-heat the inlet stream in a recuperator to improve the energy efficiency of the system. The electrical output is maximized in real time under changing conditions via low-power maximum power point tracking technology, as discussed in Example 3.

In order to produce enhanced performance, several system parameters can be adjusted in actual experimental use. First, the combustor material can be chosen such that a large portion of the radiation emitted by the combustor is capable of being converted into electricity by the TPV cell. In addition, the view factor, which is defined as the fraction of photons emitted in one hemisphere that are received by the TPV cell, can be increased as much as possible. Ideally, the system can be arranged to have a view factor of nearly 1.

In this example, the design parameters of the micro-combustor were chosen such that the product of the electrical power (per unit area) P and power conversion efficiency η of the system (the figure of merit for this problem FOM=ηP) is enhanced. This FOM was chosen because, although in principle efficiency η is very important, a space-constrained system also needs a high power density (which is directly related to a high volumetric energy density).

The power (per unit area) can be calculated by first obtaining the current density J(V), which is given by the following Equation 7:

$$J(V) = \int_0^\infty d\lambda \left[ \frac{2qc}{\lambda^4} \frac{\varepsilon(\lambda)EQE(\lambda)}{\exp(hc/\lambda kT)-1} \right] - \left[ \frac{q(n^2+1)E_g^2 kT_d}{4\pi^2 \hbar^3 c^2} e^{-E_g/mkT_d} + J_{nr} \right] (e^{qV/mkT_d} - 1), \quad [7]$$

where q is the elementary charge of a proton, k is Boltzmann's constant, h=2π$\hbar$ is Planck's constant, c is the speed of light, λ is the wavelength, EQE(λ) is the external quantum efficiency of the TPV device (experimentally determined to be approximately 82% above the bandgap), $\in$(λ) is the emissivity of the selective emitter, T is the temperature of the emitter, $E_g$ is the bandgap of the TPV device, m is the device ideality factor (experimentally determined to be 1.171), $T_d$ is the device temperature, n is the refractive index of the TPV semiconductor region, $J_{nr}$ is the dark current density induced by nonradiative recombination (experimentally determined to be 18 µA/cm$^2$), and V is the applied voltage. The output power was obtained by maximizing the electrical output power (per unit area) P=JV (i.e., by setting d(JV)/dV=0 and back-substituting V). The efficiency η was obtained by dividing P by the integrated radiative thermal emission:

$$P_{emit} = 2hc^2 \int_0^\infty d\lambda \dot{\in}(\lambda) / \{\lambda^5 [\exp(hc/\lambda kT) - 1]\} \quad [8]$$

Figure 5A:
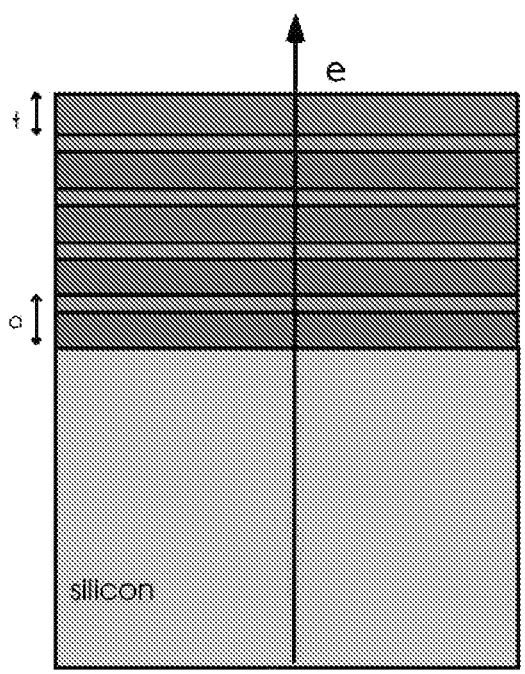
FIGS. 5A-5B include exemplary cross-sectional schematic illustrations of an emitter, according to one set of embodiments.

FIG. 5A includes a schematic diagram of the structure investigated. The structure includes b sub-micron bilayers of silicon and silicon dioxide added on top of a silicon wafer, with variable period a and chirping r (the ratio of the shortest to longest period, which is given by (1−r)/(1+r)). The chirping was introduced in order to broaden the range of reflected wavelengths, and was implemented via an exponential increase of the period from its lowest to highest value. The number of bilayers b was constrained to integer values between zero and five, in order to simplify fabrication. An extra cap layer of silicon dioxide was also introduced with a freely varying thickness t in order to adjust the phase of the emissivity spectrum. This gave rise to a total of four independent parameters (a, r, t, and b) for adjustment.

Figure 6:
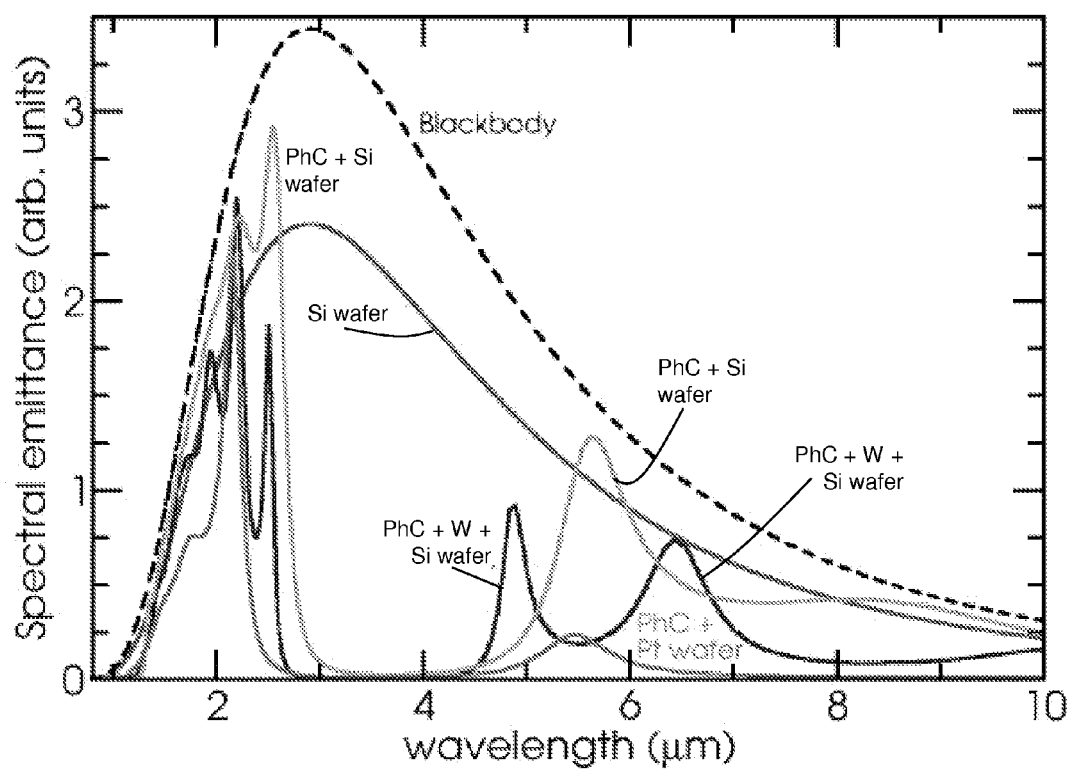
FIG. 6 includes a plot of spectral emittance as a function of wavelength, according to some embodiments.

FIG. 6 includes a plot of the spectral emittance of the emitter for various wavelengths. As shown in FIG. 6, substantial suppression of silicon emission could be achieved in the photonic bandgap region that extends approximately from 2.5 microns to 4.5 microns. At the same time, enhancement of the spectral emittance can take place for shorter wavelengths ($\lambda$<2.5 microns). After enhancement, the projected power generation of the layered structure rose to above 83.91 mW per cell, while the power generation efficiency approximately doubled to 2.042% (relative to a bare silicon wafer), representing an improvement in the overall figure of merit of 159%.

Figure 5B:
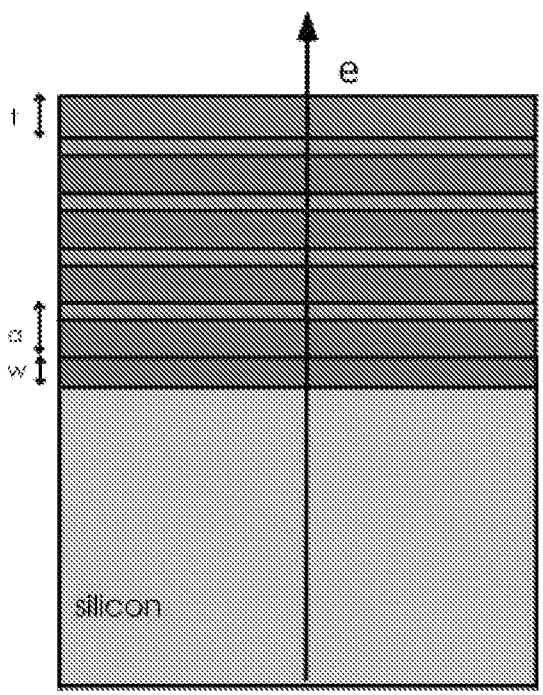

Adding a thin layer of tungsten (W) with variable thickness w immediately above the silicon substrate, as depicted in FIG. 5B, was projected to yield further performance enhancements. In particular, the projected power generation of the same TPV cell from before fell slightly to 69.01 mW per cell, while the power generation efficiency jumps dramatically to 2.912%, representing a cumulative improvement in the overall figure of merit of 204%.

Adding an optically thick layer of platinum in lieu of tungsten (with a width was in FIG. 5B) yielded the greatest performance enhancement; by decreasing the radiated power to 48.65 mW per cell, a dramatic efficiency improvement to 5.289% was achieved, for a 291% cumulative increase in the overall figure of merit relative to a plain silicon wafer. This data is summarized in Table 1.

TABLE 1

Predicted efficiency, power generation, and overall product figure of merit values for multiple μTPV emitter designs at 1000K

| design | power generation | efficiency | FOM |
| --- | --- | --- | --- |
| plain silicon wafer | 67.77 mW | 0.975% | 0.6607 |
| Si wafer + 4 Si/SiO$_2$ bilayers | 83.91 mW | 2.042% | 1.713 |
| Si wafer + W + 4 Si/SiO$_2$ bilayers | 69.01 mW | 2.912% | 2.010 |
| Pt wafer + 2 Si/SiO$_2$ bilayers | 48.85 mW | 5.289% | 2.584 |

(view factor F = 0.4)

Further improvements are projected to be possible via improvements in the temperature of operation and the view factor. For example, improving the view factor from 0.4 to the maximum value of 1 would produce a projected efficiency of the optimized platinum-based structures to 13.22%. Furthermore, raising the temperature from 1000 K to 1200 K would produce a further increase in efficiency to 21.7%. It should be noted, however, that this efficiency neglects possible increases in the relative contributions of other losses such as convection, conduction, and enthalpic losses. Nonetheless, this represents a 20-fold improvement in efficiency over the initial silicon wafer design, and compares reasonably well with the theoretical maximum efficiency of 53.0% calculated for an idealized step-function emitter and single-junction photovoltaic material with identical cutoff wavelengths of $\lambda$=2230 nm, which is only subject to radiative recombination. (See, C. Henry, "Limiting efficiencies of ideal single and multiple energy gap terrestial solar cells," *J. Appl. Phys.* 51, 4494-4500 (1980)). The remaining differences in efficiencies therefore originate primarily from remaining wasted emission in the near-infrared in the platinum-based design, as well as slightly lower open-circuit voltages and fill factors caused by nonradiative recombination (primarily from bulk defects).

The structures in the above section may be characterized by gaps of emission in the mid-wavelength infrared (viz., 5-20 microns). One approach to suppressing these wavelengths is to combine a long-wavelength plasma filter in series with the aforementioned quarter-wave stack design. However, these filters can have certain limitations of measurable (if improved) transmission for wavelengths beyond 6 microns, as well as lack of desirable performance characteristics at temperatures of 363 K and above. The other approach taken in this example of chirping the period can, in some cases, induce higher-order reflections that may in certain cases suppress radiation at short wavelengths desirable for TPV power generation. However, the introduction of rugate filters can help suppress these higher-order reflections in a robust fashion. The principle behind rugate filters is to create a refractive index profile in optical thickness space that varies sinusoidally, so as to create a single pure Fourier component to which incoming light can couple. The lack of higher-order Fourier modes thus reduces reflection at higher frequencies. Thus, the introduction of rugate filters has the potential to increase efficiencies toward their theoretical single-junction limits. Because continuously varying refractive indices may be challenging to fabricate (in certain embodiments they may be fabricated with nanoporous materials), the simulations described in this example discretized each half-period a/2 of the sinusoid into m equal-thickness layers l=0, . . . , m−1 piecewise constant index:

$$n_l=(n_{min}+n_{max})/2+[(n_{min}-n_{max})/2] \sin [\pi l/(m-1)] \quad [9]$$

Figure 7:
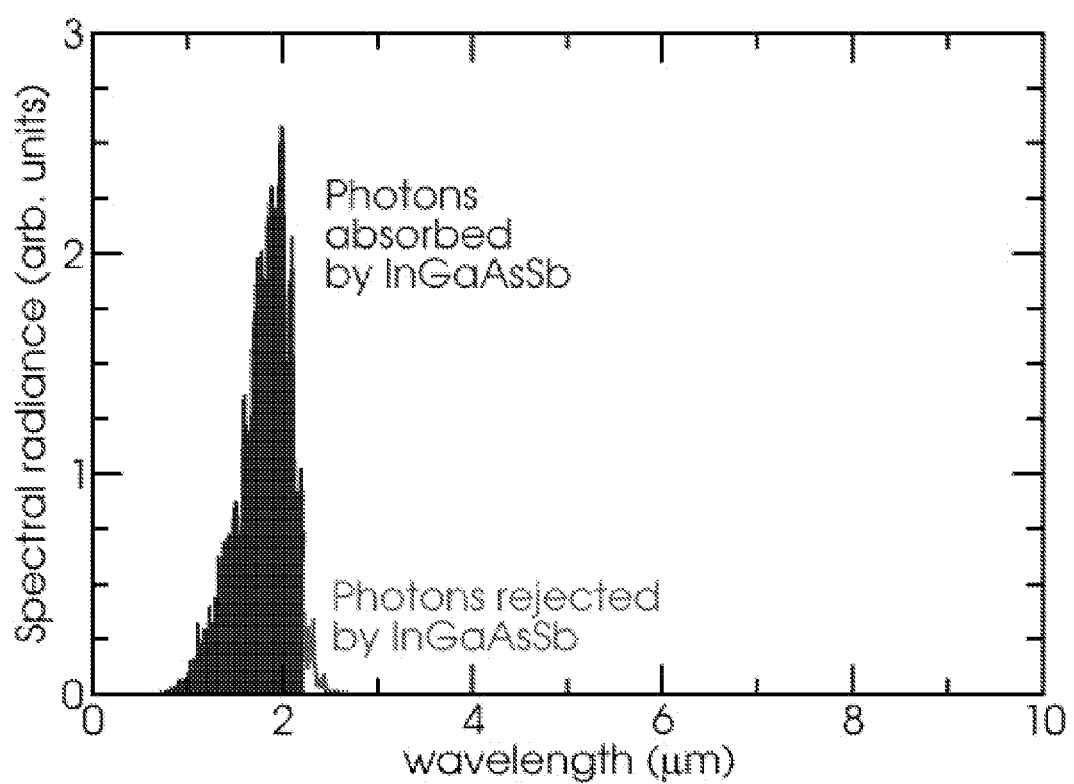
FIG. 7 includes an exemplary plot of spectral radiance as a function of wavelength.

The procedure described below was able to enhance the efficiency of an emitter operating with a view factor of 1 at 1200 K with a model of a TPV cell (with bandgap energy $E_g$=0.547 eV, corresponding to a wavelength of 2230 nm. The independent parameters were the same four as for the first silicon/silicon dioxide chirped 1D photonic crystal, with the number of materials in the rugate filter held constant at m=6 and refractive indices ranging from 1.5 to 3.5. However, for this determination, the maximum number of periods was increased to 40. Under these assumptions, an enhanced efficiency of 26.2% was observed, representing a 21% improvement in relative efficiency compared to the best performance of the platinum structure. However, the spectrally averaged emittance for wavelengths below the bandgap remained relatively modest, at 45.6% (corresponding to a power density of 319 mW/cm$^2$). FIG. 7 includes a plot of the calculated spectral emittance exhibited by the arrangement in which the chirped rugate filter was used. Emitted photons with wavelengths above about 2.23 microns (depicted in blue) would be capable of being absorbed by the InGaAsSb TPV device.

Figure 8:
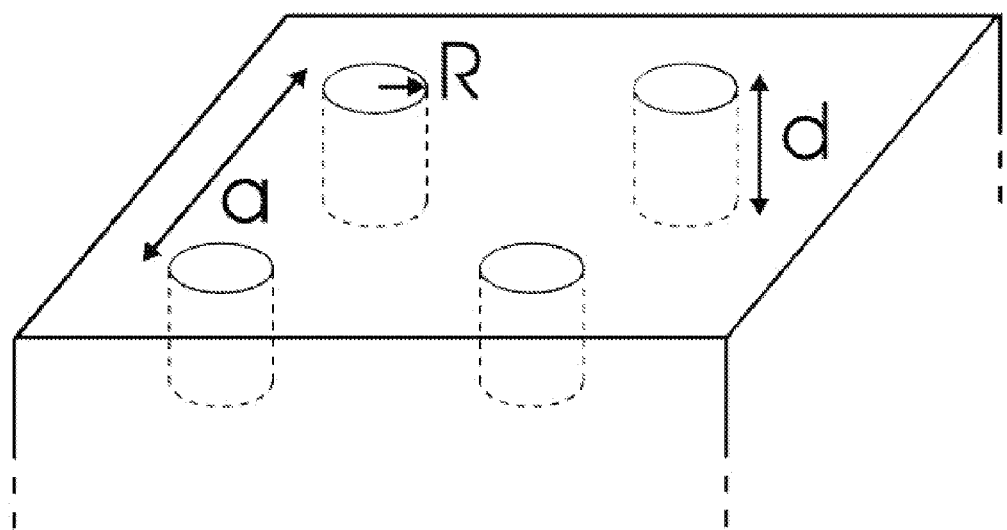
FIG. 8 includes an exemplary schematic illustration of a 2-dimensionally periodic photonic crystal.

While the previous emitter design based on chirped rugate filters exhibited increased power conversion efficiency for realistic emitter and diode designs, it may also be of interest to improve other characteristics of the structure. In particular, the total emittance (integral of the product of emissivity and the spectral emittance of a blackbody) and thus the electric power generated as well as power density can be improved, along with the tolerance to off-angle emission, through the introduction of structures with 2-dimensional periodicity capable of supporting spatially localized resonances. A structure like the one illustrated in FIG. 8, for example, consisting of substantially cylindrical holes arranged in a two-dimensionally periodic array can support a number of resonances with a low-frequency cutoff in each cylindrical cavity. The resonances in adjacent holes can couple relatively weakly, forming a planar coupled-cavity waveguide. Furthermore, according to a nearest-neighbor interaction approximation (tight-binding), as the proximity and the coupling strength between resonances is increased, the bandwidth of the coupled cavity in-plane propagating modes becomes wider. Correspondingly, there can be a bandwidth of resonant absorption and emission, whose frequency can be tuned by adjusting the dimensions of the individual cylindrical resonators. This structure can offer the desirable features of high emissivity at short wavelengths and low emissivity at long wavelengths.

Figure 9A:
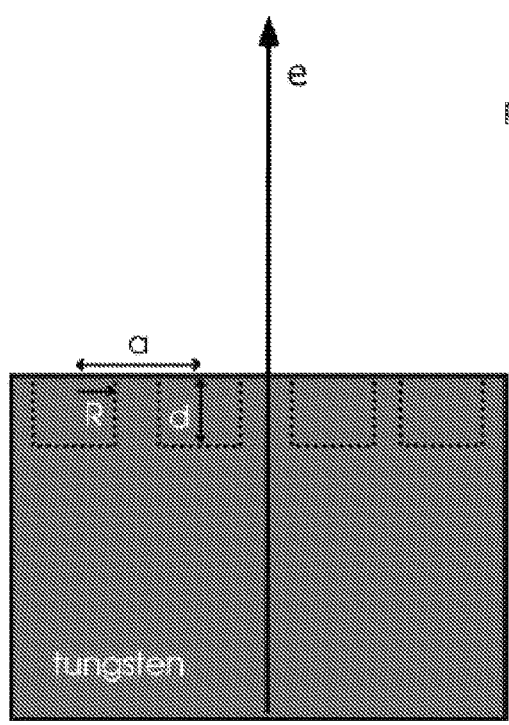
FIGS. 9A-9B include exemplary schematic illustrations of (A) a 2-dimensionally periodic photonic crystal and (B) a 2-dimensionally periodic photonic crystal and a filter.
Figure 9B:
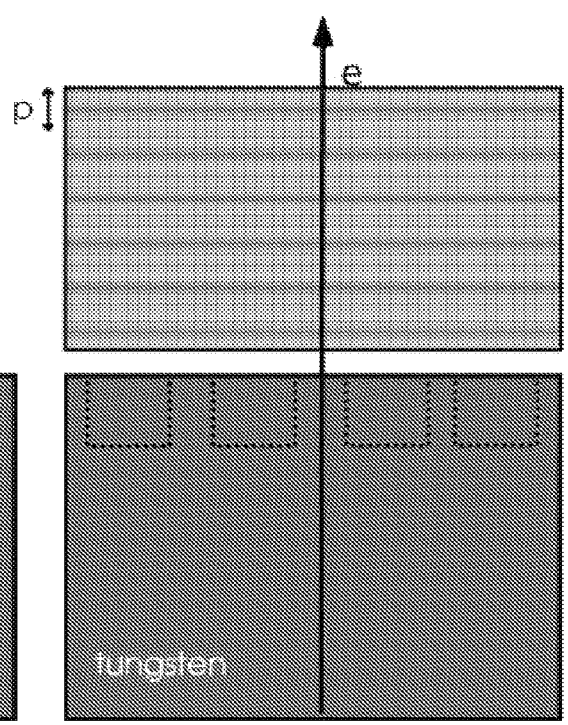
Figure 10:
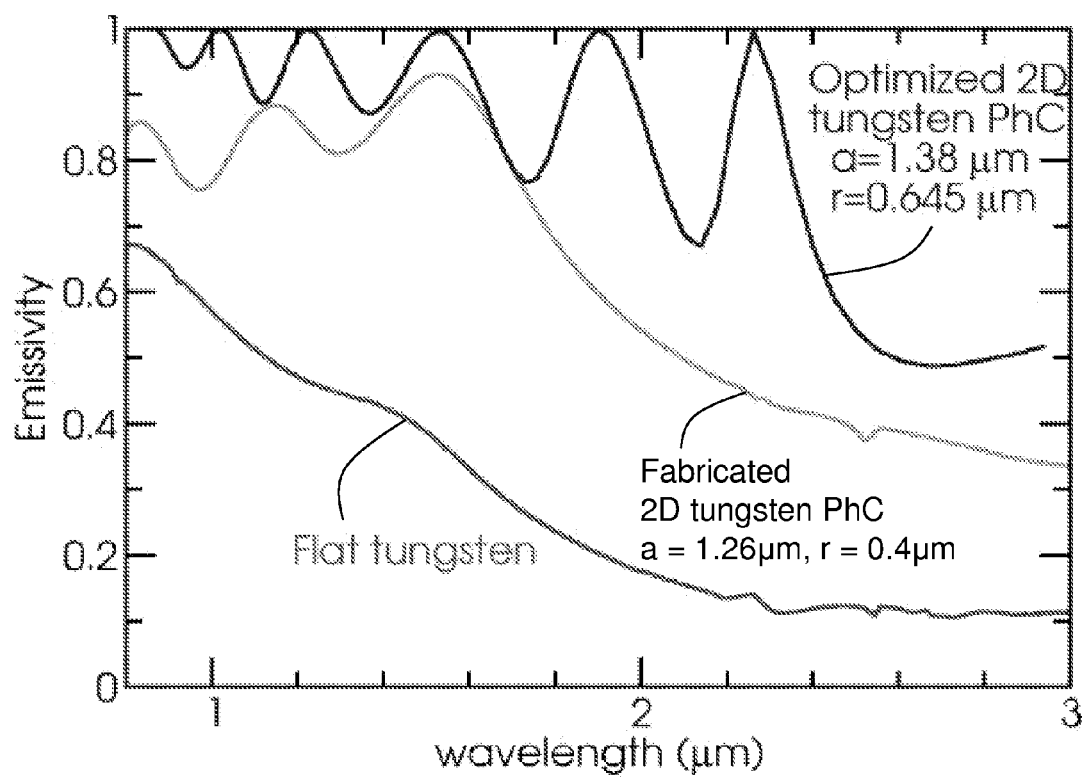
FIG. 10 includes a plot of emissivity as a function of wavelength, according to one set of embodiments.

Because of its promising features, the combination of a rugate filter placed on top of a tungsten 2-dimensional (2D) photonic crystal (PhC), separated by a small air gap (e.g., of at least about 10 microns), as depicted in FIG. 9A, was computationally investigated for enhancement of performance. This procedure included all of the independent parameters of the earlier rugate filter, plus three additional independent parameters for the 2D tungsten geometry (the radius, depth, and period of the cylindrical holes), for a total of seven independent parameters. In FIG. 10, the calculated emissivity is compared with the experimentally measured spectra of two comparative structures: a flat single-crystal tungsten wafer, and a 2D PhC with period a=1.26 microns and radius r=0.4 microns. The structure investigated had a larger period and radius than the latter structure, specifically a=1.38 microns and r=0.645 microns. This acted to red-shift the cutoff wavelength for the structure to a value appropriate for use in conjunction with a high-performing rugate filter and InGaAsSb TPV cell. The new cutoff of 2.3 microns was very close to the bandgap wavelength for the TPV material.

Figure 11:
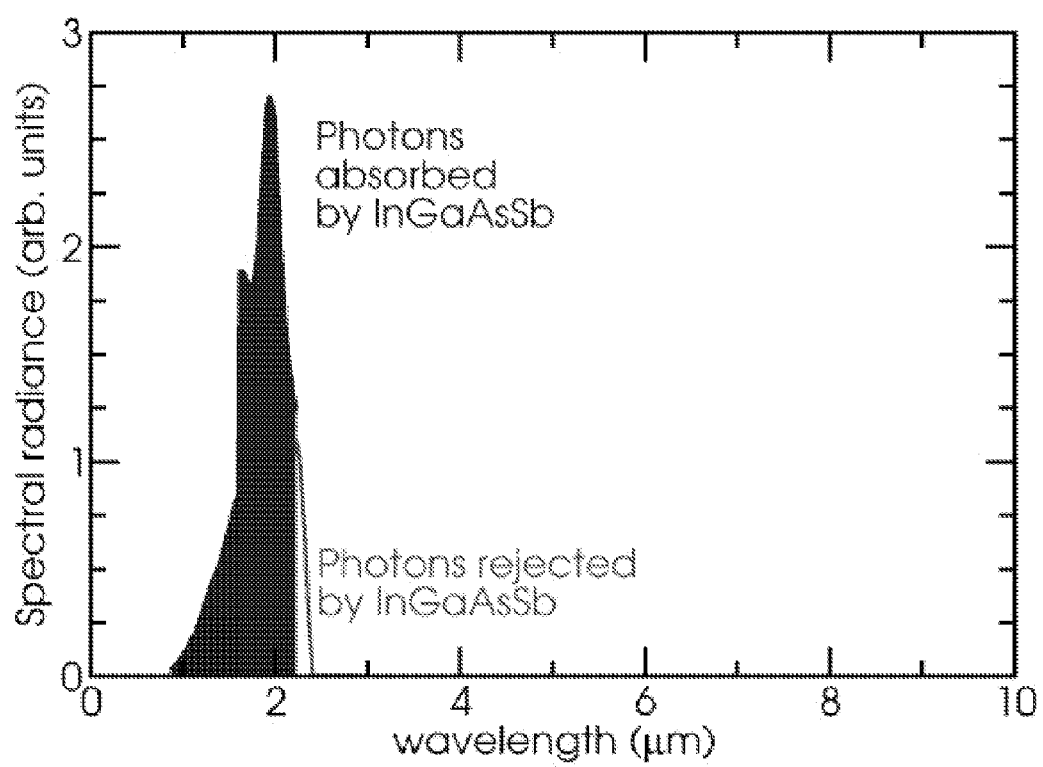
FIG. 11 includes an exemplary plot of spectral radiance as a function of wavelength, according to one set of embodiments.

Combining the 2D tungsten PhC with an rugate filter of the system investigated yielded the spectral emittance displayed in FIG. 11 (assuming F=1 and T=1200 K). It was found that the power conversion efficiency was approximately constant at 26.9%, while the average emittance for useful photons increased substantially, to 59.2%. This amounted to a 29.8% increase in power (per unit area) relative to the plain rugate filter by itself.

Figure 12:
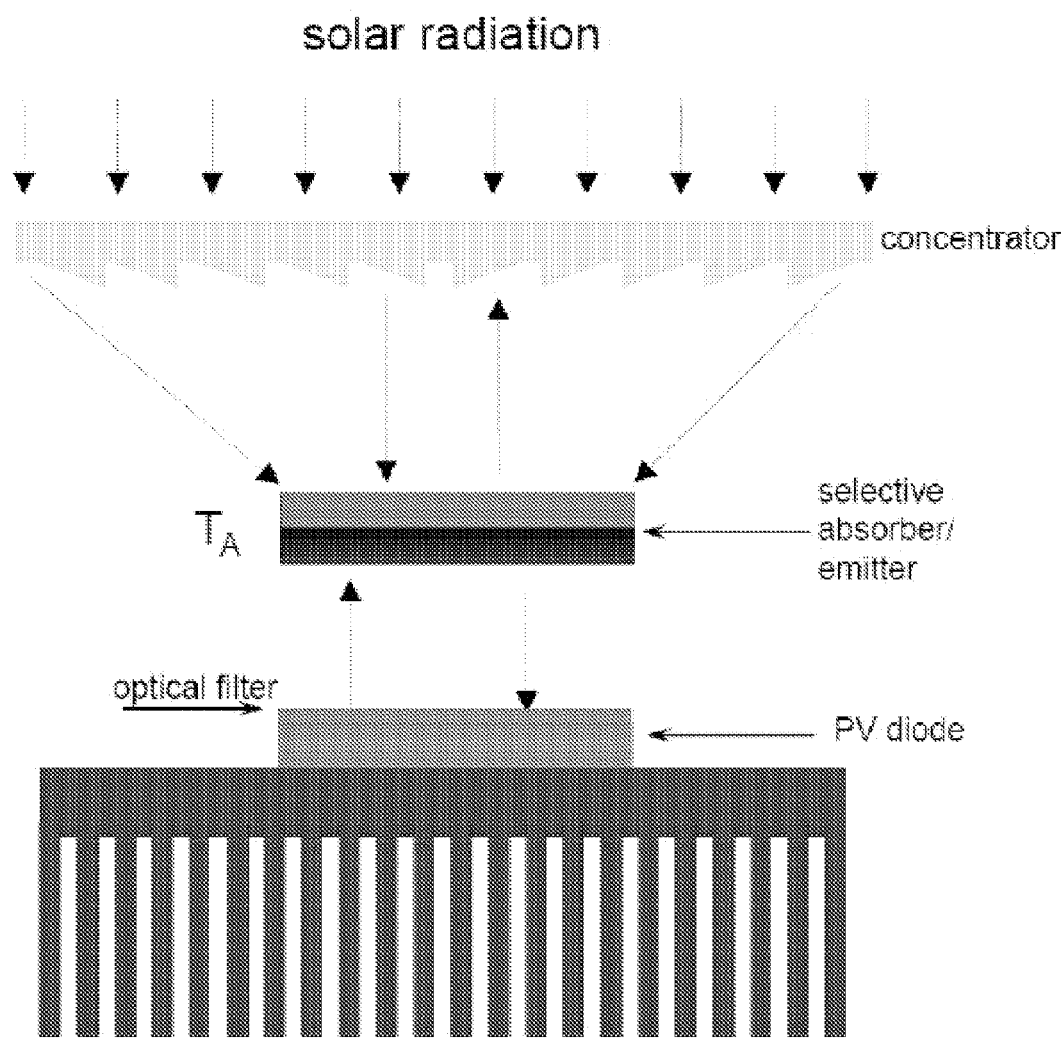
FIG. 12 includes a schematic illustration of a system, according to some embodiments, in which solar radiation is used to heat an absorber/emitter.

FIG. 12 includes a schematic illustration of a solar thermal TPV system, which is a variation on the standard TPV system in which optical concentrators, such as parabolic mirrors or Fresnel lenses, are used to concentrate sunlight onto a selective absorber and emitter structure. The selective absorber is a structure designed to absorb solar radiation (as measured by the AM1.5 solar spectrum), but suppress thermal radiation induced by heating of the same structure. They can be used as parts of various systems used to convert solar power into heat and/or electricity, such as solar water heaters, solar thermal power, and solar thermophotovoltaic power. The heated selective absorber can be thermally coupled to a selective emitter, which allows the latter to reach a temperature at which thermally radiated photons can closely match or exceed the semiconductor bandgap of the target TPV cell. The radiation can be subsequently passed through a filter, which recycles any low-energy photons, and then to the TPV cell, where electricity can be generated. In short, solar thermal TPV can use sunlight as a heat source to perform a similar basic physical conversion process described above in relation to the micro-combustor TPV system. From that perspective, the two halves of the overall solar thermal TPV system—the optical concentrator and selective absorber subsystem and the selective emitter and TPV cell subsystem—can be decoupled, with the output of the first half serving as input to the second half. In the following discussion, each half is independently examined, starting with the optical concentrator and selective absorber subsystem, and concluding with the selective emitter and TPV cell subsystem to determine conditions for improved performance.

There are multiple classes of structures designed specifically for selective absorption, such as intrinsic materials, semiconductor-metal tandems, multi-layer absorbers, metal-dielectric composite coatings, surface texturing, and coated blackbody-like absorbers. Metal-dielectric composites have great promise for high temperature applications (e.g., greater than about 400° C.), with spectrally averaged absorbance of 0.94 and emittance of 0.07 for a single layer of graded Ni—Al$_2$O$_3$ cermet on stainless steel with an SiO$_2$ AR coating at 500° C. Semiconductor-metal tandem structures, such as 0.5 micron germanium (Ge), 2.0 micron silicon, and an Si$_3$N$_4$ layer, which yields a weighted absorbance of 0.89 and emittance of 0.0545 at 500° C., can also be effective.

Improvements to the semiconductor-metal tandems were explored. The solar absorbance and thermal emittance at a given temperature were combined into a single figure of merit by measuring the thermal transfer efficiency $\eta_t$, which can be calculated according to the following equation:

$$\eta_t = \bar{\alpha} - \frac{\bar{\varepsilon}\sigma T^4}{CI} \quad [10]$$

where $\bar{\alpha}$ and $\bar{\varepsilon}$ are the spectrally averaged absorptivity and emissivity, respectively, of the selective surface, defined by:

$$\bar{\alpha} = \frac{\int_0^\infty d\lambda \varepsilon(\lambda)\frac{dI}{d\lambda}}{\int_0^\infty d\lambda \frac{dI}{d\lambda}} \quad [11A]$$

and $$\bar{\varepsilon} = \frac{\int_0^\infty d\lambda \varepsilon(\lambda)/\{\lambda^5[\exp(hc/\lambda kT)-1]\}}{\int_0^\infty d\lambda/\{\lambda^5[\exp(hc/\lambda kT)-1]\}} \quad [11B]$$

where $dI/d\lambda$ is the spectral light intensity of the sun per unit wavelength under standard test conditions, $\sigma$ is the Stefan-Boltzmann constant, T is the operating temperature, C is the solar concentration ratio, i.e., the ratio of observed intensity to the solar intensity I (generally considered to be 1 kW/m$^2$ under standard testing conditions).

With the objective function defined above, the performance of a perfect blackbody under certain conditions was examined and compared to a semiconductor-metal tandem structure such as germanium and silver. Next, a single front-coating layer was added, and finally a total of three dielectric layers in front and one behind were introduced. These latter three structures are displayed sequentially in FIG. 13A-C.

Figure 13A:
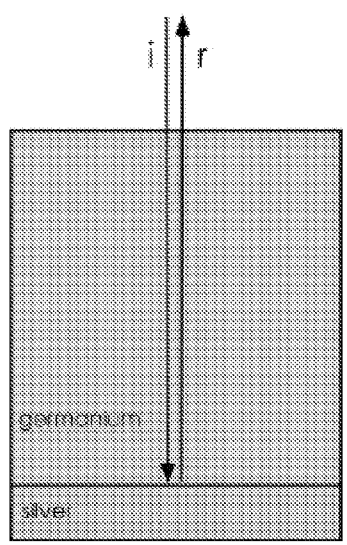
FIGS. 13A-13C include exemplary cross-sectional schematic illustrations of semiconductor-metal tandem structures.
Figure 13B:
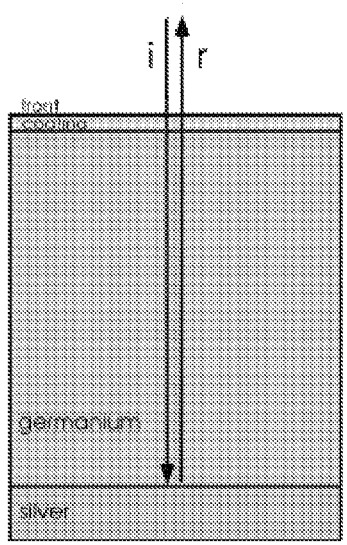
Figure 13C:
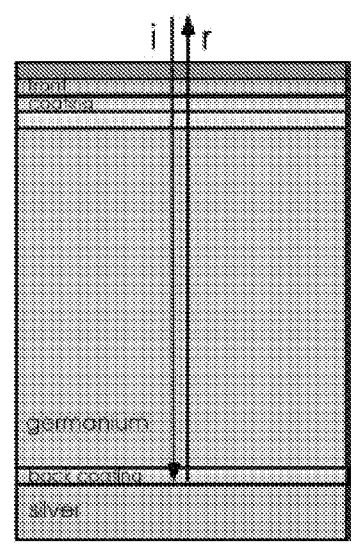
Figure 15:
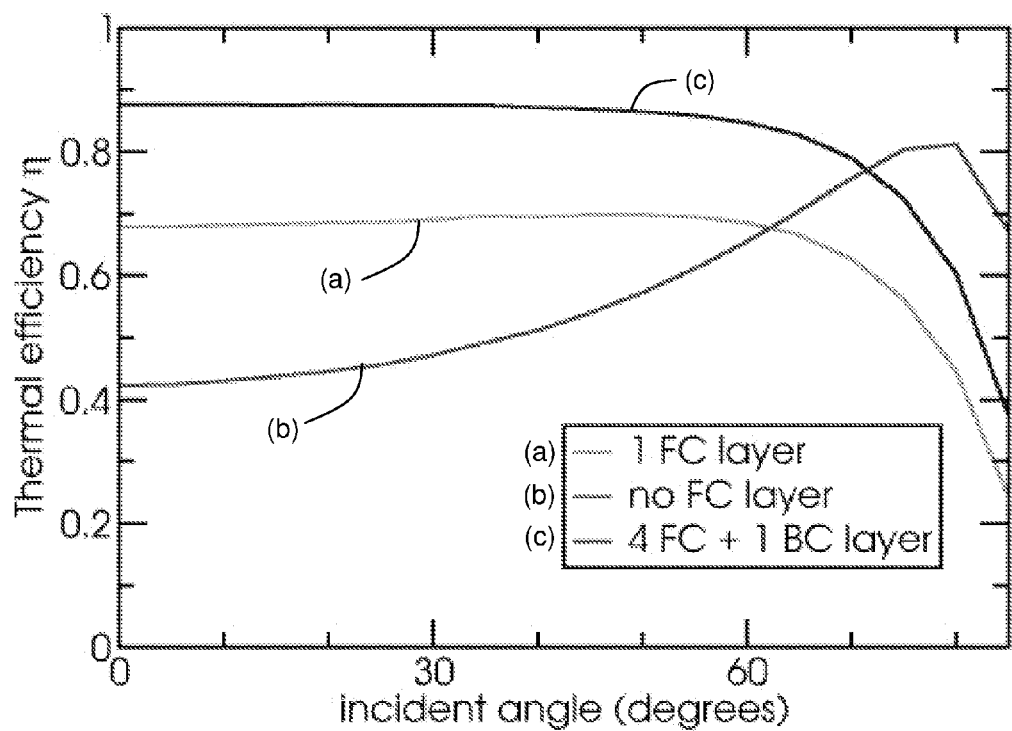
FIG. 15 includes an exemplary plot of thermal efficiency as a function of incident angle, according to some embodiments.

In this example, the designs of FIGS. 13A-C were investigated to enhance performance for unconcentrated sunlight at an absorber temperature T=400 K. The first design involves only two independent parameters: the refractive index of the front coating (ranging from 1.39 to 3.31) and its thickness (ranging up to 1 micron). The second design permitted independent variation in the refractive index and thicknesses within the same ranges as before, for a total of eight independent parameters. The results are illustrated in Table 2, and illustrate that a thermal transfer efficiency of zero for a perfect blackbody can be increased to 42.29% for germanium and silver (FIG. 13A), 67.82% with a single front coating layer (FIG. 13B), and 88.11% with three front coating layers plus one back coating layer (FIG. 13C). These designs include several advantages, including relatively high thermal stability, due to the elimination of aluminum-based cermet compounds displaying low melting points. FIG. 15 shows these designs are also robust to variation in incident angle of up to ±60°.

TABLE 2

Selective absorber data for operation under unconcentrated light at 400K.

| absorber geometry | $\bar{\alpha}$ | $\bar{\epsilon}$ (400K) | $\eta_t$ (1 sun@400K) |
|---|---|---|---|
| blackbody | 1.0 | 1.0 | 0.0 |
| $SiO_2$ + Ni—$Al_2O_3$ cermet [50] | 0.94 | 0.07 | 0.8271 |
| 3 layer Al—AlON cermet + $Al_2O_3$ AR [51] | 0.974 | 0.055 | 0.8853 |
| Ge + Ag | 0.5318 | 0.0675 | 0.4229 |
| 1 FC + Ge + Ag | 0.7871 | 0.0675 | 0.6782 |
| 4 FCs + Ge + 1 BC + Ag | 0.9074 | 0.0163 | 0.8811 |

In order to explore high-temperature applications, Varshni's formula for electronic bandgaps was used, which is:

$$E_g(T) = E_g(0) - \frac{\alpha T^2}{T + \beta} \quad [12]$$

where $E_g(0)$ is the bandgap at zero temperature, and $\alpha$ and $\beta$ are empirical constants determined by experiment. For crystalline silicon, $E_g(0)$=1.166 eV, $\alpha$=0.473 meV/K and $\beta$=636 K; thus, the bandgap at 1000 K is expected to be approximately 0.88 eV, with significant absorption extending down to 0.7 eV, a value appropriate for selective solar absorption.

The specific form of the dispersion of the complex dielectric function of silicon as a function of temperature was studied by C. Grein and S. John in *Phys. Rev. B* 39, 1140 (1989). This work illustrated that optical absorption can be modeled based on ab initio principles, and that there is an important connection between temperature and disorder. In particular, it is predicted that high temperatures will tend to smear out certain features over a broader frequency range. This approach can be used to predict the full dispersion relation at most temperatures below the melting point of the relevant material. The key prediction is that the imaginary part of the index will behave according to:

$$k(\omega) = \begin{cases} k_0 \exp[(\hbar\omega - E_f)/E_o], & \hbar\omega < E_f \\ k_0 \exp[(\hbar\omega - E_f)/\alpha E_o], & E_f \leq \hbar\omega < E_f + 2\alpha E_o \\ k_1 \exp[\beta(\hbar\omega - E_g - 2\alpha E_o)], & E_f + 2\alpha E_o \leq \hbar\omega < E_x \\ k_2 \sqrt{\hbar\omega - E_x}, & \hbar\omega \geq E_x \end{cases} \quad [13]$$

where $k_o$, $k_1$, $k_2$, $\alpha$, and $\beta$ are temperature-independent material parameters determined by experiment, and $E_o$, $E_g$, $E_f$, and $E_x$ are energies in the system displaying known empirically-determined temperature dependencies.

Figure 16:
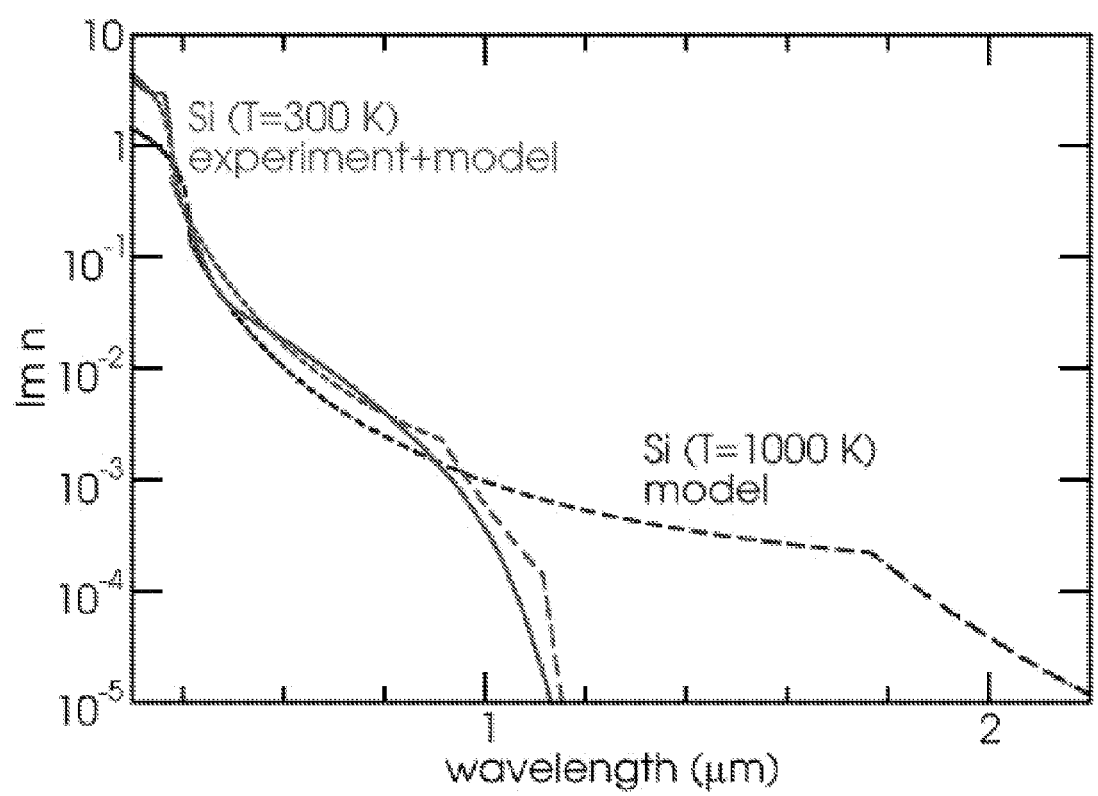
FIG. 16 includes an exemplary plot of the imaginary part of the refractive index of crystalline silicon as a function of wavelength.

In FIG. 16, the dispersion of the imaginary part of the refractive index of crystalline silicon is modeled for room temperature (300 K). This model was then used to extrapolate the dispersion relation to a much higher temperature of 1000 K, and is believed to be valid for mono-, multi-, and polycrystalline forms of silicon (but not amorphous silicon). That data, in turn, can be employed in improving the design of a crystalline silicon-based high-temperature selective absorber.

Figure 14:
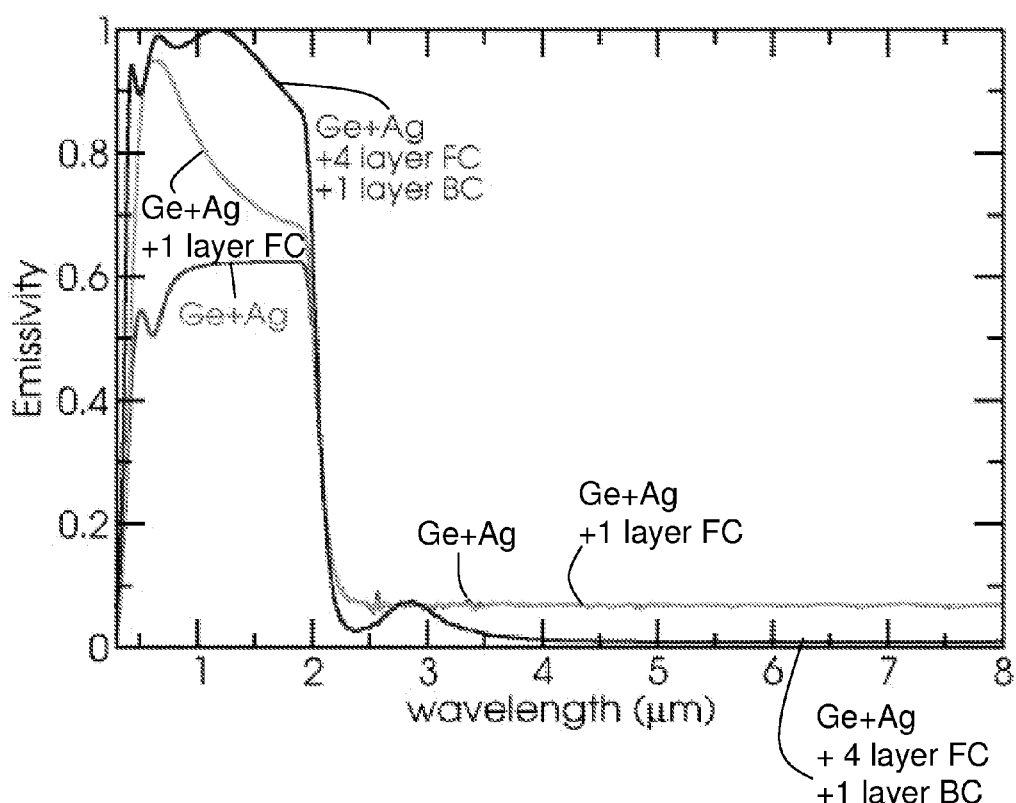
FIG. 14 includes a plot of emissivity as a function of wavelength, according to some embodiments.
Figure 17:
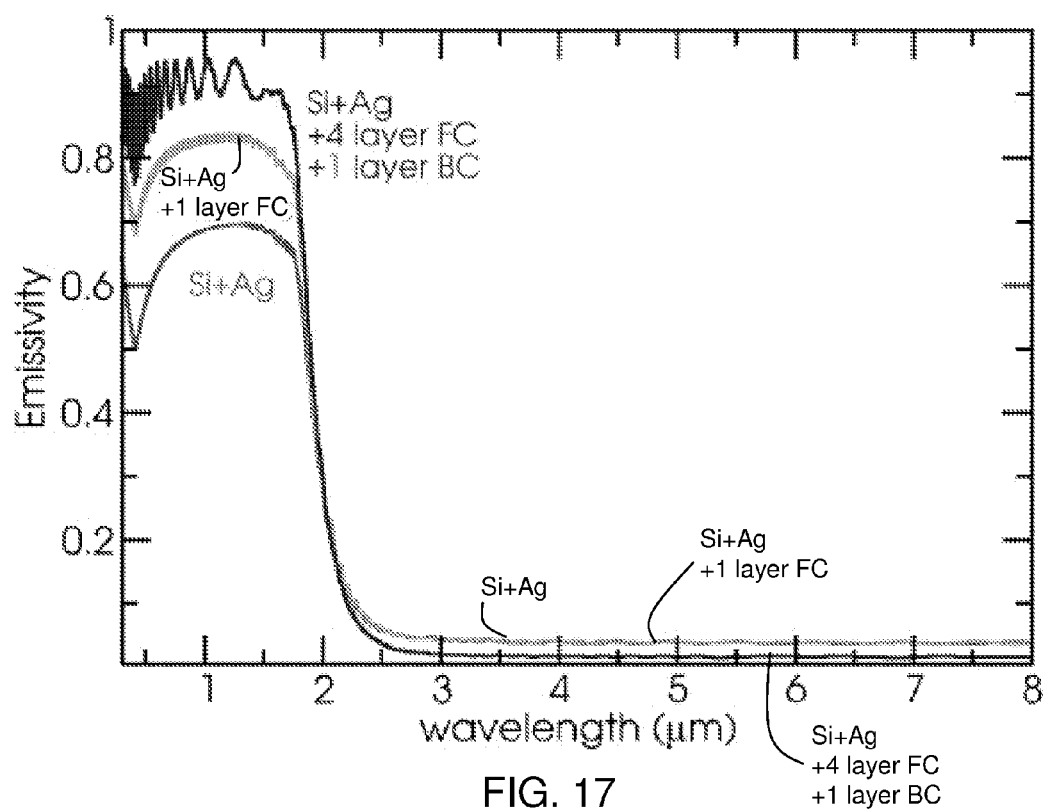
FIG. 17 includes a plot of emissivity as a function of wavelength, according to one set of embodiments.

With silicon data for temperatures of 1000 K in hand, we then employed structures similar to those of FIGS. 13A-13C, except for the substitution of silicon for germanium. Silicon and silver alone at 1000 K (cf. FIG. 13A) yield a good match between the absorption cutoff and the solar spectrum, as shown in FIG. 17. As reported in Table 3, a performance 54% superior to that of an idealized blackbody when C=100 was calculated. Stronger short-wavelength absorption can be achieved by adding a single front coating (cf. FIG. 13B), as shown in FIG. 17. This addition yielded a 70.96% overall thermal transfer efficiency, 95% higher than a blackbody. Finally, using four gradually increasing index materials in front and one low index material in back (cf. FIG. 13C), yielded an overall efficiency of 82.20%, 125% greater than a blackbody, and comparable to earlier efficiency numbers achieved for germanium at 400 K. Not wishing to be bound by any particular theory, the slightly lower performance might be due to the much greater overlap between the emission curves of the sun and a blackbody at 1000 K (compared to a blackbody at 400 K), as well as slightly weaker absorption from 1-2 microns than for the analogous structure in germanium at 400 K, which can be seen by comparing FIG. 17 with FIG. 14.

TABLE 3

Selective absorber data for operation under 100x concentrated light at 1000K

| absorber geometry | $\bar{\alpha}$ | $\bar{\epsilon}$ (1000K) | $\eta_t$ (100 suns@1000K) |
|---|---|---|---|
| blackbody | 1.0 | 1.0 | 0.3646 |
| Si + Ag | 0.6141 | 0.0824 | 0.5622 |
| 1 FC + Si + Ag | 0.7655 | 0.0887 | 0.7096 |
| 4 FCs + Si + 1 BC + Ag | 0.8677 | 0.0726 | 0.8220 |

Once the problem of selective solar absorption is solved, in order to create a reliable heat source at a target temperature, the problem again is to create a selective emitter system with thermal emission at desirable wavelengths. In the following description, the original work on the μTPV generator described above was extended by allowing additional degrees of freedom for the energies of the TPV bandgap(s). In this case, the figure of merit is defined as the system efficiency (defined previously), due to the fact that any such system will be much smaller than the system of concentrating mirrors. Accordingly, one can remove space constraints for consideration. Performance characteristics can be projected for the idealized, physically reasonable case in which recombination is primarily radiative in nature (i.e., no surface or bulk non-radiative recombination is included). Mathematically, this corresponds to applying Equation 7 with $J_{nr}$=0 separately to each junction j with bandgap $E_{gj}$; the total power is thus the sum of the power generated at each junction.

Figure 18A:
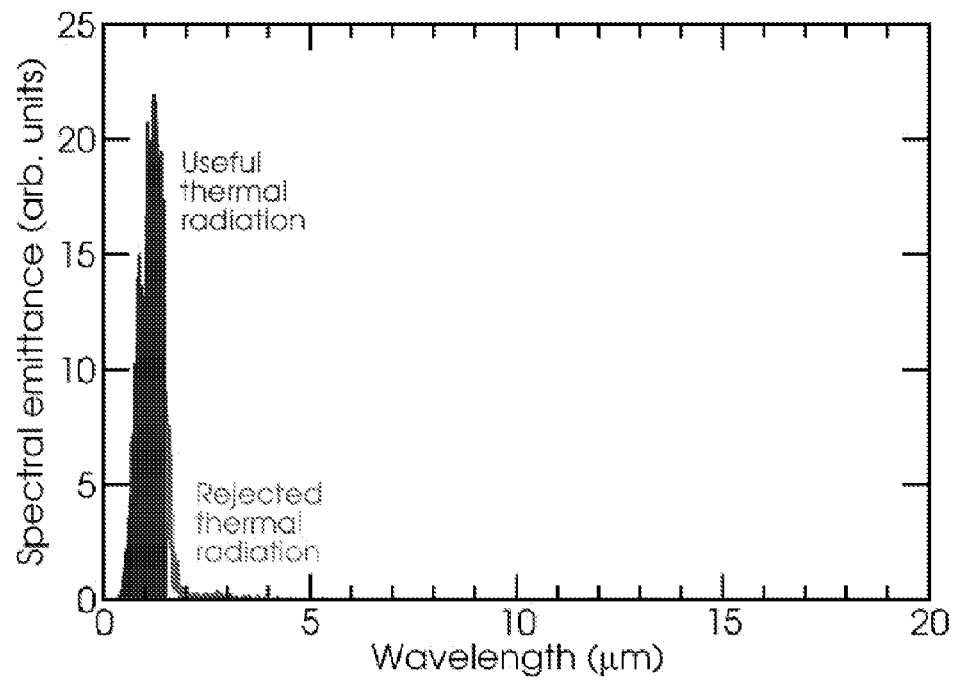
FIGS. 18A-18B include exemplary plots of spectral emittance as a function of wavelength.
Figure 18B:
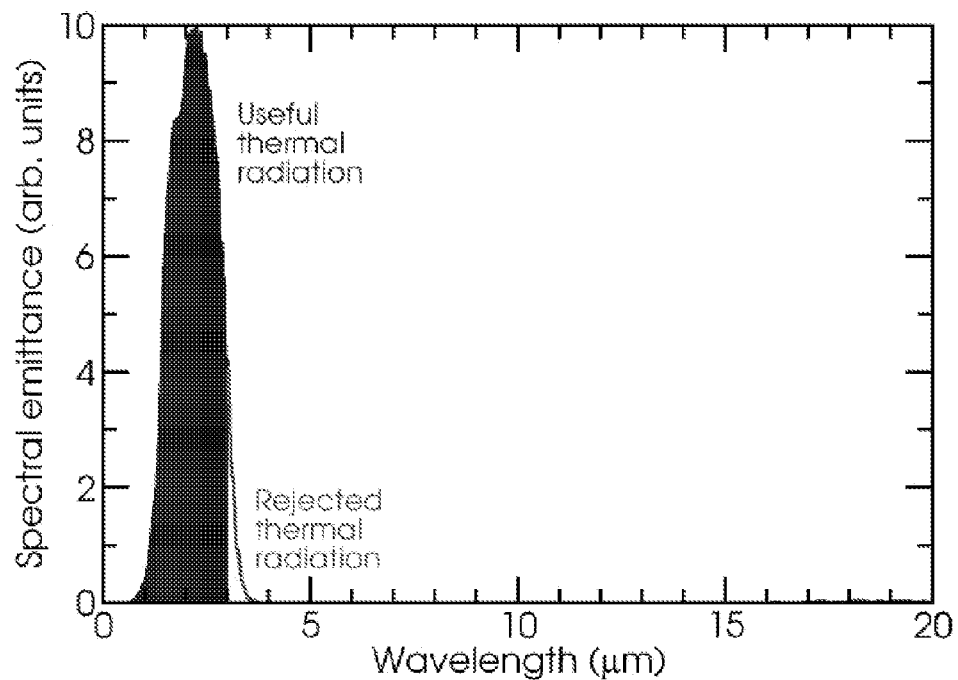

It was found that chirped rugate filters can once again be used with emitters to strongly suppress emission of photons with energy below a targeted electronic bandgap. The four parameters outlined previously for a rugate filter can be investigated, plus a bandgap parameter which dictates the maximum conversion efficiency to determine values to enhance performance. Previous work has shown the optimal operating temperature for a TPV selective emitter is 2360 K (see E. Rephaeli and S. Fan, "Absorber and emitter for solar thermophotovoltaic systems to achieve efficiency exceeding the Shockley-Queisser limit," *Opt. Express* 17, 15,145-15,159 (2009)). The simulations in this example show that a single bandgap structure operating at that temperature with an optimized bandgap energy of 0.81 eV can yield a power conversion efficiency of 54.2%, as is illustrated in FIGS. 18A-B. For an operating temperature limited to 1300 K because of practical issues with material stability, the best bandgap value was found to be reduced to 0.41 eV, and the conversion efficiency was reduced to 44.7%. This improves upon the performance of the InGaAsSb TPV cell, which can suffer from losses due to partial front reflection and nonradiative recombination.

Figure 19A:
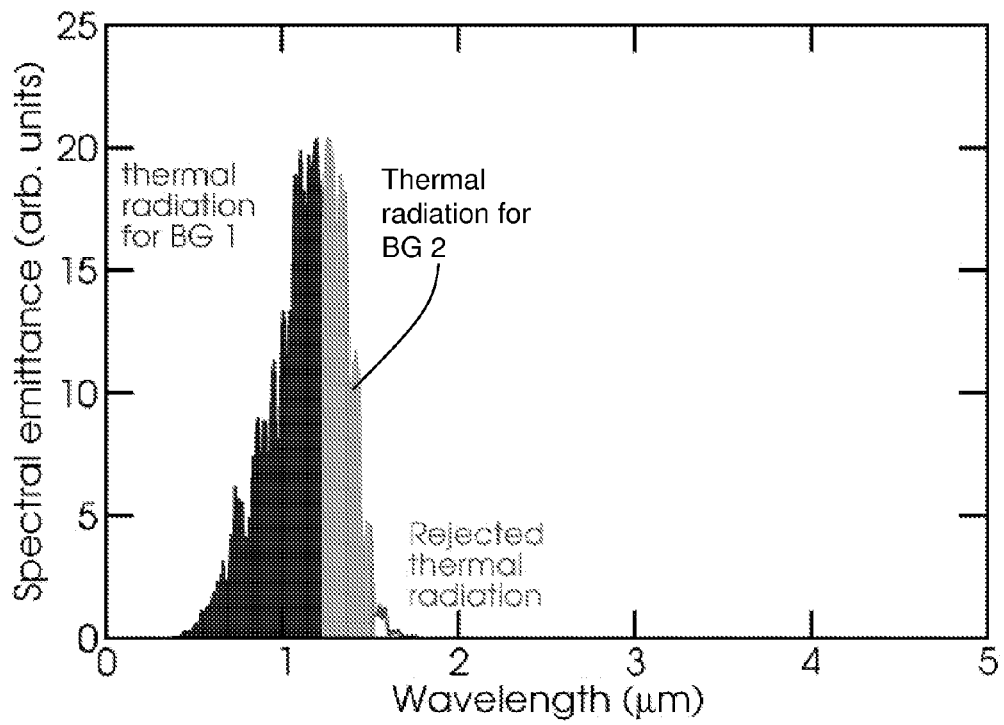
FIGS. 19A-19B include plots of spectral emittance as a function of wavelength, according to some embodiments.
Figure 19B:
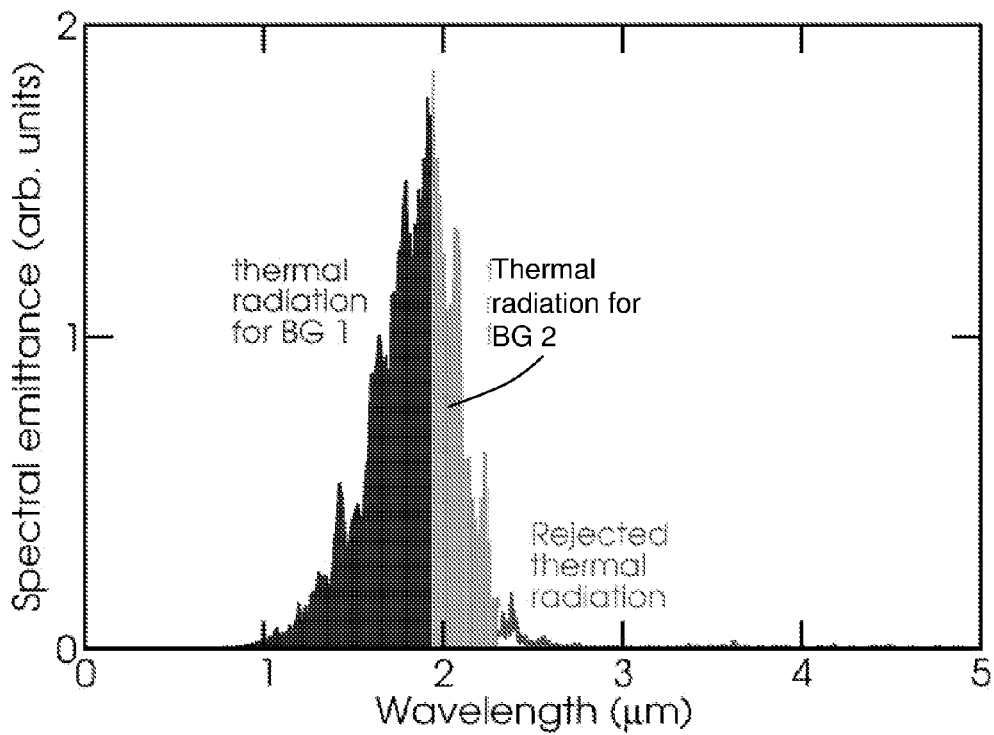

It was also found that a tandem junction configuration has the ability to further improve performance. This corresponds to the immediately preceding example of a structure with a single bandgap with an added second bandgap parameter, subject to the constraint that the bandgap in front should have a higher energy bandgap than the one in back (otherwise, few useful photons would reach the junction in the back). For an emitter at a temperature of 2360 K, a dual bandgap structure with bandgaps of 1.01 eV and 0.82 eV yields a power conversion efficiency of 66.3% (22.3% higher than a single junction configuration), as is illustrated in FIGS. 19A-19B. Even for an emitter of only 1000 K, it is found that efficiencies can be maintained at a quite respectable level of 44.0% with a tandem-junction, thus representing a 45-fold improvement over the previously observed conversion efficiency of a plain silicon wafer with an InGaAsSb TPV cell. This substantially exceeds the Shockley-Quiesser limit for a single-junction photovoltaic cell of 31% without concentration (C=1) or 37% under full concentration (C=46200).

Tables 4 and 5 include all of the fixed parameters, free variables, and figures of merit for each system investigated. Table 4 includes data for the selective emitter and TPV joint systems (note that the bandgap energies are fixed in the first 4 systems by the experimental InGaAsSb cell, and only allowed to vary in the last 4). Finally, Table 5 includes data for the solar selective absorbers, assumed to operate at various fixed temperatures T and AM1.5 solar concentrations C.

example is capable of generating 4 W with an efficiency of over 25% and a lifetime of over one year.

Figure 20:
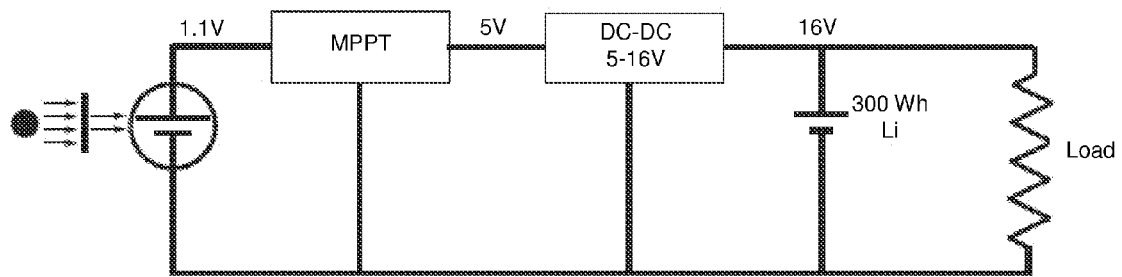
FIG. 20 includes an exemplary schematic circuit diagram of an energy generation system comprising a radioactive isotope.

A concept of the system is shown in FIG. 20. The battery operates by using the heat from the decay of an isotope (e.g., $^{238}$Pu or $^{147}$Pm) to heat the container holding the isotope to over 800° C. The thermal output of the radioactive heat source is 17-24 W (depending on isotope), and the power to the load is 4 W. A combination of two photonic crystals, one placed on the surface of the radioactive isotope container that enhances the thermal emission below 2.3 microns and the second photonic crystal placed near the radiating body prevents radiation of wavelengths longer than 2.3 microns while allowing shorter wavelengths to pass through the crystal onto a GaInAsSb photovoltaic diode (with an electronic bandgap of 0.547 eV). The GaInAsSb photovoltaic diode has an 82% average external quantum efficiency between 1 and 2.3 microns. Combining a photonic crystal-based selective emitter and short-pass optical filter matches the emission from the radiator to the most efficient wavelength region of the photovoltaic with an overall system efficiency up to 26.9%.

A set of Maximum Power Point Tracker (MPPT) chips (see Example 3) can be used to convert the power from the photovoltaic crystal to a fixed output voltage of 5 V with efficiency of 95%. At the same time, MPPT exhibits a tracking efficiency of 99%. This relatively large efficiency is made possible by careful circuit optimization, and low-power digital controls that adjust its MPPT input resistance to an optimal level based on the illumination of the segment of photovoltaic diode connected to that MPPT. In order to maximize the overall efficiency, we proposed a multi-MPPT method.

Figure 21:
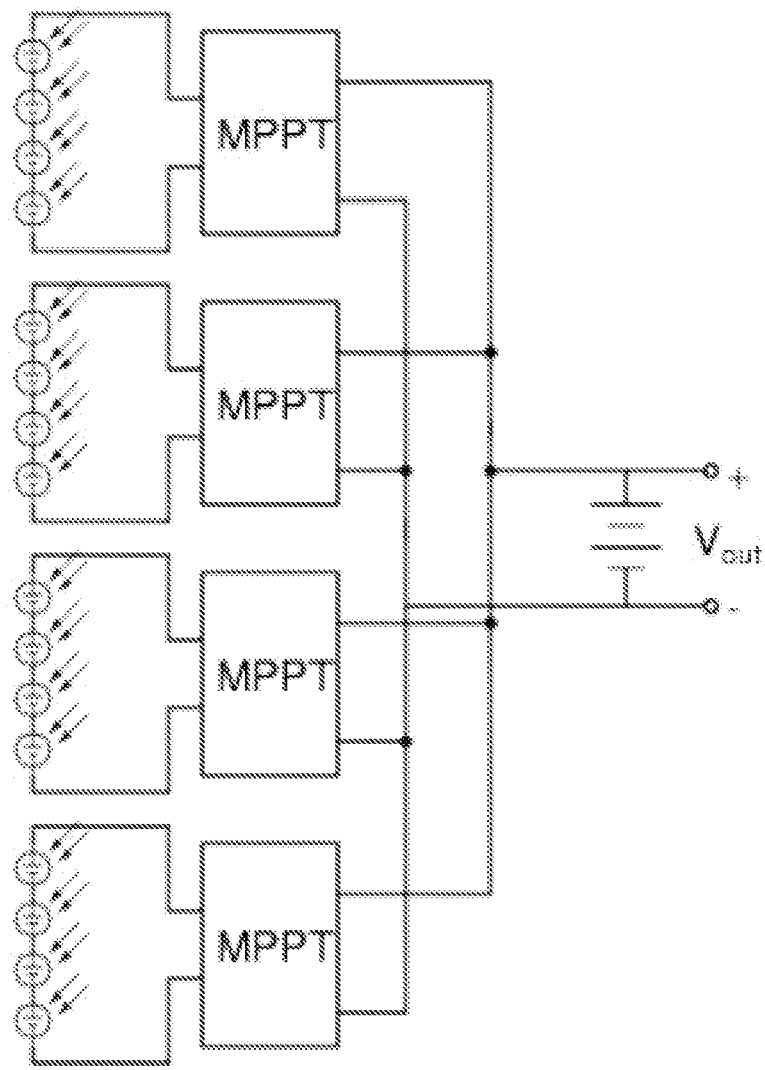
FIG. 21 includes a schematic diagram illustrating the connection of thermophotovoltaic cells, according to one set of embodiments.

As illustrated in FIG. 21, the output of four GaInAsSb PV diodes, connected in series, is fed to the input of single MPPT converter chip. Multiple chips are connected in parallel and/or series depending on the output voltage requirements. Following the MPPTs, a second stage DC-DC converter can be used to boost the rail voltage to 16 V with 4 W output power available at the rail with 85-98% efficiency (e.g., 95-98% efficiency). In some cases, however, the second stage DC-DC converter can be eliminated, and the MPPT itself can be designed to perform the complete voltage transformation from about 1 V up to 16 V.

TABLE 4

Selective emitter results.

| Structure | T | b | r | t | a | w | $E_{g1}$ | $E_{g2}$ | $a_W$ | $r_W$ | $d_W$ | FOM |
|---|---|---|---|---|---|---|---|---|---|---|---|---|
| FIG. 4(b) | 1000 | 4 | 0.011 | 425 | 787 | — | 0.547 | — | — | — | — | 1.713 |
| FIG. 4(c) (W) | 1000 | 4 | 0.093 | 389 | 778 | 9.18 | 0.547 | — | — | — | — | 2.010 |
| FIG. 4(c) (Pt) | 1000 | 2 | 0.049 | 350 | 715 | 422 | 0.547 | — | — | — | — | 2.584 |
| FIG. 8(b) + 10 | 1200 | 40 | 0.749 | 2641 | 1796 | — | 0.547 | — | 1380 | 645 | 2620 | 150.4 |
| FIG. 6 | 1300 | 34 | 0.603 | 2641 | 1677 | — | 0.41 | — | — | — | — | 0.4470 |
| FIG. 6 | 2360 | 18 | 0.726 | 2403 | 1130 | — | 0.81 | — | — | — | — | 0.5418 |
| FIG. 6 | 2360 | 38 | 0.733 | 2284 | 1142 | — | 1.01 | 0.82 | — | — | — | 0.6623 |
| FIG. 6 | 1000 | 29 | 0.750 | 3989 | 1716 | — | 0.64 | 0.54 | — | — | — | 0.4396 |

Symbols are defined in the text of Example 1; those with dimensions of length are quoted in nm, those with units of energy are quoted in eV, and those with dimensions of temperature are quoted in K. Note that different FOM values are not necessarily comparable.

TABLE 5

Selective absorber results.

| Structure | T | C | $n_1$ | $t_1$ | $n_2$ | $t_2$ | $n_3$ | $t_3$ | $n_4$ | $t_4$ | $n_b$ | $t_b$ | FOM |
|---|---|---|---|---|---|---|---|---|---|---|---|---|---|
| FIG. 12(b) (Ge) | 400 | 1 | 2.07 | 72.0 | — | — | — | — | — | — | — | — | 0.6782 |
| FIG. 12(b) (Si) | 1000 | 100 | 1.99 | 201 | — | — | — | — | — | — | — | — | 0.7096 |
| FIG. 12(c) (Ge) | 400 | 1 | 1.45 | 101 | 1.91 | 51.6 | 2.51 | 46.7 | 3.31 | 33.7 | 1.39 | 1000 | 0.8811 |
| FIG. 12(c) (Si) | 1000 | 100 | 1.46 | 364 | 1.65 | 50.9 | 2.12 | 163 | 2.72 | 1.04 | 1.39 | 669 | 0.8220 |

Symbols are defined in the text of Example 1; those with dimensions of length are quoted in nm and those with dimensions of temperature are quoted in K.

Example 2

This example describes a system in which a radioactive isotope is used to heat an emitter in a thermophotovoltaic energy generation system. Radioactive isotopes have relatively high energy densities and long lifetimes, making them attractive as power sources. The scheme described in this In this example, two radio isotopes were examined as potential heat sources. $^{147}$Pm is a relatively low energy beta emitter with a half-life of 2.6 years. The daughter $^{147}$Sm has a half-life of $10^{11}$ years and produces substantially no radioactivity. Assuming the system efficiency above and assuming 4 W at the end of one year of operation gives 24 W of heat required at the source, which translates to a 54,000 Ci source. A source of this size occupies about 50 cm$^3$ or a cube about 3.7 cm on a side. $^{238}$Pu is an alpha emitter with a half-life of 87 years. $^{238}$Pu also has a spontaneous fission branch of 1.8×10$^{-7}$%. The daughter $^{234}$U is also an alpha emitter with a lifetime of 2.4×10$^5$ years. Since the lifetime of $^{238}$Pu is much longer than a year, 4 W at the rail requires 17 W at the source, or 513 Ci. The neutron flux from a source of this size is $10^5$ s$^{-1}$. A source of this size would be about 3.4 cm$^3$.

Figure 22:
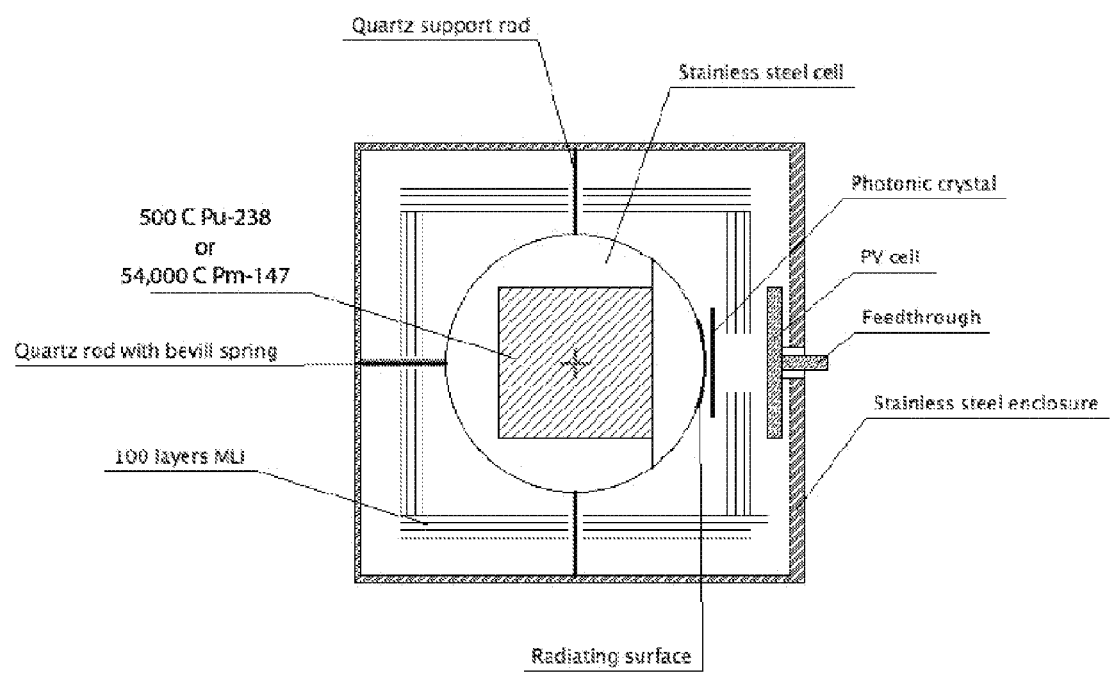
FIG. 22 includes a schematic diagram, according to some embodiments, of an energy generation system comprising a radioactive isotope.

One exemplary design of the battery is shown in FIG. 22. The radiation from the source container may be restricted to keep the source from cooling too much. This can be achieved by good thermal isolation and a very small radiating area. For example, a radiating area of about 6 cm$^2$ in the case of 17 W at 800° C. and 8 cm$^2$ in the case of 24 W at 800° C. would be appropriate. The rest of the container can be shielded, for example, using 100 layers of super insulation. As another option, the container can be shielded, for example, by applying several layers of standard insulators as thin coatings, coated with a low-emissivity coating (e.g., gold), and separated by a vacuum gap. The source container can also be supported by low thermal conductivity supports (e.g., 1 cm ceramic rods).

Example 3

This example describes a system in which the performance of a thermophotovoltaic system is enhanced by adjusting the voltage applied to one or more TPV cells to enhance the power generated by the TPV cell(s). Voltage adjustments are achieved using a low-power maximum power point tracking (MPPT) converter for a TPV power generator system. The system in this example is similar to the one illustrated in FIG. 4. Although the focus of this example is on a micro-fabricated TPV generator, this approach is applicable to other TPV systems such as radioactive isotope powered TPV, and solar-TPV.

Figure 23:
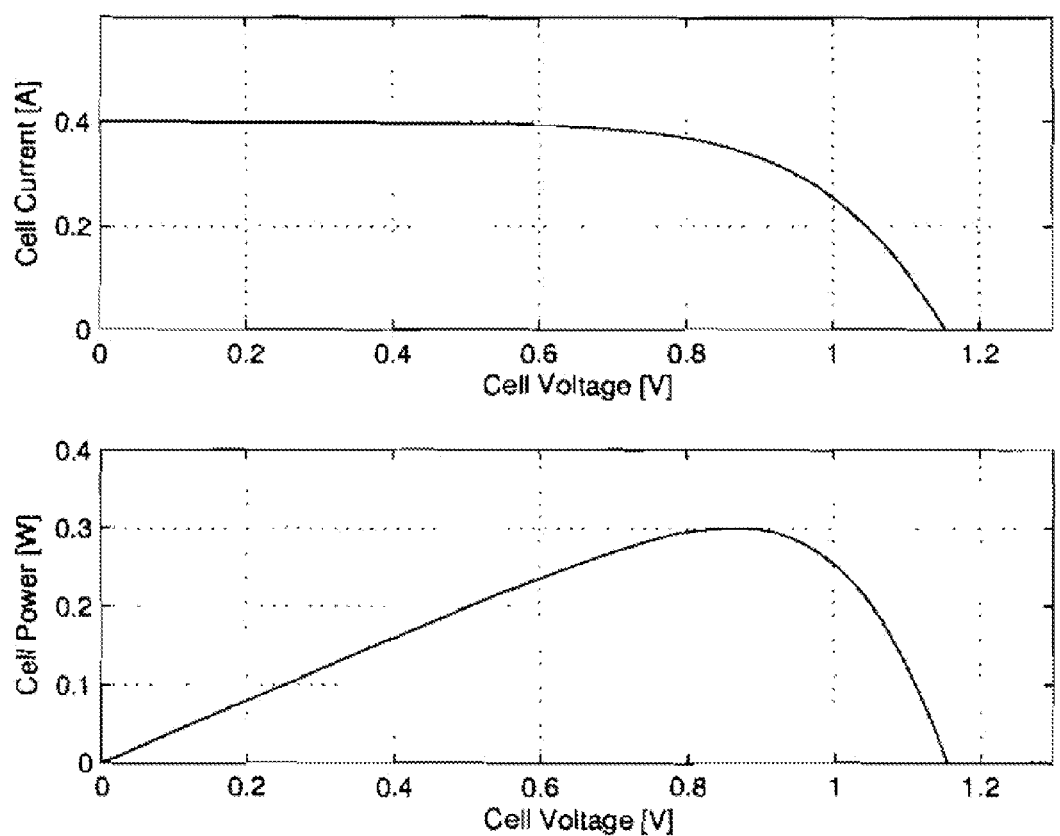
FIG. 23 includes plots of (top) cell current as a function of applied cell voltage and (bottom) cell power as a function of applied cell voltage, according to some embodiments.
Figure 24:
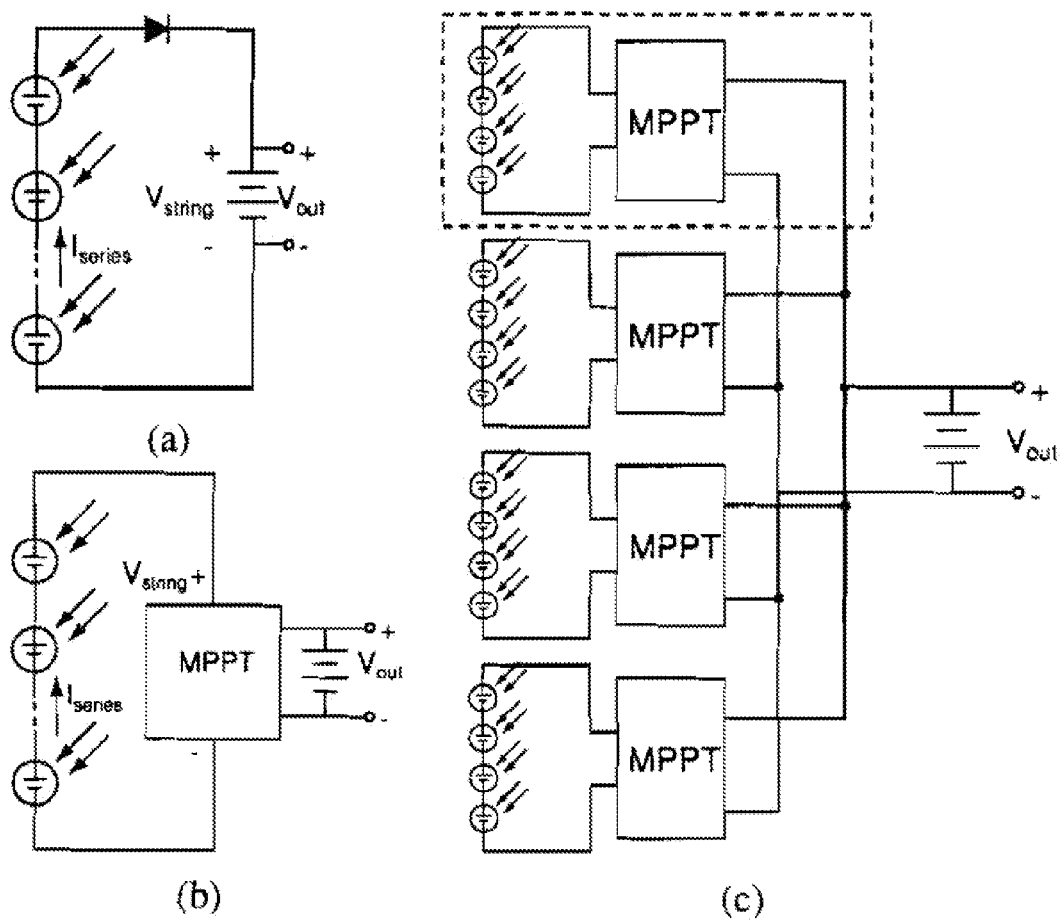
FIG. 24 include exemplary schematic diagrams illustrating the connection of photovoltaic cells to their loads.

FIG. 23 includes a plot outlining the I-V characteristic for one TPV module, which includes four series-connected GaInAsSb PV diodes. The bottom plot of the figure includes the corresponding power versus voltage graph, which clearly shows a maximum power point (MPP). The MPP typically changes with operating conditions such as incident irradiation and cell junction temperature, and can be continuously tracked to enhance the amount of power that is extracted from the cell. FIGS. 24A-B illustrate two common methods to connect photovoltaic cells to their loads. In FIG. 24A, all the cells are connected in series, and are directly connected to the load, a battery in this example. A diode is typically placed in series with the cells to prevent the battery from discharging through the cells during low light conditions. This approach, while simple, is typically very inefficient. Ignoring the small voltage drop across the diode, the string voltage $V_{string}$ can be restricted to be equal to the battery voltage $V_{out}$ at all times, which is typically not the same as the MPP voltage ($V_{MPP}$). For a particular operating irradiation level and temperature, the series-connected cells' $V_{MPP}$ may coincide with $V_{out}$, but at other times, less than the maximum power is extracted from the cells. FIG. 24B outlines a method which can be used to circumvent this limitation. By placing a dc-dc converter between the series-connected cells and the load, the string voltage $V_{string}$ can be controlled to be equal to $V_{MPP}$ at all times. The dc-dc converter, acting as a maximum power point tracker (MPPT), substantially continuously tracks $V_{MPP}$ by adjusting its conversion ratio in response to changes in operating conditions.

The method of FIG. 24B can be adequate for solar photovoltaic applications, where the solar irradiation is a plane-wave, ensuring uniform illumination of all cells in the series string. Provided the cells are properly matched in terms of their electrical characteristics, they can produce equal currents. The situation is different in the TPV application considered here. Since the burner is positioned close to the TPV diode (e.g., about 2-3 millimeters), the irradiation can be non-uniform and can depend on the relative position of the diode with respect to the burner. In addition, the temperature distribution across the burner surface can be non-uniform. This can lead to mismatched cell photocurrents, with the cell receiving the most irradiation producing the most current. If a method similar to that of FIG. 24B is employed in such a situation, the string current $I_{string}$ may be limited to the value of the least irradiated cell. Thus, all other cells may operate at a cell current that is below their peak current, resulting in a total output power that can be substantially lower than the maximum achievable. The result is similar to that observed in solar panels with partial shading. The non-uniform irradiation in this application prevents efficient energy extraction with the stacking of many cells in series to achieve a high output voltage.

FIG. 24C illustrates a new architecture that can be used to ameliorate one or more of these concerns. In this architecture, four diodes are connected in series and form a module. Each module can then be connected to its own individual MPPT, and the outputs of all MPPTs can be connected in parallel. In this example, the choice of four cells per module was made to provide a large enough working voltage (approximately 1 V) for the MPPTs to ensure efficient power conversion by the electronics. Using this architecture, current mismatch can be limited to only four cells, all of which are placed in close proximity to each other, thereby minimizing the negative effects of non-uniform irradiation. The boxed area of FIG. 24C highlights the system components that are considered in this example, which constitute four series-connected cells and one MPPT.

Figure 25:
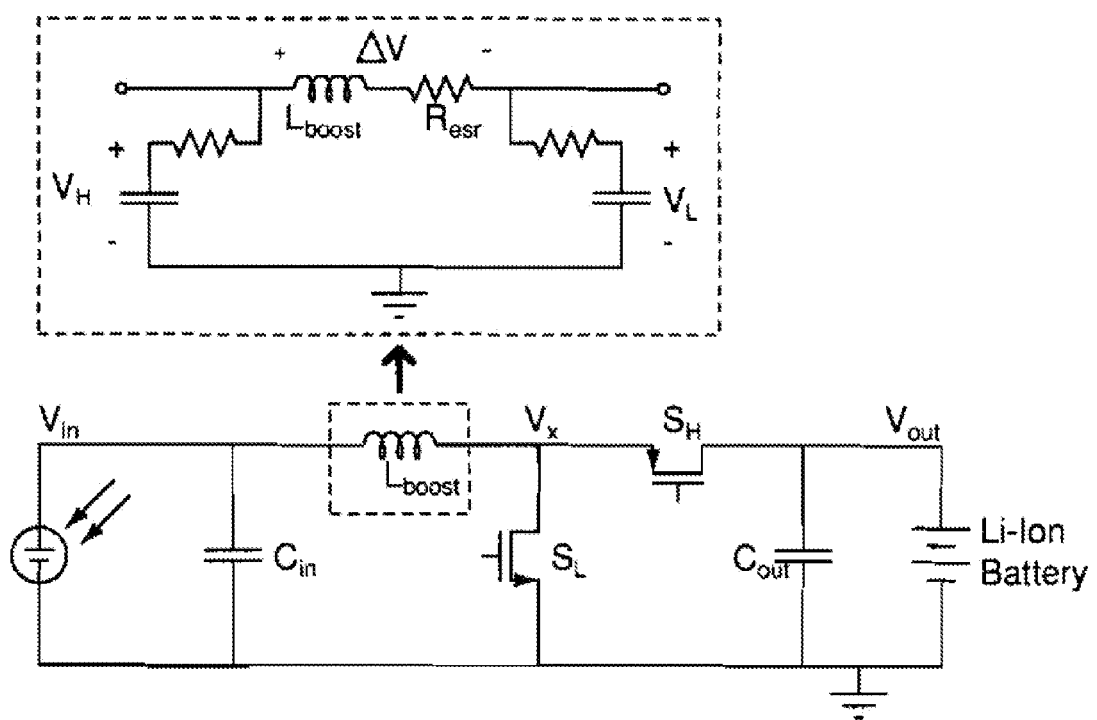
FIG. 25 includes a schematic circuit diagram illustrating the use of power point tracking, according to one set of embodiments.
Figure 26:
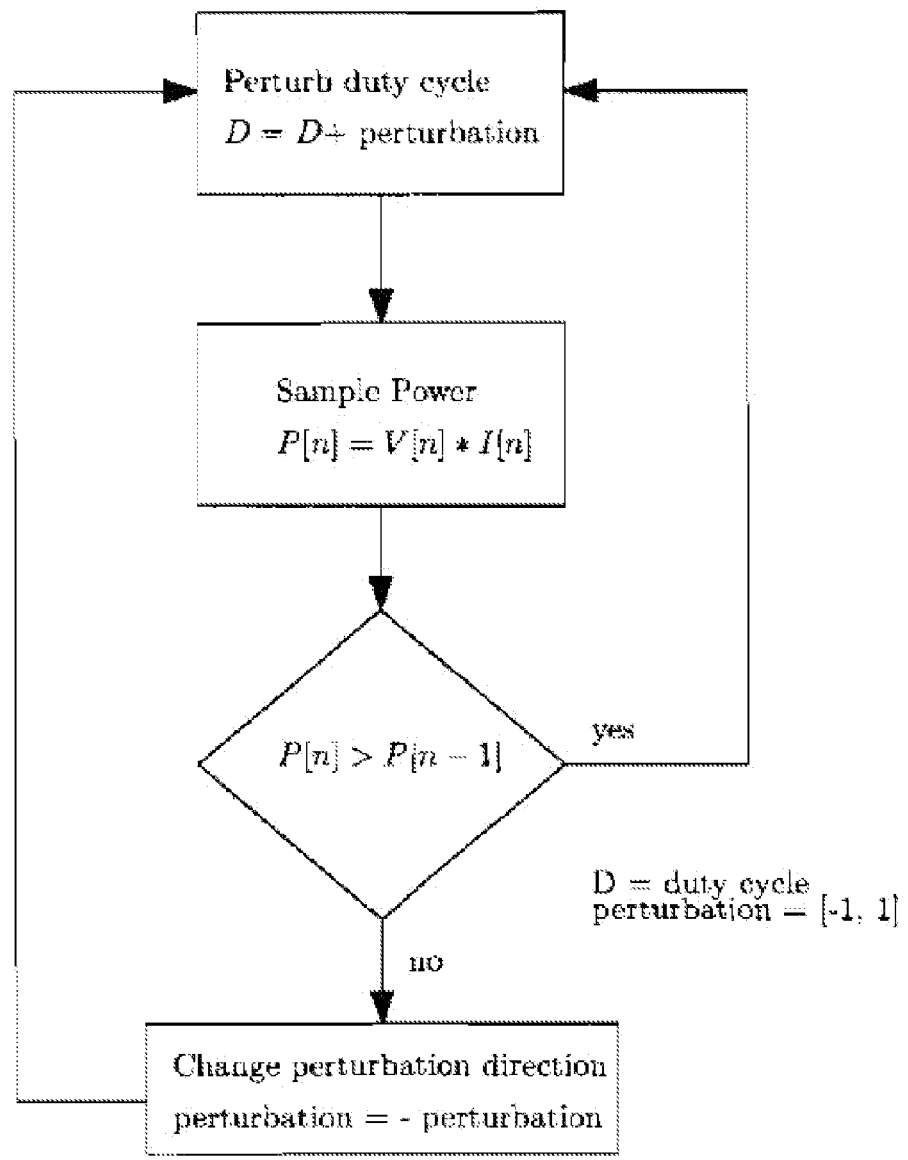
FIG. 26 includes an exemplary flow chart illustrating a power point tracking algorithm.

FIG. 25 includes a schematic diagram of the implementation of one of the MPPTs of FIG. 24C. The low-voltage PV module (with the I-V characteristics of FIG. 23) is used to charge a lithium-ion battery, which acts as intermediate energy storage for the system. The power electronic circuit is implemented as a boost converter, which performs both the requisite voltage transformation and the peak power tracking. The boost converter shown in FIG. 25 has an input/output voltage relationship given by:

$$V_{out} = \frac{V_{in}}{1-D} \qquad [14]$$

where D is the duty cycle of the bottom switch ($S_L$). In this synchronous rectification implementation, the top switch ($S_H$) is turned on when the bottom switch is off. The boost converter can be controlled to achieve peak power tracking by perturbing the duty cycle in a certain direction (increase or decrease), and observing whether the delivered power increased or decreased in response to the perturbation. If the power increased, the controller continues to perturb the duty cycle in the same direction, but if the power decreased, the direction of the perturbation is changed. With this method, the controller eventually settles on the peak power point of FIG. 23, where it can oscillate to within the finest resolutions of the duty cycle command and sensors. FIG. 26 shows a flow chart of the MPPT algorithm. The initial starting point for the duty cycle can be determined by performing a coarse sweep of the duty cycle at startup, and recording the duty cycle corresponding to the maximum output power observed. This approach can ensure that the peak power tracker can quickly lock in on the maximum power point.

The algorithm described above can be implemented in digital form, and, in this example, a microcontroller is used for implementation. In addition to keeping state and running the tracking algorithm, the microcontroller can be used to perform analog to digital conversion, generate the PWM signals, perform temperature measurements, and handle communication. The ability of the microcontroller to handle a variety of functions can be beneficial in this low-power application, where it can be desirable to reduce the power loss of the auxiliary components. An additional benefit of a multi-function chip such as the micro-controller is the significant space savings that can be realized compared to an implementation with discrete devices for each function.

In many cases, both current and voltage are measured to find the maximum power point. In many cases, only the average values need to be measured, which can reduce bandwidth requirements and enable the use of low-power analog to digital converter (ADC) architectures. Furthermore, the absolute value of current and voltage is not required, since the minimum or maximum power points are found relative to the other possible operating points. The ADC can thus benefit from high resolution, but not necessarily high absolute precision, a characteristic that can be leveraged to obtain high performance while maintaining low power consumption. The low parasitic power draw from the new controllers described in this example can make it useful for controlling relatively low power TPV cells without sacrificing overall system performance.

The microcontroller used in this example (the 8-bit ATtiny861 from Atmel) provides a multiplexed 10-bit ADC, along with an internal bandgap reference. The 10-bit precision can be further extended in the digital domain by oversampling and decimation. The input and output voltages can thus easily be measured with this built-in ADC with sufficient resolution.

Current sensing can be more challenging, in many cases. FIG. 25 illustrates the current-sensing technique used in this example. To maximize overall system efficiency, lossless current sensing was used, where the average voltage drop across the inductor is measured. The relationship between inductor current $I_L$ and sensed voltage $\Delta V$ is given by:

$$\langle I_L \rangle R_{est} = \langle \Delta V \rangle = \langle V_H \rangle - \langle V_L \rangle \quad [15]$$

where $R_{est}$ is the parasitic resistance of the inductor. The average voltages, $\langle V_H \rangle$ and $\langle V_L \rangle$ can be produced by first-order RC low-pass filters. These two voltages can then be sampled by the differential ADC of the micro-controller with a built-in gain of 32, which gives a reading directly proportional to the inductor current. It should be noted that the common concern with this current sensing method, the tolerance and temperature coefficient of $R_{est}$ is not a problem in this application. Since, for this tracking algorithm, one is only concerned with relative changes of the current, any static offset of $R_{est}$ has a negligible effect on the peak power tracking. Furthermore, the time constant of any temperature-induced variation of the $R_{est}$ value is much larger than the chosen sampling time, so the tracking can be made insensitive to this variation as well. In the converter implementation, a relative change in current of less than 1 mA can be resolved using this method, as confirmed by experimental measurements. It should be noted that this current sensing can be achieved without the need for a power-consuming series-sense resistors, and that the amplifier and ADC are built-in to the microcontroller, and thus consume negligible additional power and take up substantially no additional area.

It should be emphasized that one factor that enables the use of this current-sensing technique is the fact that the application neither requires absolute accuracy of the current, nor instantaneous current values. Thus, the tolerance of the inductor resistance is not critical, and the low-pass filters can be designed to provide significant averaging over a relatively long time.

An experimental prototype of the MPPT converter was developed and characterized. Table 6 lists the converter specifications. Converter efficiency includes all control and gate driver losses. The tracking efficiency is a measurement of how close the tracking algorithm operates to the true maximum power point, and is given by:

$$\eta_{tracking} = \frac{\langle P_{in} \rangle}{P_{MPP}} \quad [16]$$

where $P_{in}$ corresponds to the converter input power, and $P_{MPP}$ is the output power of the TPV module at the maximum power point. Due to the low operating point of the TPV module (~1 V) in this example, it can be challenging to make a high precision input power measurement of the converter without also perturbing the actual operating point of the converter. An easier approximation of the tracking efficiency can be found by calculating the ratio:

$$\eta_{tracking,approx.} = \frac{\langle P_{out} \rangle}{P_{out,max}} \quad [17]$$

where $P_{out,max}$ corresponds to the maximum output power from the converter. This is only an approximation, and may over-estimate the tracking efficiency in many cases because $P_{out,max}$ might not correspond to the exact peak power point, owing to the finite resolution of the digital PWM implementation. However, with proper knowledge of the cell I-V curve (e.g., FIG. 23) and the tracking algorithm step-size (PWM resolution is this implementation), one can find an upper bound on the error in the approximation given by Equation 17, and from there calculate a minimum tracking efficiency. Using this technique, the tracking efficiency of the converter considered here was found to be above 99%.

TABLE 6

| Converter Specifications | |
|---|---|
| Input Voltage | 0.3-1.1 V |
| Output Voltage | 1.5-4.2 V |
| Output Power | 500 mW |
| Switching Frequency | 250 kHz |
| Converter Efficiency | 90% |
| Tracking Efficiency | >99% |

TABLE 7

Component Listing

| Device | Model | Value | Manufacturer |
|---|---|---|---|
| $S_1$ | BSO300N03S | | Infineon Tech. |
| $S_2$ | SI2351DS | | Vishay Siliconix |
| L | MSS5131-822ML | 8.2 µH | Coilcraft |
| $R_H$, $R_L$ | 0603 | 100 kΩ | Panasonic |
| $C_H$, $C_L$ | 0603 | 10 µF | Murata |
| $C_{IN}$ | 0805 | 3 µF | Murata |
| $C_{OUT}$ | 0805 | 50 µF | Murata |
| Microcontroller | ATtiny861 | | Atmel |
| Gate Driver | LM5111 | | National Semi. |

Figure 27:
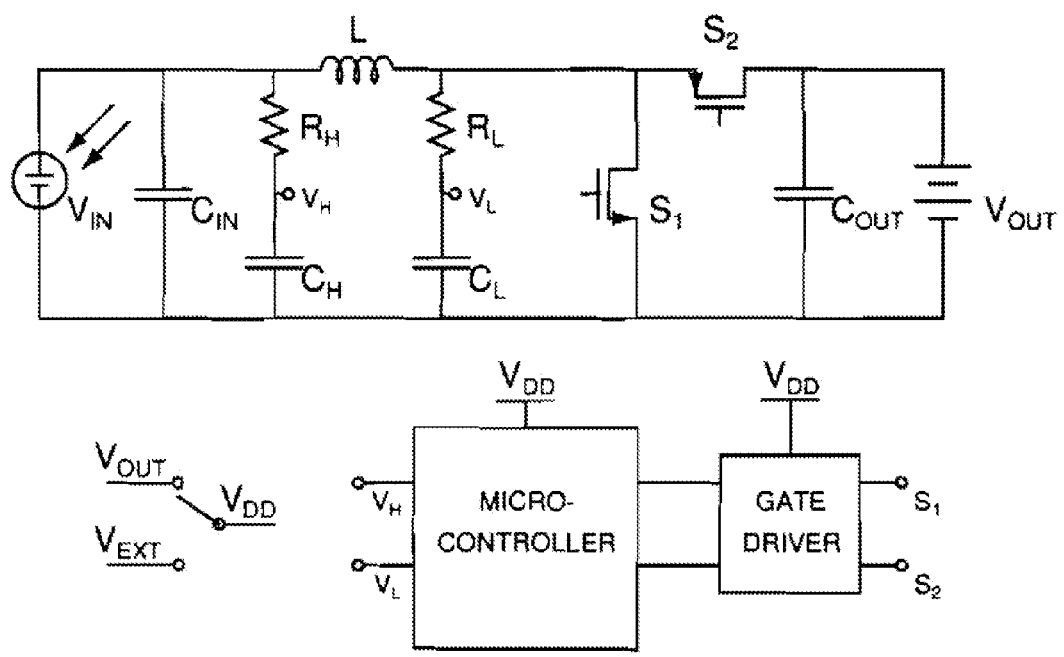
FIG. 27 includes a schematic illustration of a converter, according to one set of embodiments.

The converter design was guided by the desire to achieve small system size and weight, while maintaining high efficiency. The majority of the circuit board area was occupied by connectors, while the converter core (switching devices, micro-controller, and passive components) occupied a relatively small area. FIG. 27 provides a detailed schematic drawing of the converter. As shown, the converter can be powered either from the Li-Ion battery output, or from an external power supply. Table 7 lists the components used in the experimental prototype.

Figure 28:
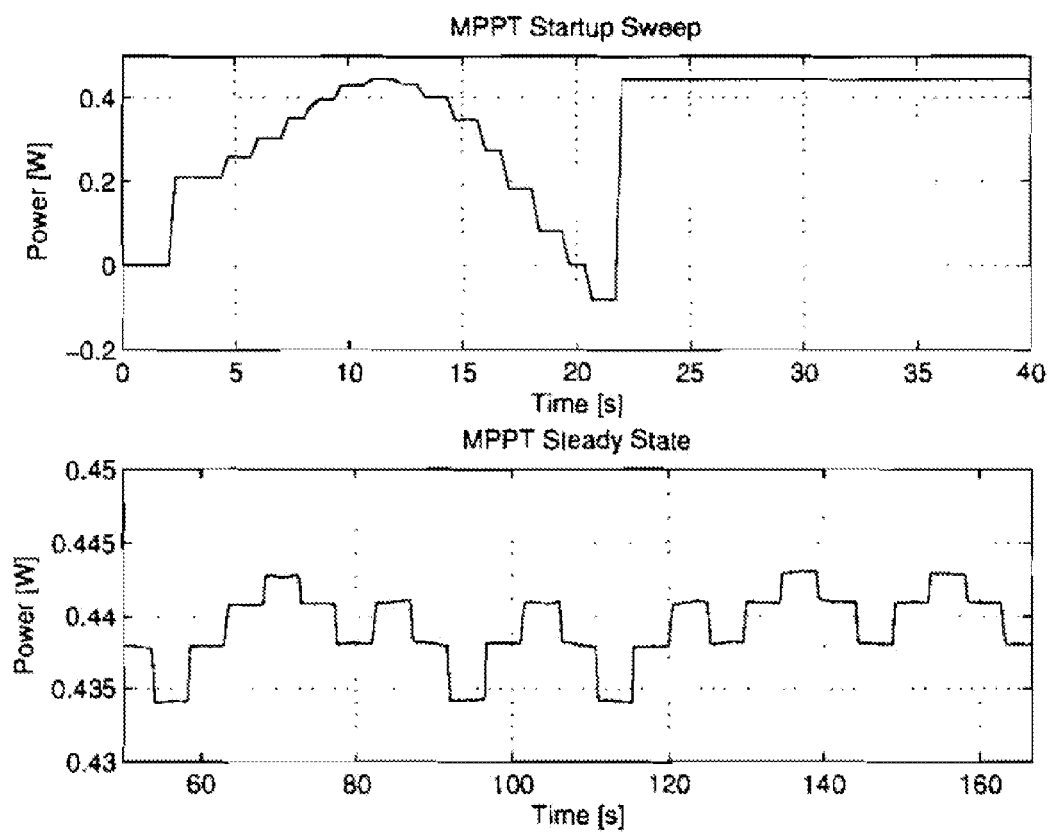
FIG. 28 includes exemplary plots of (top) power as a function of time for a startup sweep and (bottom) power as a function of time for steady state operation.

To evaluate the performance of the peak power tracker, the converter was initially connected to a PV diode illuminated by a quartz halogen lamp. The lamp brightness and distance from the cell was adjusted to match the expected power output from the cell when illuminated by the micro-reactor (500 mW). This enabled initial characterization of the converter without the added complexity of the micro-reactor dynamics. FIG. 28 (top) shows the output power of the converter over time, and illustrates the MPPT startup algorithm for this experimental setup. Initially, the converter stepped its duty cycle through a coarse sweep to find the approximate point of the MPP. The duty cycle corresponding to the maximum power observed was recorded, and once the sweep was concluded, the duty cycle was set to this value. At this point, the converter entered the hill-climbing phase (perturb and observe), and used a fine step-size to reach the MPP. Note that the step-size of the hill-climbing algorithm is too small to be visible in the top plot.

The steady-state behavior of the hill-climbing algorithm is shown in the bottom of FIG. 28, which shows the converter output power versus time in steady-state. This is a zoomed-in version of the top plot, and shows the discrete steps in power corresponding to a 1-bit change in duty cycle. The total PWM resolution of the micro-controller was 10 bits. The converter oscillated around the MPP to within the resolution of the PWM signal and the current and voltage sensors. Because the sensing and duty cycle control had similar resolution, the hill-climbing algorithm was limited by sensing noise, and occasionally took one extra step in the wrong direction. It should be noted that the sampling interval for the MPPT algorithm was set to several seconds, as seen in FIG. 28 (bottom). This was done to enable high accuracy power measurements by the external instruments used to characterize the converter, and is not a fundamental limit of the converter itself. If desired, the MPPT algorithm could be set to sampling frequencies considerably higher (e.g., on the order of several kHz) without a noticeable impact on tracking efficiency. In this example, however, the system time constant of any change in maximum power point was long enough such that the sampling frequency of FIG. 28 was sufficient to allow efficient energy extraction from the PV module.

In order to fully evaluate the MPPT converter performance, it was tested using an experimental system setup similar to the one depicted in FIG. 4. The PV cells were illuminated with the micro-reactor. The reactor was a 10 mm by 10 mm by 1 mm silicon slab with a serpentine, platinum catalyst-loaded channel running through it. A mixture of butane and oxygen was fed into one end of the channel; carbon dioxide and water vapor are exhausted from the other end. With a butane flow of 8 sccm (standard cubic centimeters per minute) and 80 sccm of oxygen, the average surface temperature was about 850° C. For reference, an ordinary pocket lighter burns 15 sccm of butane.

Figure 29:
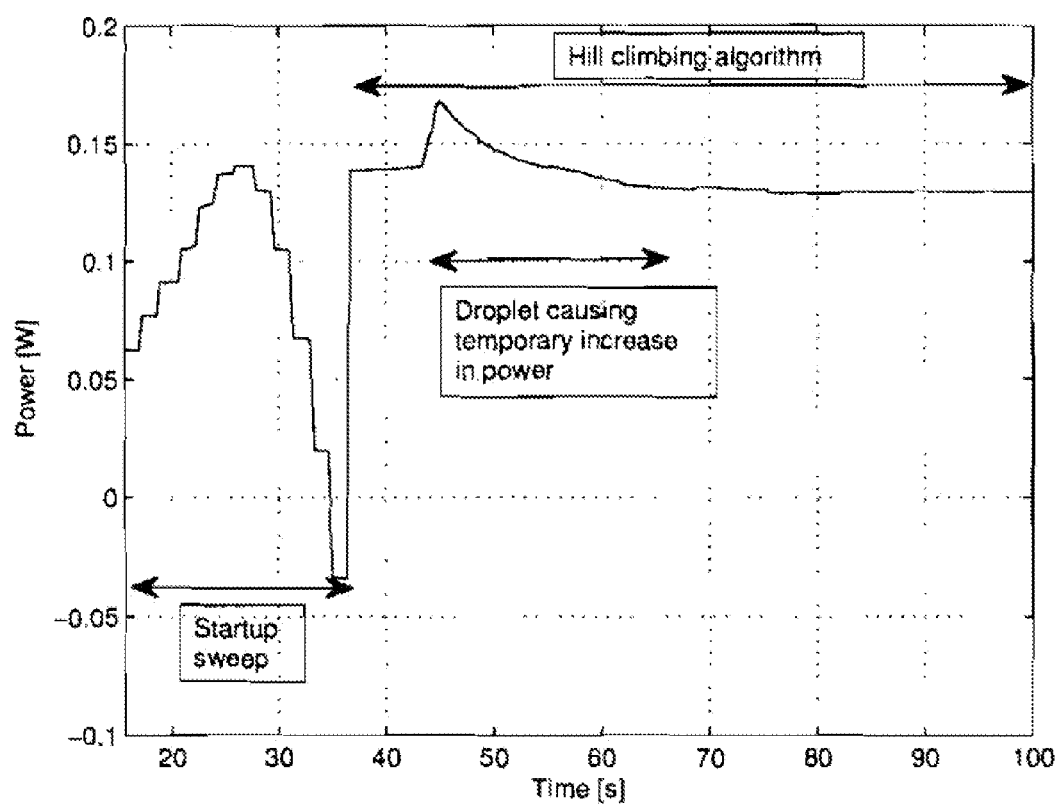
FIG. 29 includes a plot of converter output power as a function of time, according to some embodiments.

In the experimental setup, the two GaInAsSb PV cells were positioned directly above the burner, and another two cells were positioned below the burner. These four PV cells were connected in series and their output was connected to the MPPT converter. Experimental data from the complete system setup is shown in FIG. 29, which shows converter output power versus time. The plot in FIG. 29 looks similar to FIG. 28, but there are some notable differences. This first generation micro-reactor assembly has a typical output power of 150 mW, due to the cell being placed at a distance from the burner that exceeded that for optimum power transfer. Despite this, the demonstrated system output power was more than two orders of magnitude higher than what has previously been achieved. The measured energy density of this micro-TPV system was 75 mW/cm². Improved system packaging and further system design optimization could yield a micro-TPV system power density of 250-300 mW/cm².

One of the difficulties encountered during system testing was that the burner can experience occasional temperature fluctuations due to condensed butane entering the fuel supply. Butane was delivered to the burner as a gas but occasional droplets, providing additional fuel, sometimes entered the inlet stream. When a droplet entered the burner, there was a sudden increase in temperature. FIG. 29 captures such an event, which occurs slightly before time t=45 seconds, with a correspondingly large increase in output power, followed by an exponential decay back to steady-state. The time constant associated with this event is such that the MPPT algorithm sometimes took one or two steps in the wrong direction during the increasing power phase, followed by a continuous change of direction during the exponential decay, since the output power at each sample time is lower than the previous sample. The result is that while the converter may operate slightly off of the peak power point during this transient event, it did not move more than a few steps in the wrong direction, ensuring a quick return to the maximum power point once the burner has returned to equilibrium.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An energy generation system, comprising:
   an emitter constructed and arranged to emit electromagnetic radiation, wherein the emitter comprises a photonic crystal comprising 1-dimensional or 2-dimensional periodicity;
   a thermophotovoltaic cell constructed and arranged to convert at least a portion of the electromagnetic radiation emitted by the emitter into electricity; and
   a filter positioned between the emitter and the thermophotovoltaic cell, the filter comprising:
      a first material having a first index of refraction,
      a second material having a second index of refraction different from the first index of refraction positioned between the first material and the emitter and in direct contact with the first material,
      a third material having a third index of refraction different from the first and second indices of refraction positioned between the second material and the emitter and in direct contact with the second material, and
      a fourth material having a fourth index of refraction different from the first, second, and third indices of refraction positioned between the third material and the emitter and in direct contact with the third material,
   wherein the indices of refraction of the first, second, third, and fourth materials increase along a path directed toward the emitter.

2. The energy generation system of claim 1, wherein the emitter is constructed and arranged to emit electromagnetic radiation within one or more predetermined ranges of wavelengths.

3. The energy generation system of claim 1, wherein the filter is in physical contact with the emitter.

4. The energy generation system of claim 1, wherein the filter is spaced apart from the emitter and the thermophotovoltaic cell.

5. The energy generation system of claim 1, wherein the filter is in physical contact with the thermophotovoltaic cell.

6. The energy generation system of claim 1, wherein the filter comprises a photonic crystal comprising 1-dimensional periodicity.

7. The energy generation system of claim 1, wherein the emitter is constructed and arranged to emit electromagnetic radiation when it is heated.

8. The energy generation system of claim 1, wherein the emitter comprises a chemical reactor.

9. The energy generation system of claim 8, wherein the chemical reactor comprises a combustor.

10. The energy generation system of claim 1, wherein the emitter comprises a radioactive isotope.

11. The energy generation system of claim 1, wherein the photonic crystal comprises a fifth material having a fifth index of refraction and a sixth material having a sixth index of refraction that is different from the fifth index of refraction.

12. The energy generation system of claim 1, wherein the photonic crystal comprises a plurality of bi-layers, each bi-layer comprising a first layer of a fifth material having a fifth index of refraction and a second layer of a sixth material having a sixth index of refraction.

13. The energy generation system of claim 12, wherein the thicknesses of the bi-layers are arranged such that they have a chirping of between about 0.5 and about 1.0.

14. The energy generation system of claim 11, wherein the photonic crystal further comprises a seventh material having a seventh index of refraction that is different from at least one of the fifth index of refraction and the sixth index of refraction.

15. The energy generation system of claim 11, wherein the photonic crystal comprises a seventh material having a seventh index of refraction that is different from both the fifth index of refraction and the sixth index of refraction.

16. The energy generation system of claim 15, wherein the indices of refraction of the fifth, sixth, and seventh materials increase substantially exponentially from the material closest to the emission surface to the material farthest from the emission surface.

17. The energy generation system of claim 1, wherein the photonic crystal comprises 2-dimensional periodicity.

18. The energy generation system of claim 17, wherein the photonic crystal comprises a material in which a 2-dimensional pattern of openings are formed.

19. The energy generation system of claim 18, wherein the openings have an aspect ratio of at least about 0.75:1.

20. The energy generation system of claim 18, wherein the openings have an aspect ratio of between about 0.75:1 and about 10:1.

21. The energy generation system of claim 18, wherein the openings comprise substantially cylindrical holes with ratios of depth to diameter of between about 0.75:1 and about 10:1.

22. The energy generation system of claim 1, wherein the indices of refraction of the first, second, third, and fourth materials increase substantially exponentially along a path directed toward the emitter.

23. The energy generation system of claim 1, wherein:
the filter comprises m total materials,
the filter material closest to the emitter has an index of refraction of n, and
an $i^{th}$ filter material, wherein i is an integer within a range of 0 to m and refers to the index of the materials in order from the material closest to the emitter to the material farthest from the emitter, has an index of refraction of about $n^{((m+1-i)/(m+1))}$.

24. The energy generation system of claim 1, wherein the filter is constructed and arranged to reflect at least about 90% of electromagnetic radiation with a wavelength of between about 4.5 microns and about 7 microns.

* * * * *